US007623572B2

(12) United States Patent
Li

(10) Patent No.: US 7,623,572 B2
(45) Date of Patent: Nov. 24, 2009

(54) NOISE VARIANCE ESTIMATION FOR FREQUENCY DOMAIN EQUALIZER COEFFICIENT DETERMINATION

(75) Inventor: Junqiang Li, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 543 days.

(21) Appl. No.: 11/639,782

(22) Filed: Dec. 15, 2006

(65) Prior Publication Data

US 2008/0075158 A1 Mar. 27, 2008

Related U.S. Application Data

(63) Continuation-in-part of application No. 11/593,911, filed on Nov. 7, 2006, and a continuation-in-part of application No. 11/524,584, filed on Sep. 21, 2006, and a continuation-in-part of application No. 11/524,580, filed on Sep. 21, 2006.

(51) Int. Cl.
*H03H 7/30* (2006.01)
(52) U.S. Cl. .................................................... 375/229
(58) Field of Classification Search ......... 375/229–236, 375/267, 299, 347, 349; 333/18, 28 R; 708/300, 708/322, 323; 379/340, 398; 700/53; 455/101, 455/132–141
See application file for complete search history.

(56) References Cited

U.S. PATENT DOCUMENTS

| | | | |
|---|---|---|---|
| 7,570,689 B2 * | 8/2009 | Li et al. | 375/229 |
| 2007/0071071 A1 * | 3/2007 | Li et al. | 375/147 |
| 2007/0258352 A1 * | 11/2007 | Wang et al. | 370/203 |

OTHER PUBLICATIONS

Cui, Power Delay Profile and Noise Variance Estimation for OFDM, IEEE, vol. 10, No. 1, Jan. 2006, p. 25-27.*
Yang et al., An Improved Channel Quality Estimation Technique For OFDM System, IEEE, 2002, p. 1289-1292.*

* cited by examiner

*Primary Examiner*—Sam K Ahn
(74) *Attorney, Agent, or Firm*—Garlick Harrison & Markison; Bruce E. Garlick

(57) ABSTRACT

A Radio Frequency (RF) receiver includes a RF front end and a baseband processing module coupled to the RF front end that is operable to determine equalizer coefficients for a composite signal that includes a first information signal and a second information signal. First and second information signal channel estimates and channel powers based upon training symbols are determined. A composite signal power is determined. A noise variance of the composite signal is determined based upon the first information signal channel power, the second information signal channel power, and the composite signal power. A plurality of equalizer coefficients are determined based upon the first information signal channel estimate, the second information signal channel estimate, and the noise variance of the composite signal.

34 Claims, 25 Drawing Sheets

NOISE VARIANCE ESTIMATION FOR FREQUENCY DOMAIN EQUALIZER COEFFICIENT DETERMINATION

CROSS REFERENCES TO RELATED APPLICATIONS

The present application is a continuation-in-part of:

1. Utility Application Ser. No. 11/524,584 filed on Sep. 21, 2006, and entitled "FREQUENCY DOMAIN EQUALIZER FOR DUAL ANTENNA RADIO," and 2. Utility Application Ser. No. 11/524,580 filed on Sep. 21, 2006, and entitled "FREQUENCY DOMAIN EQUALIZER WITH ONE DOMINATE INTERFERENCE CANCELLATION FOR DUAL ANTENNA RADIO"; and 3. Utility Application Ser. No. 11/593,911 filed on Nov. 7, 2006, and entitled "EQUALIZER COEFICIENT DETERMINATION IN THE FREQUENCY DOMAIN FOR MIMO/MISO RADIO," all of which are incorporated herein in their entirety by reference for all purposes.

BACKGROUND

1. Technical Field

The present invention relates generally to wireless communication systems; and more particularly to the equalization of data communications by a wireless radio in a wireless communication system.

2. Related Art

Cellular wireless communication systems support wireless communication services in many populated areas of the world. Cellular wireless communication systems include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its serviced cell/sectors. A BSC coupled to the base station routes voice communications between the MSC and the serving base station. The MSC routes the voice communication to another MSC or to the PSTN. BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals.

Wireless links between base stations and their serviced wireless terminals typically operate according to one (or more) of a plurality of operating standards. These operating standards define the manner in which the wireless link may be allocated, setup, serviced, and torn down. Popular currently employed cellular standards include the Global System for Mobile telecommunications (GSM) standards, the North American Code Division Multiple Access (CDMA) standards, and the North American Time Division Multiple Access (TDMA) standards, among others. These operating standards support both voice communications and data communications. More recently introduced operating standards include the Universal Mobile Telecommunications Services (UMTS)/Wideband CDMA (WCDMA) standards. The UMTS/WCDMA standards employ CDMA principles and support high throughput, both voice and data.

The wireless link between a base station and a serviced wireless terminal is referred to as a "channel." The channel distorts and adds noise to wireless transmissions serviced by the channel. "Channel equalization" is a process employed by a wireless receiver, e.g., wireless terminal, in an attempt to obviate the effects of the channel. While channel equalization is certainly helpful in obviating the effects of the channel, the characteristics of the channel are constantly changing. Coefficients of a channel equalizer must be continually updated. However, generating coefficients of the channel equalizer is a difficult and time consuming process. Thus, a need exists for an improved methodology for determining equalizer coefficients.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
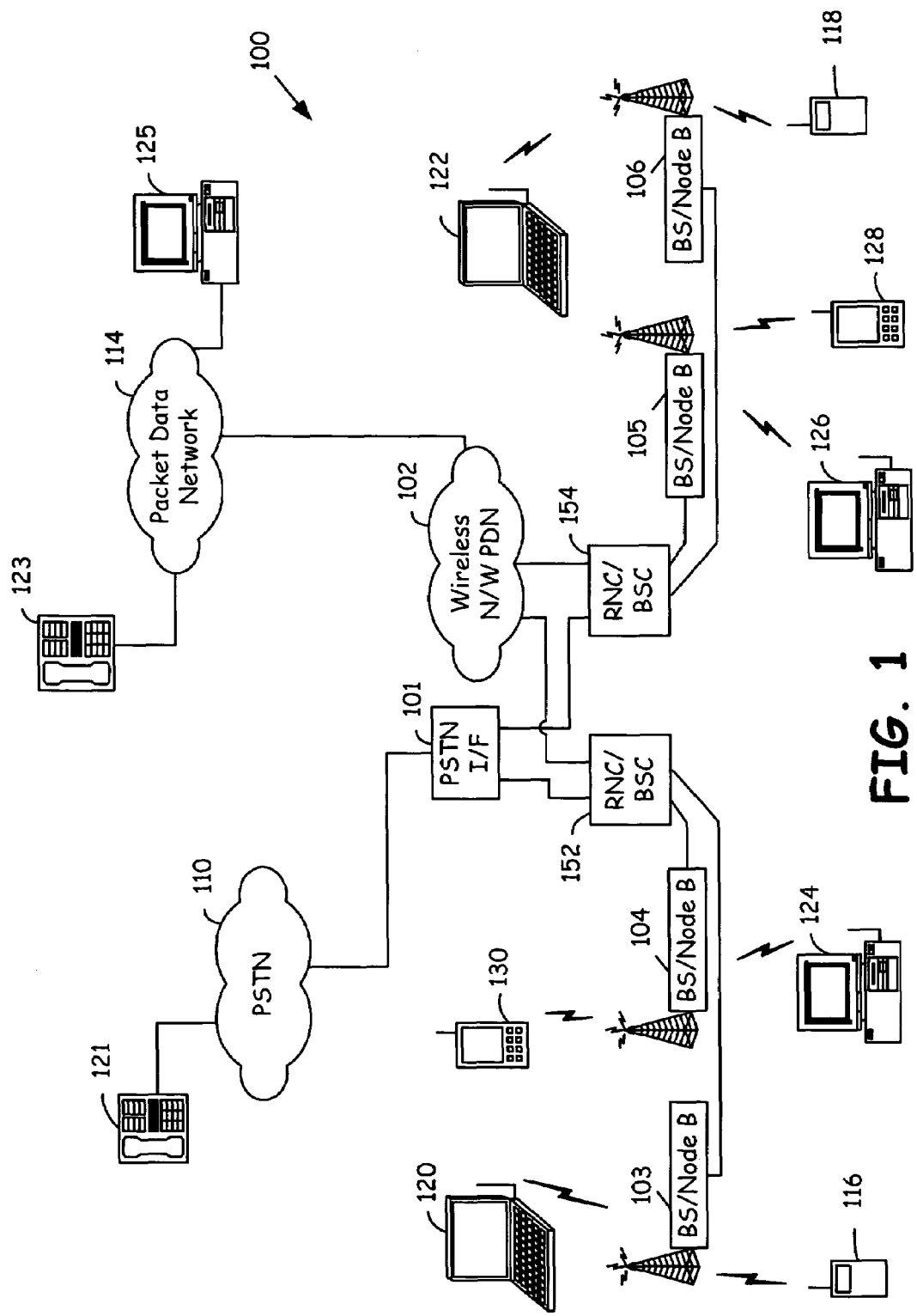
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Public Switched Telephone Network (PSTN) Interface 101, e.g., Mobile Switching Center, a wireless network packet data network 102 that includes GPRS Support Nodes, EDGE Support Nodes, WCDMA Support Nodes, and other components, Radio Network Controllers/Base Station Controllers (RNC/BSCs) 152 and 154, and base stations/node Bs 103, 104, 105, and 106. The wireless network packet data network 102 couples to additional private and public packet data networks 114, e.g., the Internet, WANs, LANs, etc. A conventional voice terminal 121 couples to the PSTN 110. A Voice over Internet Protocol (VoIP) terminal 123 and a personal computer 125 couple to the Internet/WAN 114. The PSTN Interface 101 couples to the PSTN 110. Of course, this particular structure may vary from system to system.

Each of the base stations/node Bs 103-106 services a cell/set of sectors within which it supports wireless communications. Wireless links that include both forward link components and reverse link components support wireless communications between the base stations and their serviced wireless terminals. These wireless links support digital data communications, VoIP communications, and digital multi-media communications. The cellular wireless communication system 100 may also be backward compatible in supporting analog operations as well. The cellular wireless communication system 100 supports one or more of the UMTS/WCDMA standards, the Global System for Mobile telecommunications (GSM) standards, the GSM General Packet Radio Service (GPRS) extension to GSM, the Enhanced Data rates for GSM (or Global) Evolution (EDGE) standards, one or more Wideband Code Division Multiple Access (WCDMA) standards, and/or various other CDMA standards, TDMA standards and/or FDMA standards, etc.

Wireless terminals 116, 118, 120, 122, 124, 126, 128, and 130 couple to the cellular wireless communication system 100 via wireless links with the base stations/node Bs 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet (packet data network) 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the EDGE operating standard, the GPRS standard, the UMTS/WCDMA standards, the HSDPA standards, the WCDMA standards, and/or the GSM standards. Further, some or all of the wireless terminals 116-130 are enabled to perform equalization operations of the present invention to support these high speed data operating standards.

Figure 2:
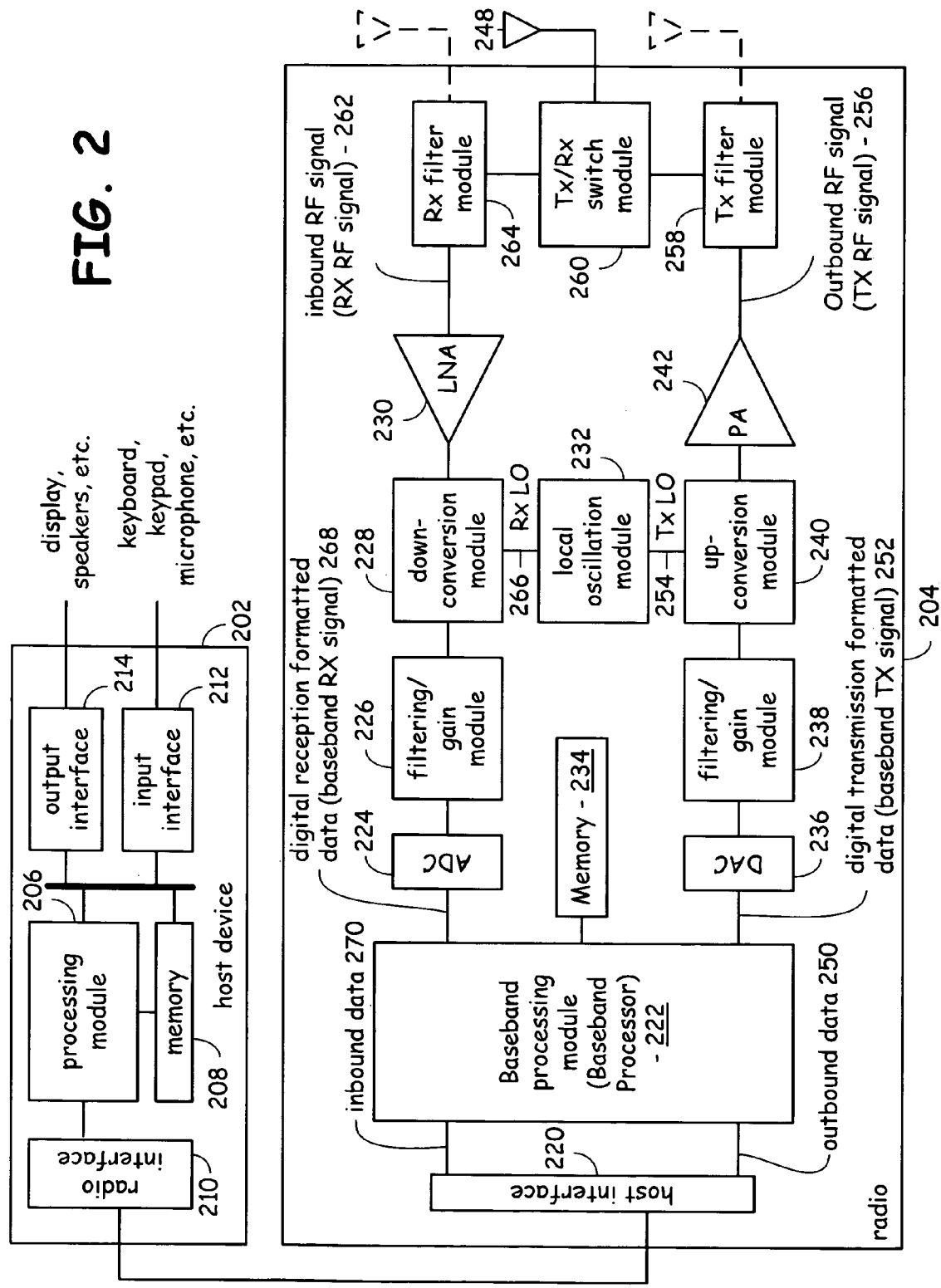
FIG. 2 is a block diagram functionally illustrating a wireless terminal constructed according to the present invention.

FIG. 2 is a block diagram functionally illustrating a wireless terminal constructed according to the present invention. The wireless terminal includes host processing components 202 and an associated radio 204. For cellular telephones, the host processing components and the radio 204 are contained within a single housing. In some cellular telephones, the host processing components 202 and some or all of the components of the radio 204 are formed on a single Integrated Circuit (IC). For personal digital assistants hosts, laptop hosts, and/or personal computer hosts, the radio 204 may reside within an expansion card or upon a mother board and, therefore, be housed separately from the host processing components 202. The host processing components 202 include at least a processing module 206, memory 208, radio interface 210, an input interface 212, and an output interface 214. The processing module 206 and memory 208 execute instructions to support host terminal functions. For example, for a cellular telephone host device, the processing module 206 performs user interface operations and executes host software programs among other operations.

The radio interface 210 allows data to be received from and sent to the radio 204. For data received from the radio 204 (e.g., inbound data), the radio interface 210 provides the data to the processing module 206 for further processing and/or routing to the output interface 214. The output interface 214 provides connectivity to an output display device such as a display, monitor, speakers, et cetera such that the received data may be displayed. The radio interface 210 also provides data from the processing module 206 to the radio 204. The processing module 206 may receive the outbound data from an input device such as a keyboard, keypad, microphone, et cetera via the input interface 212 or generate the data itself. For data received via the input interface 212, the processing module 206 may perform a corresponding host function on the data and/or route it to the radio 204 via the radio interface 210.

Radio 204 includes a host interface 220, baseband processing module 222 (baseband processor) 222, analog-to-digital converter 224, filtering/gain module 226, down conversion module 228, low noise amplifier 230, local oscillation module 232, memory 234, digital-to-analog. converter 236, filtering/gain module 238, up-conversion module 240, power amplifier 242, RX filter module 264, TX filter module 258, TX/RX switch module 260, and antenna 248. Antenna 248 may be a single antenna that is shared by transmit and receive paths (half-duplex) or may include separate antennas for the transmit path and receive path (full-duplex). The antenna implementation will depend on the particular standard to which the wireless communication device is compliant.

The baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling, and/or decoding,. The digital transmitter functions include, but are not limited to, encoding, scrambling, constellation mapping, modulation, and/or digital baseband to IF conversion. The transmit and receive functions provided by the baseband processing module 222 may be implemented using shared processing devices and/or individual processing devices. Processing devices may include microprocessors, microcontrollers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. The memory 234 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 222 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 204 receives outbound data 250 from the host processing components via the host interface 220. The host interface 220 routes the outbound data 250 to the baseband processing module 222, which processes the outbound data 250 in accordance with a particular wireless communication standard (e.g., UMTS/WCDMA, GSM, GPRS, EDGE, et cetera) to produce digital transmission formatted data 252. The digital transmission formatted data 252 is a digital base-band signal or a digital low IF signal, where the low IF will be in the frequency range of zero to a few kilohertz/megahertz.

The digital-to-analog converter 236 converts the digital transmission formatted data 252 from the digital domain to the analog domain. The filtering/gain module 238 filters and/or adjusts the gain of the analog signal prior to providing it to the up-conversion module 240. The up-conversion module 240 directly converts the analog baseband or low IF signal into an RF signal based on a transmitter local oscillation 254 provided by local oscillation module 232. The power amplifier 242 amplifies the RF signal to produce outbound RF signal 256, which is filtered by the TX filter module 258. The TX/RX switch module 260 receives the amplified and filtered RF signal from the TX filter module 258 and provides the output RF signal 256 signal to the antenna 248, which transmits the outbound RF signal 256 to a targeted device such as a base station 103-106.

The radio 204 also receives, an inbound RF signal 262, which was transmitted by a base station via the antenna 248, the TX/RX switch module 260, and the RX filter module 264. The low noise amplifier 230 receives inbound RF signal 262 and amplifies the inbound RF signal 262 to produce an amplified inbound RF signal. The low noise amplifier 230 provides the amplified inbound RF signal to the down conversion module 228, which converts the amplified inbound RF signal into an inbound low IF signal or baseband signal based on a receiver local oscillation 266 provided by local oscillation module 232. The down conversion module 228 provides the inbound low IF signal (or baseband signal) to the filtering/gain module 226, which filters and/or adjusts the gain of the signal before providing it to the analog to digital converter 224. The analog-to-digital converter 224 converts the filtered inbound low IF signal (or baseband signal) from the analog domain to the digital domain to produce digital reception formatted data 268. The baseband processing module 222 demodulates, demaps, descrambles, and/or decodes the digital reception formatted data 268 to recapture inbound data 270 in accordance with the particular wireless communication standard being implemented by radio 204. The host interface 220 provides the recaptured inbound data 270 to the host processing components 202 via the radio interface 210.

As the reader will appreciate, all components of the radio 204, including the baseband processing module 222 and the RF front end components may be formed on a single integrated circuit. In another construct, the baseband processing module 222 and the RF front end components of the radio 204 may be formed on separate integrated circuits. The radio 204 may be formed on a single integrated circuit along with the host processing components 202. In still other embodiments, the baseband processing module 222 and the host processing components 202 may be formed on separate integrated circuits. Thus, all components of FIG. 2 excluding the antenna, display, speakers, et cetera and keyboard, keypad, microphone, et cetera may be formed on a single integrated circuit. Many differing constructs integrated circuit constructs are possible without departing from the teachings of the present invention. According to the present invention, the baseband processing module 222 equalizes the digital transmission formatted data (baseband TX signal) 252 in a novel manner. Various techniques for performing these equalization operations will be described further herein with reference to FIGS. 3-25.

Figure 3:
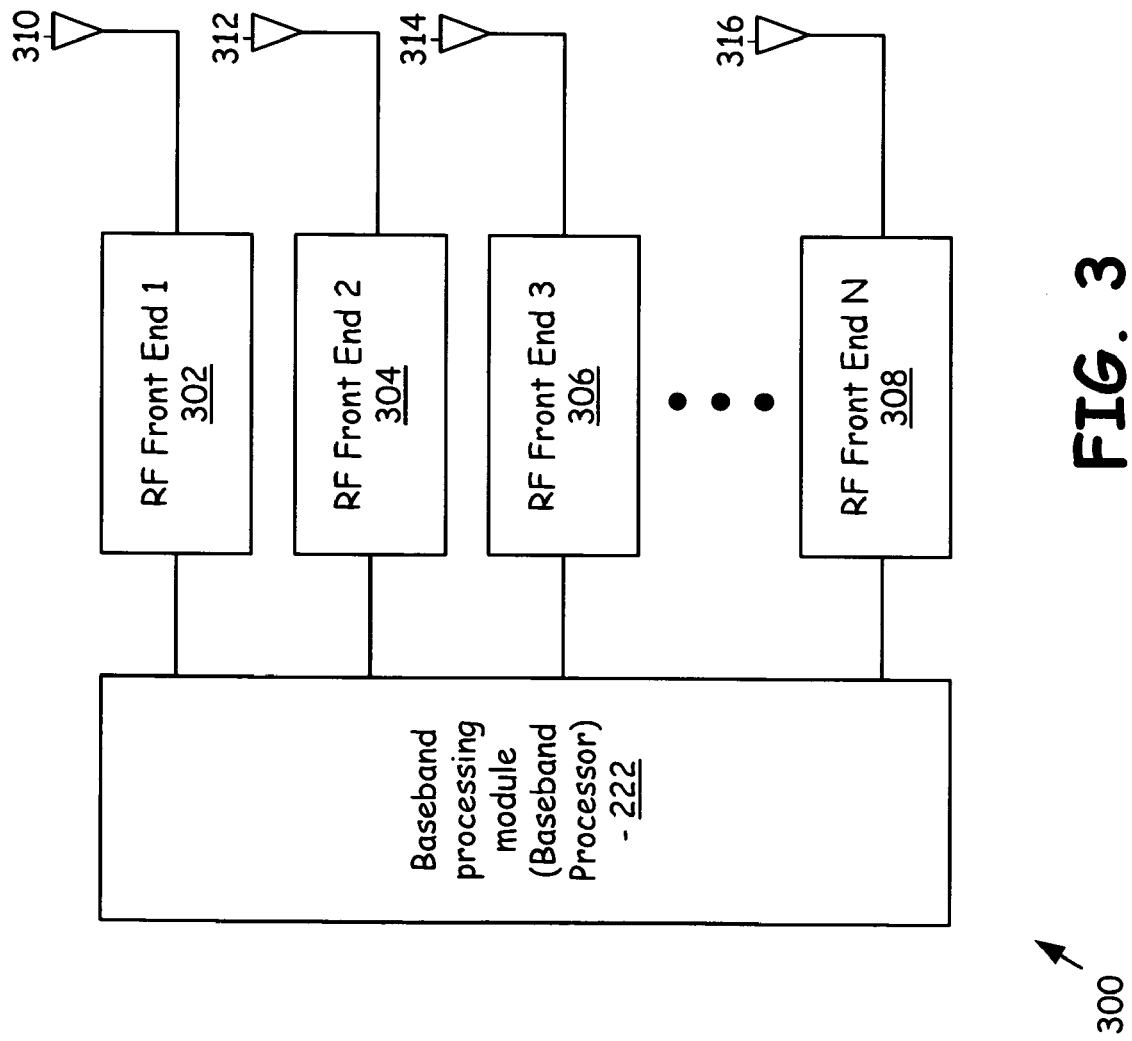
FIG. 3 is a block diagram illustrating a multiple Radio Frequency (RF) front end (receiver/transmitter) radio constructed according to an embodiment of the present invention.

FIG. 3 is a block diagram illustrating a multiple Radio Frequency (RF) front end (receiver/transmitter) radio 300 constructed according to an embodiment of the present invention. The radio 300 includes a baseband processing module 222 and a plurality of RF front ends, including RF front end 1 302, RF front end 2 304, RF front end 3 306, and RF front end N 308. These RF front ends 302, 304, 306, and 308 are serviced by antennas 310, 312, 318, and 316, respectively. The radio 300 may service a plurality of diversity paths of a single transmitted signal. Thus, in one simple embodiment of a diversity path implementation, the radio 300 includes a first RF front end 302, a second RF front end 304, and the baseband processing module 222. This embodiment will be described further with reference to FIG. 5. Alternately, the plurality of RF front ends 302-308 may service Multiple Input Multiple Output (MIMO) communications, each RF front end 302-308 assigned a respective MIMO data path. MIMO communications are currently implemented in WLAN implementations such as IEEE 802.11n. In either case, the principles of the present invention may be applied to a radio 300 having two or more RF front ends.

Figure 4:
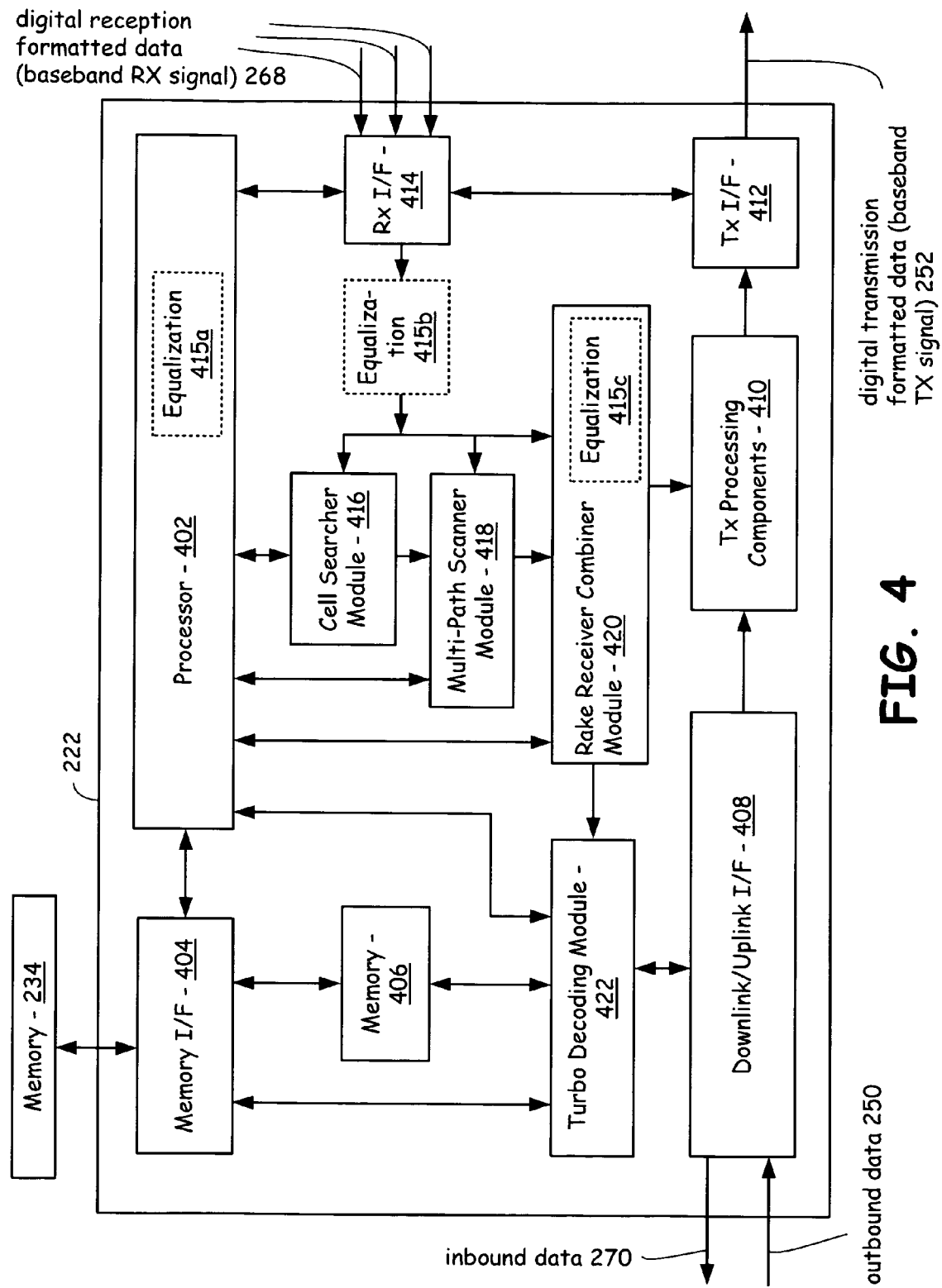
FIG. 4 is a block diagram illustrating components of a baseband processing module according to embodiments of the present invention.

FIG. 4 is a block diagram illustrating components of a baseband processing module 222 according to an embodiment of the present invention. The baseband processing module (baseband processor) 222 includes a processor 402, a memory interface 404, onboard memory 406, a downlink/uplink interface 408, TX processing components 410, and a TX interface 412. The baseband processing module 222 further includes an RX interface 414, a cell searcher module 416, a multi-path scanner module 418, a rake receiver combiner 420, and a turbo decoding module 422. The baseband processing module 222 couples in some embodiments to external memory 234. However, in other embodiments, memory 406 fulfills the memory requirements of the baseband processing module 402.

As was previously described with reference to FIG. 2, the baseband processing module receives outbound data 250 from coupled host processing components 202 and provides inbound data 270 to the coupled host processing components 202. Further, the baseband processing module 222 provides digital formatted transmission data (baseband TX signal) 252 to a coupled RF front end. The baseband processing module 222 receives digital reception formatted data (baseband RX signal) 268 from the coupled RF front end. As was previously described with reference to FIG. 2, an ADC 222 produces the digital reception formatted data (baseband RX data) 268 while the DAC 236 of the RF front end receives the digital transmission formatted data (baseband TX signal) 252 from the baseband processing module 222.

According to the particular embodiment of the present invention illustrated in FIG. 4, the downlink/uplink interface 408 is operable to receive the outbound data 250 from coupled host processing components, e.g., the host processing component 202 via host interface 220. Further, the downlink/uplink interface 408 is operable to provide inbound data 270 to the coupled host processing components 202 via the host interface 220. TX processing component 410 and TX interface 412 communicatively couple to the RF front end as illustrated in FIG. 2 and to the downlink/uplink interface 408. The TX processing components 410 and TX interface 412 are operable to receive the outbound data from the downlink/uplink interface 404, to process the outbound data to produce the baseband TX signal 252 and to output the baseband TX signal 252 to the RF front end as was described with reference to FIG. 2. RX processing components including the RX interface 414, rake receiver combiner 420 and in some cases the processor 402 are operable to receive the RX baseband signal 268 from the RF front end.

Equalization processing operations implemented in an RF receiver according to the present invention may be implemented by one or more of the components of the baseband processing module 222. In a first construct, the equalization operations are implemented as equalization operations 415a by processor 402. The equalization operations 415a may be implemented in software, hardware, or a combination of software and hardware. When the equalization operations 415a are implemented by software instructions, the processor 402 retrieves instructions via memory interface 404 and executes such software instructions to implement the equalization operations 415a.

In another construct, a dedicated equalization block 415b resides between the RX interface 414 and modules 416, 418, and 420 and performs the equalization operations of the present invention. With this construct, the equalization operations 415b may be implemented via hardware, software, or a combination of hardware and software. In another construct of the equalization operations according to the present invention, the equalization operations 415c are performed within rake receiver combiner module 420 by equalization operations 415c. The equalization operations 415c may be implemented via hardware, software, or a combination of these to execute the equalization operations of the present invention.

As is further shown in FIG. 4, the digital reception formatted data 268 may include a plurality of signal paths. Each one of these signal paths may be received from a respective RF front end such as was illustrated in FIG. 3 and described there with. Thus, each of the digital reception formatted data versions 268 may be a different multi-path version of a single received signal or different RF signal such as in a MIMO system.

Figure 5:
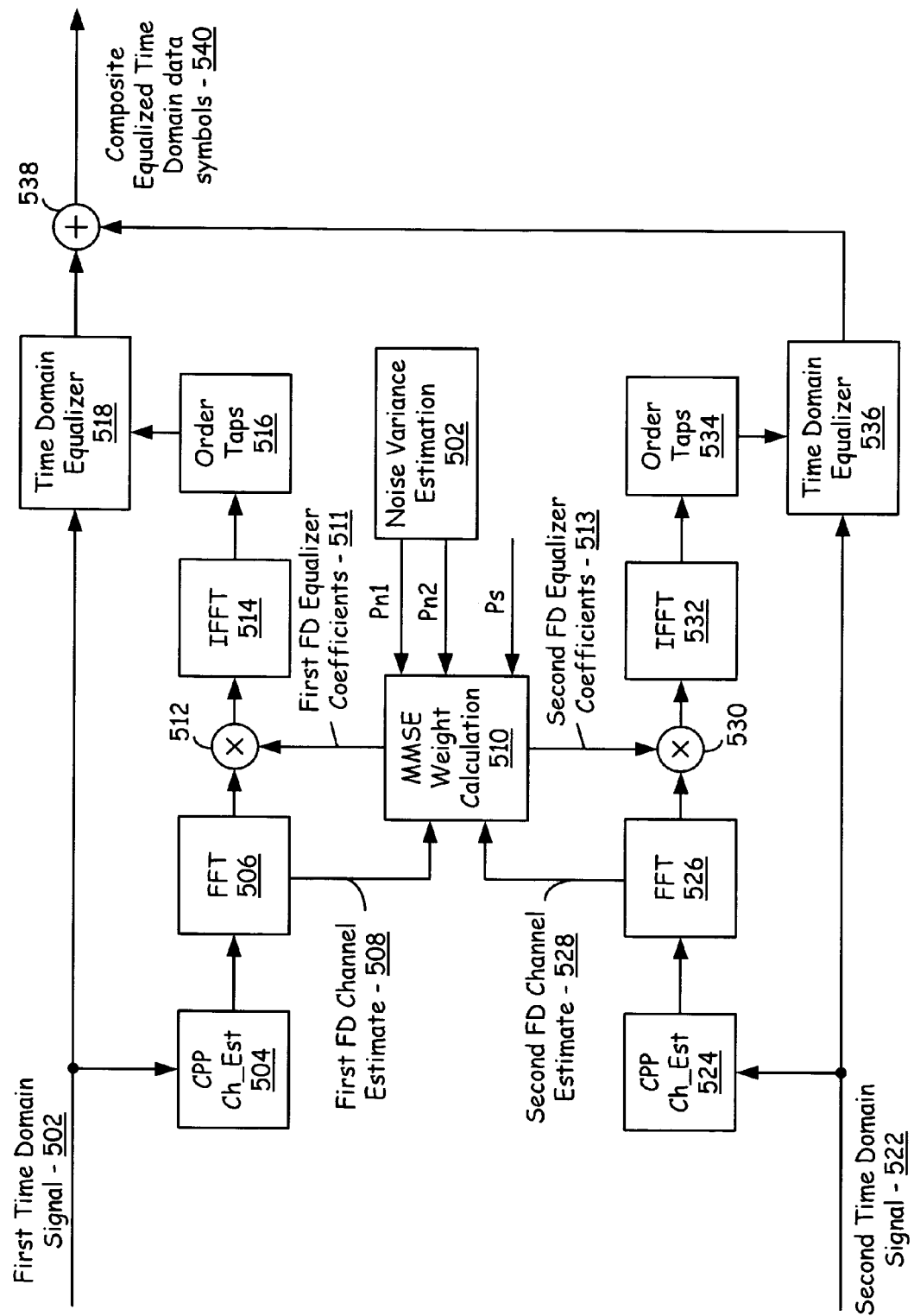
FIG. 5 is a block diagram illustrating equalization components of a baseband processing module according to an embodiment of the present invention.

FIG. 5 is a block diagram illustrating equalization components of a baseband processing module according to an embodiment of the present invention. These components of the baseband processing module 222 perform equalization operations according to the present invention. Of course, a baseband processing module 222 would include additional components in addition to as those illustrated in FIG. 5. The functional blocks of FIG. 5 may be implemented in dedicated hardware, general purpose hardware, software, or a combination of dedicated hardware, general purpose hardware, and software.

The components of the baseband processing module 222 of FIG. 5 include first diversity path components, second diversity path components, and shared components. As was described with reference to FIG. 3, an RF transceiver (transmitter/receiver), may include a plurality of receive signal paths. The plurality of receive signal paths may include components that operate upon different multi-path versions of a single transmitted signal or upon signals that include different data. According to the embodiment of FIG. 5, the functional components operate upon different multi-path versions of a single RF transmitted time domain signal.

The first diversity path component includes a cluster path processor/channel estimation block 504, a Fast Fourier Transform (FFT) block 506, multiplier 512, Inverse Fast Fourier Transform (IFFT) block 514, tap ordering block 516, and time domain equalizer 518. The second diversity path components include cluster path processing/channel estimation block 524, FFT block 526, multiplier 530, IFFT block 532, tap ordering block 534, and time domain equalizer 536. The shared processing blocks of the RF receiver of FIG. 5 include a Minimum Mean Square Error (MMSE) weight calculation block 510, a noise variance estimation block 502, and a combiner 538.

In its operations, the first diversity path operates upon a first time domain signal 502. The first time domain signal 502 includes first time domain training symbols and first time domain data symbols. As is generally known, frames of transmitted symbols in an RF system typically include a preamble that has training symbols and a payload portion that carries data symbols. The training symbols are used by channel estimation operations to produce equalizer coefficients that are then used for equalization of the data symbols. The CPP/channel estimation block 504 is operable to process the first time domain training symbols of the first time domain signal 502 to produce a first time domain channel estimate 508. The FFT block 506 is operable to invert the first time domain channel estimate to the frequency domain to produce a first frequency domain channel estimate 508.

Likewise, the second diversity path is operable to receive a second time domain signal 522 that includes second time domain training symbols and second time domain data symbols. The CPP/channel estimation block 524 is operable to process the second time domain training symbols to produce a second time domain channel estimate. The FFT block 526 is operable to convert the second time domain channel estimate to the frequency domain to produce a second frequency domain channel estimate 528.

The MMSE/weight calculation block 510 is operable to receive noise variance estimation parameters from noise variance estimation block 502 and to produce first frequency domain equalizer coefficients 511 and second frequency domain equalizer coefficients 513 based upon the first frequency domain channel estimate 508 and the second frequency domain channel estimate 528. The operations of the noise variation estimation block 502 will be described further herein with reference to FIGS. 19-25.

Referring again to the first diversity path, the multiplier 512 is operable to multiply an output of FFT block 506 with the first frequency domain equalizer coefficients 511. However, in another embodiment, the multiplier 518 simply passes through the first frequency domain equalizer coefficients 511. Then, the IFFT block 514 is operable to convert the first frequency domain equalizer coefficients 511, as operated upon by multiplier 512, to the time domain to produce first time domain equalizer coefficients. Next, the tap ordering block 516 is operable to order the first time domain equalizer coefficients to produce tap ordered time domain equalizer coefficients to the time domain equalizer 518. Time domain equalizer 518 is operable to equalize the first time domain data symbols using the first time domain equalizer coefficients received from tap ordering block 516.

Referring again to the second diversity path, the multiplier 530 is operable to multiply the second frequency domain equalizer coefficients 513 with an output received from FFT block 526. In another embodiment, the multiplier block 530 is operable to simply pass through the second frequency domain equalizer coefficients 513. The IFFT block 532 is operable to convert its input from the frequency domain to the time domain to produce second time domain equalizer coefficients. The tap ordering block 534 is operable to tap order the second time domain equalizer coefficients to produce an output of time domain equalizer. The time domain equalizer 536 is operable to equalize the second time data symbols using the second time domain equalizer coefficients. Finally, combiner 538 is operable to combine the equalized first time domain data symbols received from the first time domain equalizer 518 and the second equalized time domain data symbols received from time domain equalizer 536 to produce a composite time domain data symbols 540.

According to another aspect of the baseband processing module 222 of FIG. 5, the CPP/channel estimation block 504 is operable to cluster path process the first time domain training signals of the first time domain signal 502. Cluster path processing (CPP) is an operation that processes multi-path signal components that are relatively close to one another in time. A complete description of how cluster path processing is performed is described in co-pending patent application Ser. No. 11/173,854 filed Jun. 30, 2005 and entitled METHOD AND SYSTEM FOR MANAGING, CONTROLLING, AND COMBINING SIGNALS IN A FREQUENCY SELECTIVE MULTIPATH FADING CHANNEL, which is incorporated herein by reference in its entirety. With the cluster path processing operations completed, the CPP/channel estimation block 504 is operable to produce the first time domain channel estimate based upon cluster path processed first time domain training symbols. Further, with the second diversity path, the CPP/channel estimation block 522 may be operable to cluster path process the second time domain training symbols of the second time domain signal 522. Then, the CPP/channel estimation block 524 is operable to produce the second time domain channel estimate based upon the cluster path process second time domain training symbols.

In its operations, the MMSE weight calculation block 510 is operable to perform a MMSE algorithm on the first frequency domain equalizer coefficients 508 and the second frequency domain equalizer coefficients 528 to produce the first frequency domain equalizer coefficients 511 and the second frequency domain equalizer coefficients 513. One implementation of these operations is described below. Other operations may be used to generate equalizer coefficients according to the present invention that differ from those described below.

With the particular implementation described herein, in the time domain, a matrix signal model at each antenna servicing the dual diversity path structure of FIG. 5 may be characterized as:

$$y_i = H_i x + n_i \quad i=1,2 \tag{Eq. 1}$$

The channel matrix $H_i$ can be modeled as a circulant matrix which satisfies $$H_1 = F^{-1} \Lambda_1 F; \quad H_2 = F^{-1} \Lambda_2 F \tag{Eq. 2}$$

where F is the orthogonal discrete Fourier transform matrix.

By multiplying by matrix F at both sides of the Eq. (1), a frequency domain channel model is represented as:

$$Y_i = F y_i = \Lambda^i X + N_i \tag{Eq. 3}$$

where $X = Fx$; $N_i = Fn_i$ $i=1,2$

The channel model may be considered at the k-th subcarrier in the frequency domain as:

$$Y[k] = \Lambda_k X[k] + N[k] \tag{Eq. 4}$$

where $$Y[k] = \begin{bmatrix} Y_1[k] \\ Y_2[k] \end{bmatrix}, \Lambda_k = \begin{bmatrix} \Lambda_k^1 \\ \Lambda_k^2 \end{bmatrix} \text{ and } N[k] = \begin{bmatrix} N_1[k] \\ N_2[k] \end{bmatrix} \tag{Eq. 5}$$

are 2×1 vectors.

The MMSE optimum weight at the k-th subcarrier is therefore represented by:

$$C[k] = E(Y[k]^* Y[k]^T)^{-1} E(Y[k]^* X) \tag{Eq. 6}$$

$$= (\Lambda_k^* \Lambda_k^T + C_{nn})^{-1} \Lambda_k$$

Thus, the estimated transmitted signal is given as $$\hat{X}[k] = C[k]^H Y[k] = \frac{\frac{(n1*\Lambda_k^{1*}Y_1[k])}{am1} + \frac{n2*\Lambda_k^{2*}Y_2[k]}{am2}}{|\Lambda_k^1|^2 n2 + |\Lambda_k^2|^2 n1 + n1n2} \quad \text{(Eq. 7)}$$

After simplifying Eq (7), the MMSE-FDE weight(s) for dual diversity path configuration of FIG. 5 is given as:

$$C_k^i = \frac{\left(\frac{\sigma_s}{\sigma_n^i}\right)^2 \Lambda_k^{i*}}{1 + \sum_{l=1}^{2}\left(\frac{\sigma_s}{\sigma_n^l}\right)^2|\Lambda_k^l|^2}; i=1,2\ k=1,2\ldots N \quad \text{(Eq. 8)}$$

The time domain signal after Equalization is given by:

$$z = F^{-1}CY \quad \text{(Eq. 9)}$$
$$= \underbrace{F^{-1}C^1\Lambda_1 FH_1 x}_{\text{FD\_EQ1}} + \underbrace{F^{-1}C^2\Lambda_2 FH_2 x}_{\text{FD\_EQ2}} +$$
$$F^{-1}C^1 N_1 + F^{-1}C^2 N_2$$

$$z = F^{-1}CY \quad \text{(Eq. 10)}$$
$$= \underbrace{F^{-1}(C^1) \otimes y}_{\text{Proposed\_EQ1}} + \underbrace{F^{-1}(C^2) \otimes y}_{\text{Proposed\_EQ2}} +$$
$$F^{-1}C^1 N_1 + F^{-1}C^2 N_2$$

Figure 6:
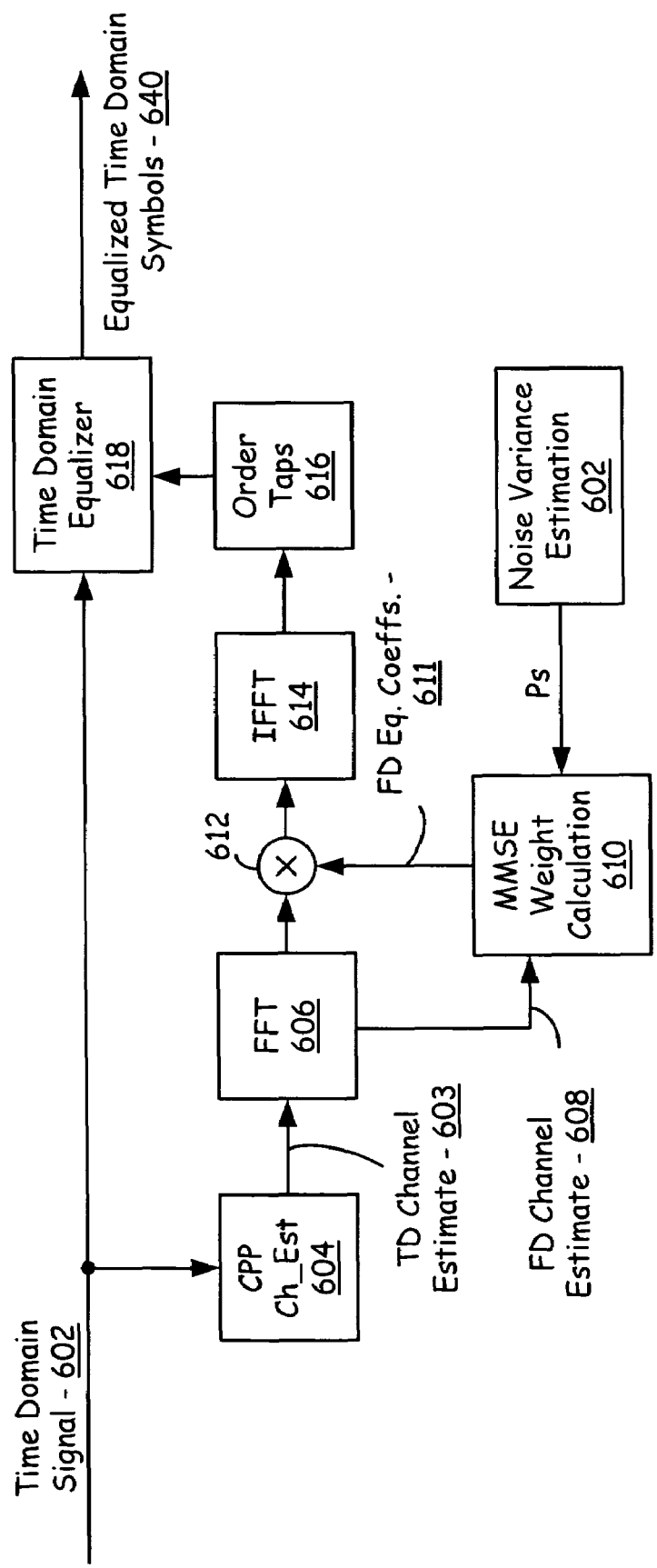
FIG. 6 is a block diagram illustrating equalization components of a baseband processing module according to an embodiment of the present invention.

FIG. 6 is a block diagram illustrating equalization components of a baseband processing module according to an embodiment of the present invention. The components of the baseband processing module 222 are operable to receive a time domain signal 602 from an RF front end such as was illustrated in FIG. 2. The time domain signal 602 includes time domain training symbols and time domain data symbols. The components of FIG. 6 include channel estimation block 604, an FFT block 606, a weight calculator block 610, an IFFT block 614, a tap ordering block 616, and a time domain equalizer 618. The channel estimation block 604 is operable to process the time domain training symbols of the time domain signal 602 to produce a time domain channel estimate 603. The FFT block 606 is operable to convert the time domain channel estimate 603 to the frequency domain to produce a frequency domain channel estimate 608. The weight calculation block 610 is operable to produce frequency domain equalizer coefficients based upon the frequency domain channel estimate 608 and noise variation estimation received from noise variation estimation block 602. The operations of the noise variation estimation block 602 will be described further herein with reference to FIGS. 19-25. Multiplier 612 receives the frequency domain equalizer coefficient 611 and the receiving input from the FFT block 606. The multiplier 612 produces an output to IFFT block 614 that converts the frequency domain equalizer coefficient 611, as may have been modified by multiplier 612, to produce time domain equalizer coefficients. Tap ordering block 616 tap orders the time domain equalizer coefficients and produces the tap ordered time domain equalizer coefficients to time domain equalizer 616. The time domain equalizer 616 is operable to equalize the time domain data symbols of the time domain signal 602 using the time domain equalizer coefficients to produce equalized time domain symbols 640.

The channel estimation block 604 may also perform cluster path processing operations as were previously described with reference to FIG. 5. When performing cluster path processing operations to produce the time domain training symbols, the CPP/channel estimation block 604 may produce the time domain channel estimate based upon the cluster path processed time domain training symbols. The MMSE weight calculation block 610 may perform MMSE algorithm on the frequency domain equalizer coefficients to produce the frequency domain equalizer coefficients.

Figure 7:
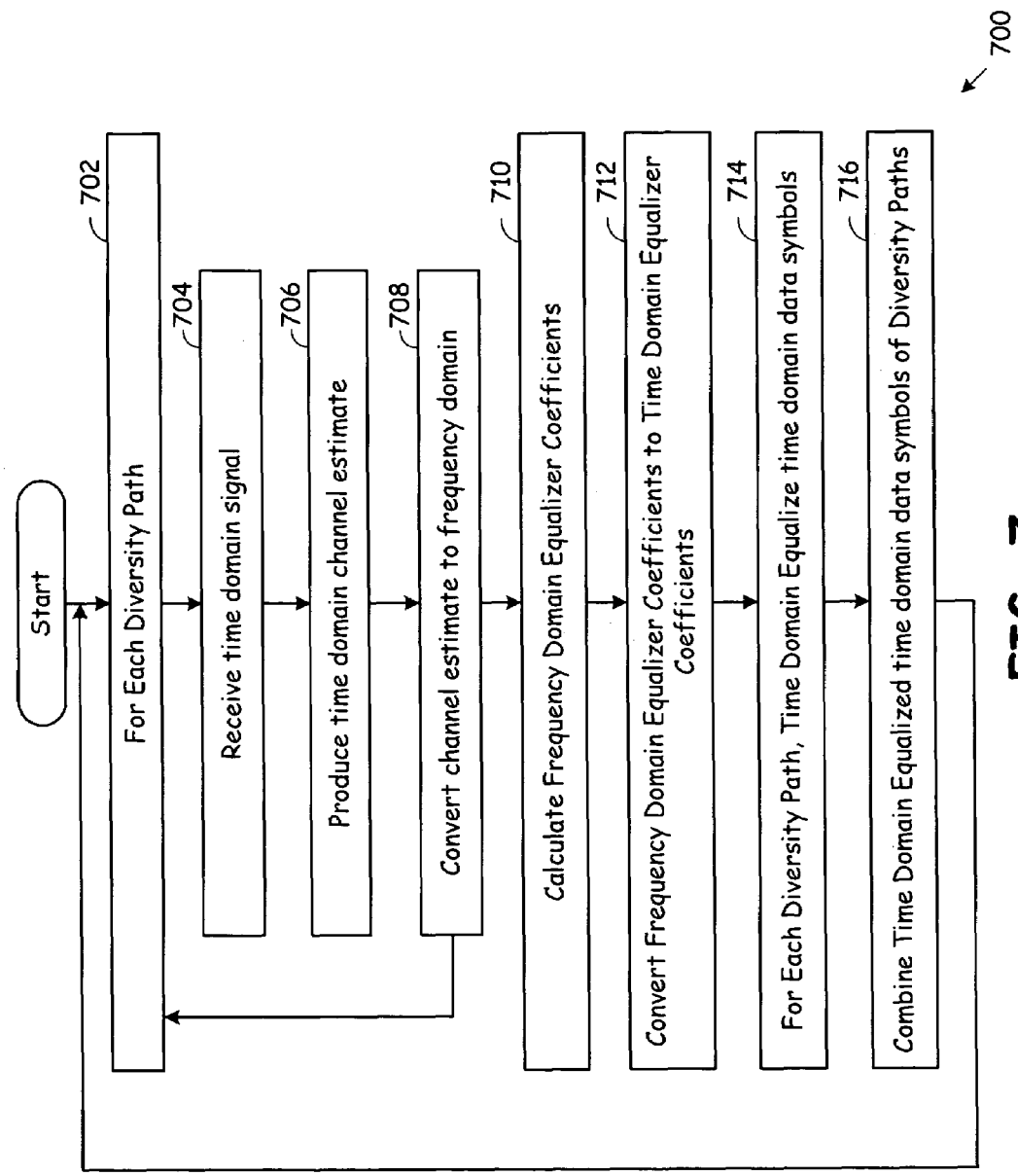
FIG. 7 is a flow chart illustrating equalization operations according to an embodiment of the present invention.

FIG. 7 is a flow chart illustrating equalization operations according to an embodiment of the present invention. The operation 700 commences with operations for each of at least two diversity paths (Step 702). As was previously described with reference to FIG. 3, a radio may include a plurality of RF front ends 302-308, each servicing a respective diversity path. Thus, referring again to FIG. 7, operations 704-708 are performed for each diversity path. In particular, for each diversity path, the baseband processing module receives a corresponding time domain signal that includes corresponding time domain training symbols and corresponding time domain data symbols.

With reference to a first diversity path, operation includes receiving a first time domain signal that includes first time domain training symbols and first time domain data symbols. Operation then includes processing the first time domain training symbols to produce a first time domain channel estimate (Step 706). Further, operation includes converting the time domain channel estimate to the frequency domain to produce a first frequency domain channel estimate (Step 708).

With respect to a second diversity path, operation includes receiving a second time domain signal that includes second time domain training symbols and second time domain data symbols (Step 704). Operation for the second diversity path further includes processing the second time domain training symbols to produce a second time domain channel estimate (Step 706). Further, operation includes converting the second time domain channel estimate to the frequency domain to produce a second frequency domain channel estimate (Step 708).

When the operations of Steps 702-708 have been completed for each diversity path, operation proceeds to Step 710 where frequency domain equalizer coefficients are produced for each of a plurality of diversity paths. For the particular example of the structure of FIG. 5 that includes two diversity paths, the operation at Step 710 includes producing first frequency domain equalizer coefficients and second frequency domain equalizer coefficients based upon the first frequency domain channel estimate and the second frequency domain channel estimate. Operation then includes converting the frequency domain equalizer coefficients to time domain equalizer coefficients (Step 712). For the particular case of a first and a second diversity path, the operation at Step 712 would include converting the first frequency domain equalizer coefficients to the time domain to produce first time domain equalizer coefficients and converting the second frequency domain equalizer coefficients to the time domain to produce second time domain equalizer coefficients.

Operation then includes, for each diversity path, time domain equalizing respective time domain data symbols (Step 714). For the particular case of a first and a second diversity path, the operations of Step 714 include equalizing the first time domain data symbols using the first time domain equalizer coefficients and equalizing the second time domain data symbols using the second time domain equalizer coefficients. Finally, operation includes combining the equalized time domain data symbols from a plurality of diversity paths (Step 716). For the particular case of the first and second diversity paths, the operation of Step 716 includes combining the equalized first time domain data symbols and the second equalized time domain data symbols to produce composite time domain data symbols.

The operations 702-716 are repeated each time new equalizer coefficients are produced based upon received physical layer frames that include training symbols. In many RF receivers, the operations 700 of FIG. 7 are repeated for each received physical layer frame. However, in other embodiments, channel estimation is performed periodically based upon detected changes of channel conditions or when a time constraint is met.

The operations at Step 706 may include cluster path processing as has been previously described. When cluster processing is performed, the time domain channel estimate include cluster path processed time domain training symbols. Fast Fourier transformations are employed in converting from the time domain to the frequency domain while Inverse Fast Fourier transformations are to employed to convert from the frequency domain to the time domain. The operations at Step 710 may include using an MMSE algorithm to produce the frequency domain equalizer coefficients based upon the channel estimates received. The operations of FIG. 7 may support various types of systems including cellular wireless communication systems, wireless metropolitan area communication systems (such as the WiMAX) standards, WLAN communication operations, and WPAN communication operations.

Figure 8:
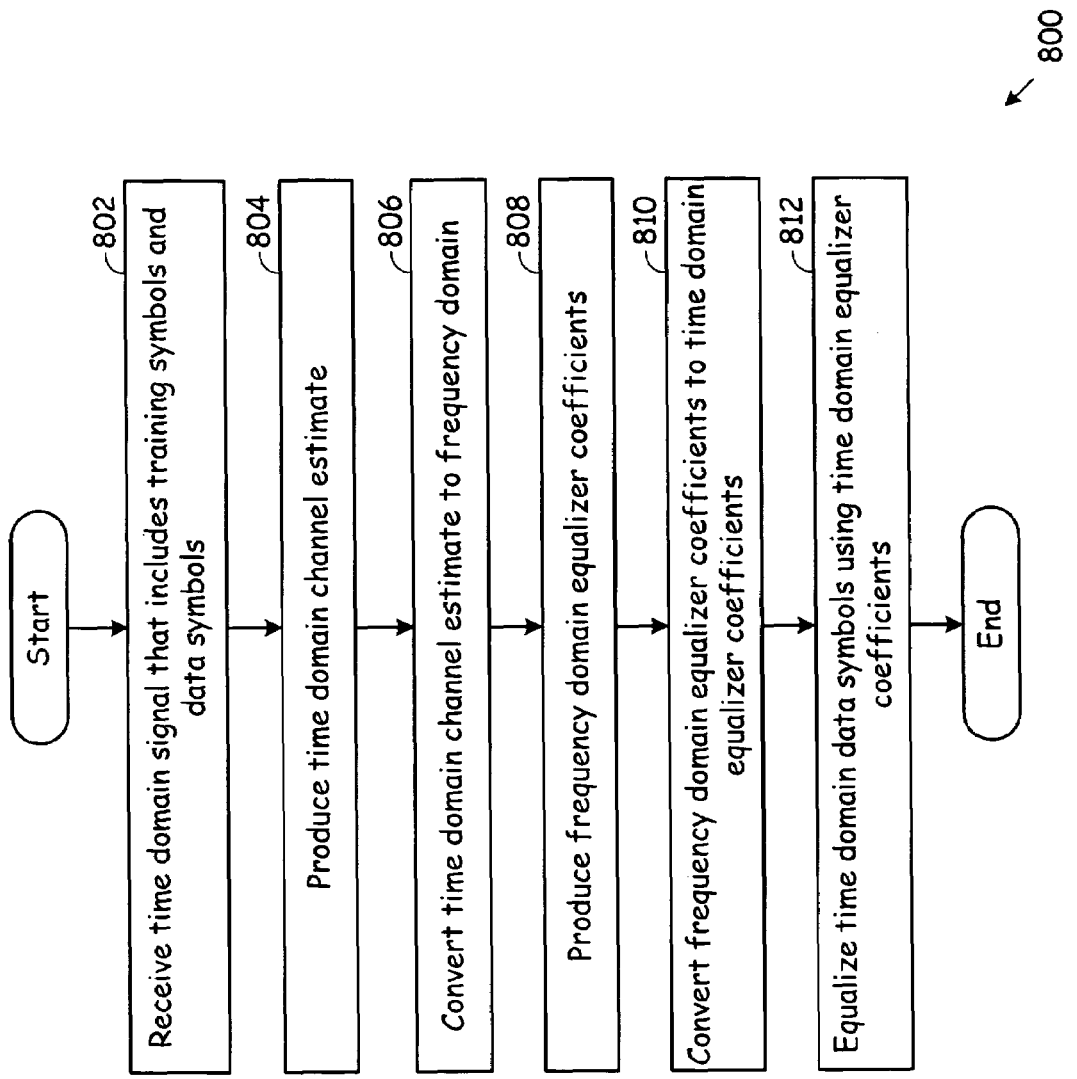
FIG. 8 is a flow chart illustrating equalization operations according to an embodiment of the present invention.

FIG. 8 is a flow chart illustrating equalization operations according to an embodiment of the present invention. Operation 800 includes first receiving a time domain signal that includes time domain training symbols and time domain data symbols (Step 802). Operation continues with processing the time domain training symbols to produce a time domain channel estimate (Step 804). Operation continues with converting the time domain channel estimate to the frequency domain to produce a frequency domain channel estimate (Step 806).

Operation further includes producing frequency domain equalizer coefficients based upon the frequency domain channel estimate produced at Step 806 (Step 808). Then, operation includes converting the frequency domain equalizer coefficients to the time domain to produce time domain equalizer coefficients (Step 810). Operation concludes with equalizing the time domain data symbols using the time domain equalizer coefficients produced at Step 810 (Step 812). From Step 812 operation ends. Of course, the operations 800 of FIG. 8 may be repeated for each received physical layer frame that includes training symbols and data symbols. The various specific implementations that were previously described with FIGS. 1-7 may be employed with the operations 800 of FIG. 8 as well and will not be described herein further with respect to FIG. 8.

Figure 9:
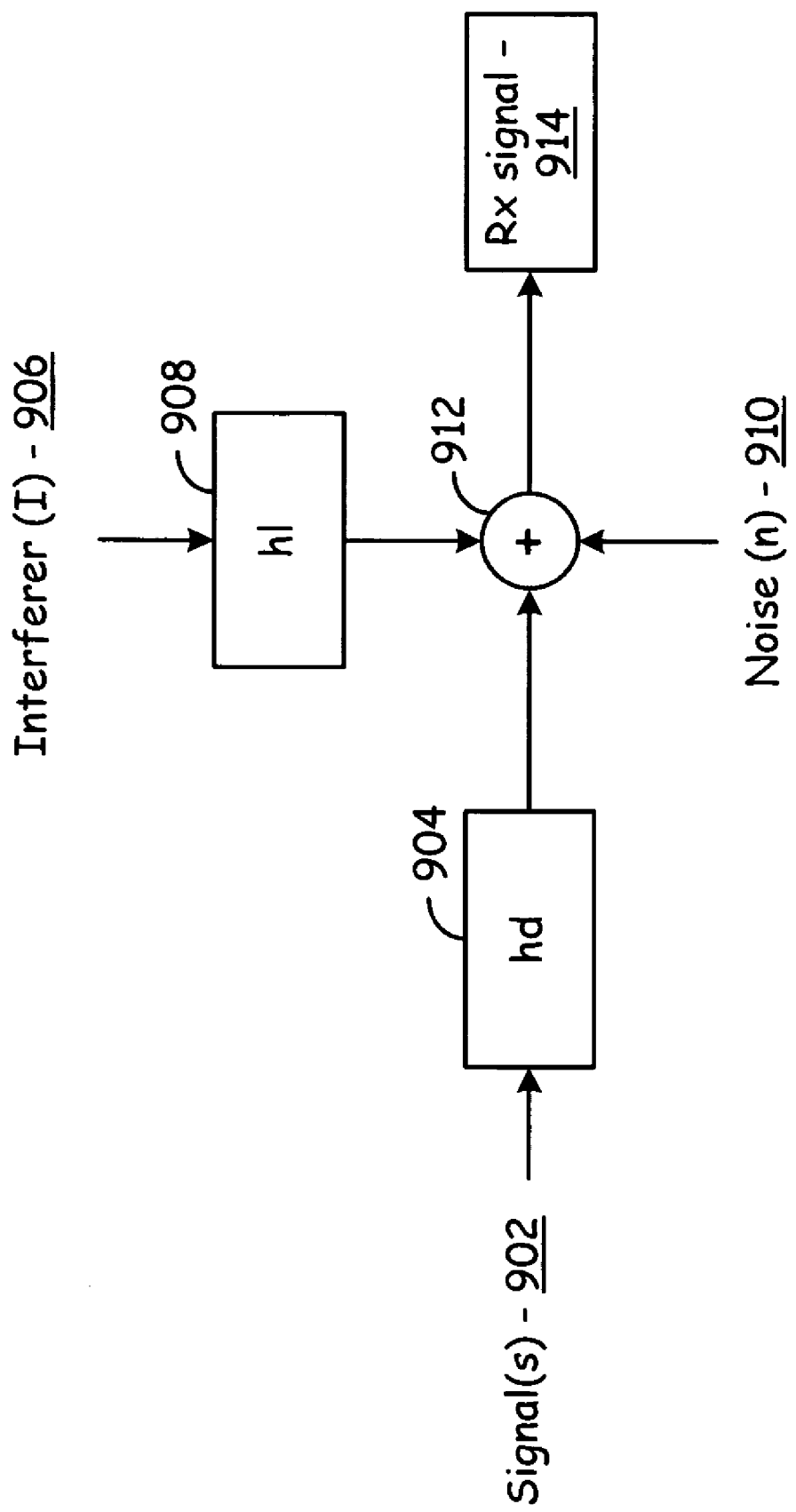
FIG. 9 is a block diagram illustrating a composite signal model upon which equalization operations according to an embodiment of the present invention operate.

FIG. 9 is a block diagram illustrating a composite signal model upon which equalization operations according to an embodiment of the present invention operate. According to the channel model of FIG. 9, a desired signal 902 and a dominate interfering signal 906 are operated upon by an RF signal. With the model of FIG. 9, the RF receiver receives and RX signal 914 that is the combination of the desired signal that has been operated upon by desired signal channel 904, the interfering signal 906 that has been operated upon by interfering signal channel 908, and noise 910, all of these additive (represented by adder 912). According to the present invention, equalizer coefficients are generated that substantially/full cancel the component of the RX signal 914 caused by the interfering signal 906.

In a one dominated interferer case, the signal model at the k-subcarrier of the RX signal 914 in the frequency domain is given by:

$$Y[k]=H_d[k]S+H_1[k]I+N \qquad (\text{Eq. 11})$$

Structures and methodologies for removing some/all of the interfering signal by an equalizer constructed according to embodiments of the present invention will be described further herein with reference to FIGS. 10-13

Figure 10:
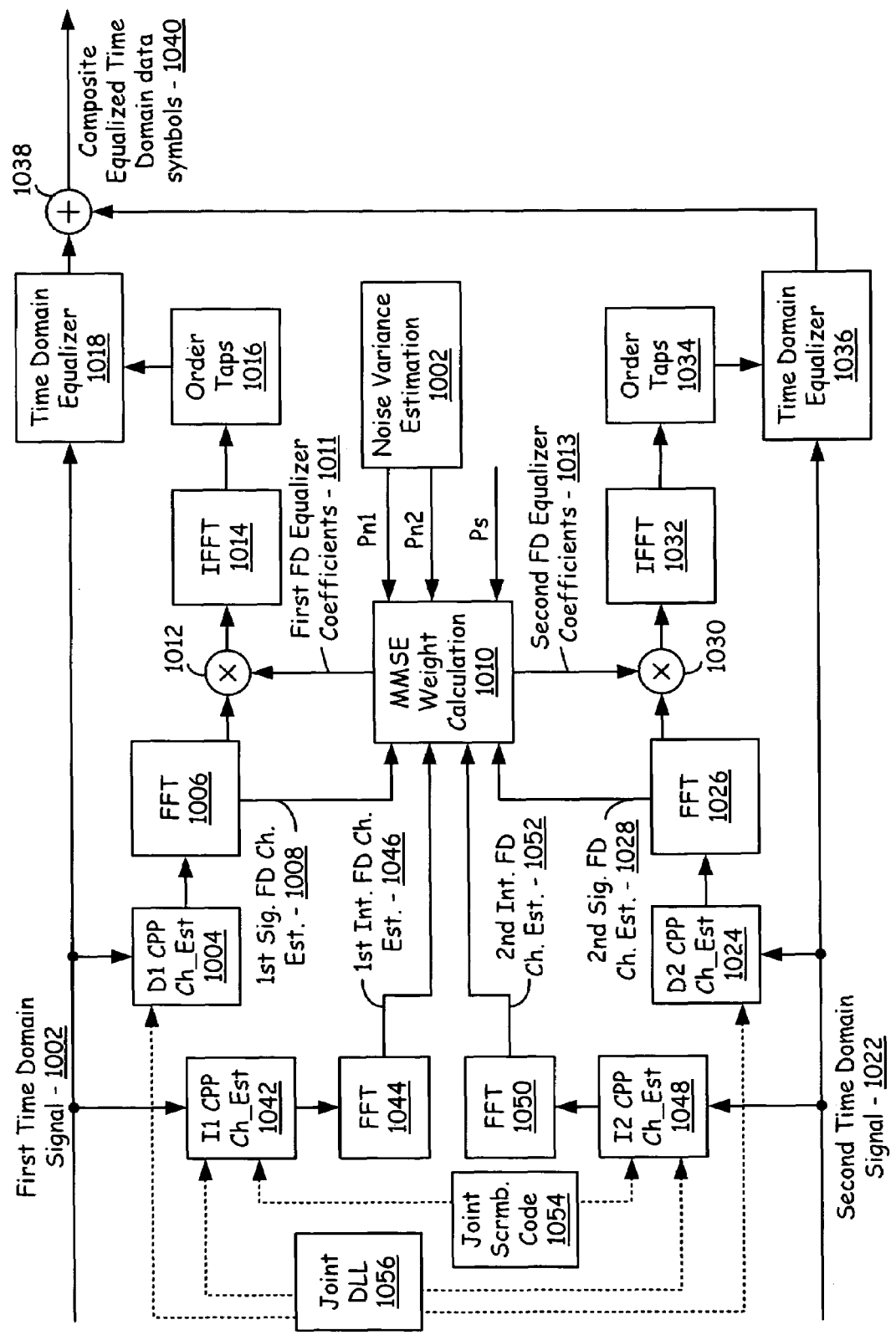
FIG. 10 is a block diagram illustrating equalization components of a baseband processing module according to an embodiment of the present invention.

FIG. 10 is a block diagram illustrating equalization components of a baseband processing module according to an embodiment of the present invention. These components of the baseband processing module 222 perform equalization operations according to the present invention. Of course, a baseband processing module 222 would include additional components in addition to as those illustrated in FIG. 10. The functional blocks of FIG. 10 may be implemented in dedicated hardware, general purpose hardware, software, or a combination of dedicated hardware, general purpose hardware, and software.

The components of the baseband processing module 222 of FIG. 10 include first diversity path components, second diversity path components, and shared components. As was described with reference to FIG. 3, an RF transceiver (transmitter/receiver), may include a plurality of receive signal paths. The plurality of receive signal paths may include components that operate upon different multi-path versions of a single transmitted signal or upon signals that include different data. According to the embodiment of FIG. 10, the functional components operate upon different multi-path versions of a single RF transmitted time domain signal.

The first diversity path component includes a desired signal cluster path processor/channel estimation block 1004, an interfering signal cluster path processor/channel estimation block 1042, a Fast Fourier Transform (FFT) block 1006, a Fast Fourier Transform (FFT) block 1044, multiplier 1012, Inverse Fast Fourier Transform (IFFT) block 1014, tap ordering block 1016, and time domain equalizer 1018. The second diversity path components include desired signal cluster path processing/channel estimation block 1024, interfering signal cluster path processing/channel estimation block 1048, FFT block 1026, FFT block 1050, multiplier 1030, IFFT block 1032, tap ordering block 1034, and time domain equalizer 1036.

The shared processing blocks of the RF receiver of FIG. 10 include a joint Delay Locked Loop (DLL) 1056, joint scrambling and code tracking for interference block 1054, a Minimum Mean Square Error (MMSE) weight calculation block 1010, a noise variance estimation block 1002, and a combiner 1038. Operations regarding the joint DLL 1056 will be describe further below. Generally, the joint DLL 1056 is controlled by CPP operations and set the sampling positions of the CPP/channel estimation blocks 1004, 1042, 1024, and 1048. The joint scrambling and code tracking for interference block 1054 provides scrambling and code tracking information to the interfering signal CPP/channel estimation bocks 1042 and 1048.

In its operations, the first diversity path operates upon a first time domain signal 1002. The first time domain signal 1002 includes desired signal time domain training symbols and data symbols and interfering signal time domain training symbols and data symbols. As is generally known, frames of transmitted symbols in an RF system typically include a preamble that has training symbols and a payload portion that carries data symbols. The training symbols are used by channel estimation operations to produce equalizer coefficients that are then used for equalization of the data symbols. The desired signal CPP/channel estimation block 1004 is operable to process desired signal time domain training symbols of the first time domain signal 1002 to produce a first desired signal time domain channel estimate. The interfering signal CPP/channel estimation block 1042 is operable to process interfering signal time domain training symbols of the first time domain signal 1002 to produce a first interfering signal time domain channel estimate. In producing the their respective channel estimates, the CPP/channel estimation blocks 1004 and 1042 may receive estimates of energies of the desired and interfering signals from desired signal energy estimation block 1056 and interfering energy estimation block 1054, respectively. The CPP/channel estimation blocks 1004 and/or 1042 is/are operable to perform cluster path processing. The FFT block 1006 is operable to convert the first desired signal time domain channel estimate to the frequency domain to produce a first desired signal frequency domain channel estimate 1008. The FFT block 1044 is operable to convert the first interfering signal time domain channel estimate to the frequency domain to produce a first desired signal frequency domain channel estimate 1046.

Likewise, the second diversity path operates upon a second time domain signal 1022. The second time domain signal 1022 includes desired signal time domain training symbols and data symbols and interfering signal time domain training symbols and data symbols. The desired signal CPP/channel estimation block 1024 is operable to process desired signal time domain training symbols of the second time domain signal 1022 to produce a second desired signal time domain channel estimate. The interfering signal CPP/channel estimation block 1048 is operable to process interfering signal time domain training symbols of the second time domain signal 1022 to produce a second interfering signal time domain channel estimate. In producing the their respective channel estimates, the CPP/channel estimation blocks 1024 and 1048 may receive estimates of energies of the desired and interfering signals from desired signal energy estimation block 1056 and interfering energy estimation block 1054, respectively. The CPP/channel estimation blocks 1024 and/or 1048 is/are operable to perform cluster path processing. The FFT block 1026 is operable to convert the second desired signal time domain channel estimate to the frequency domain to produce a second desired signal frequency domain channel estimate 1028. The FFT block 1050 is operable to convert the second interfering signal time domain channel estimate to the frequency domain to produce a second desired signal frequency domain channel estimate 1052.

The MMSE/weight calculation block 1010 is operable to receive noise variance estimation parameters from noise variance estimation block 1002 and to produce first frequency domain equalizer coefficients 1011 and second frequency domain equalizer coefficients 1013 based upon the first desired signal frequency domain channel estimate 1008, the first interfering signal frequency domain channel estimate 1046, the second desired signal frequency domain channel estimate 1028, and the second interfering signal frequency domain channel estimate 1052. The operations of the noise variation estimation block 1002 will be described further herein with reference to FIGS. 19-25.

Referring again to the first diversity path, the multiplier 1012 is operable to multiply an output of FFT block 1006 with the first frequency domain equalizer coefficients 1011. However, in another embodiment, the multiplier 1018 simply passes through the first frequency domain equalizer coefficients 1011. Then, the IFFT block 1014 is operable to convert the first frequency domain equalizer coefficients 1011, as operated upon by multiplier 1012, to the time domain to produce first time domain equalizer coefficients. Next, the tap ordering block 1016 is operable to order the first time domain equalizer coefficients to produce tap ordered time domain equalizer coefficients to the time domain equalizer 1018. Time domain equalizer 1018 is operable to equalize the first time domain data symbols using the first time domain equalizer coefficients received from tap ordering block 1016.

Referring again to the second diversity path, the multiplier 1030 is operable to multiply the second frequency domain equalizer coefficients 1013 with an output received from FFT block 1026. In another embodiment, the multiplier block 1030 is operable to simply pass through the second frequency domain equalizer coefficients 1013. The IFFT block 1032 is operable to convert its input from the frequency domain to the time domain to produce second time domain equalizer coefficients. The tap ordering block 1034 is operable to tap order the second time domain equalizer coefficients to produce an output of time domain equalizer. The time domain equalizer 1036 is operable to equalize the second time data symbols using the second time domain equalizer coefficients. Finally, combiner 1038 is operable to combine the equalized first time domain data symbols received from the first time domain equalizer 1018 and the second equalized time domain data symbols received from time domain equalizer 1036 to produce a composite time domain data symbols 1040.

Figure 11:
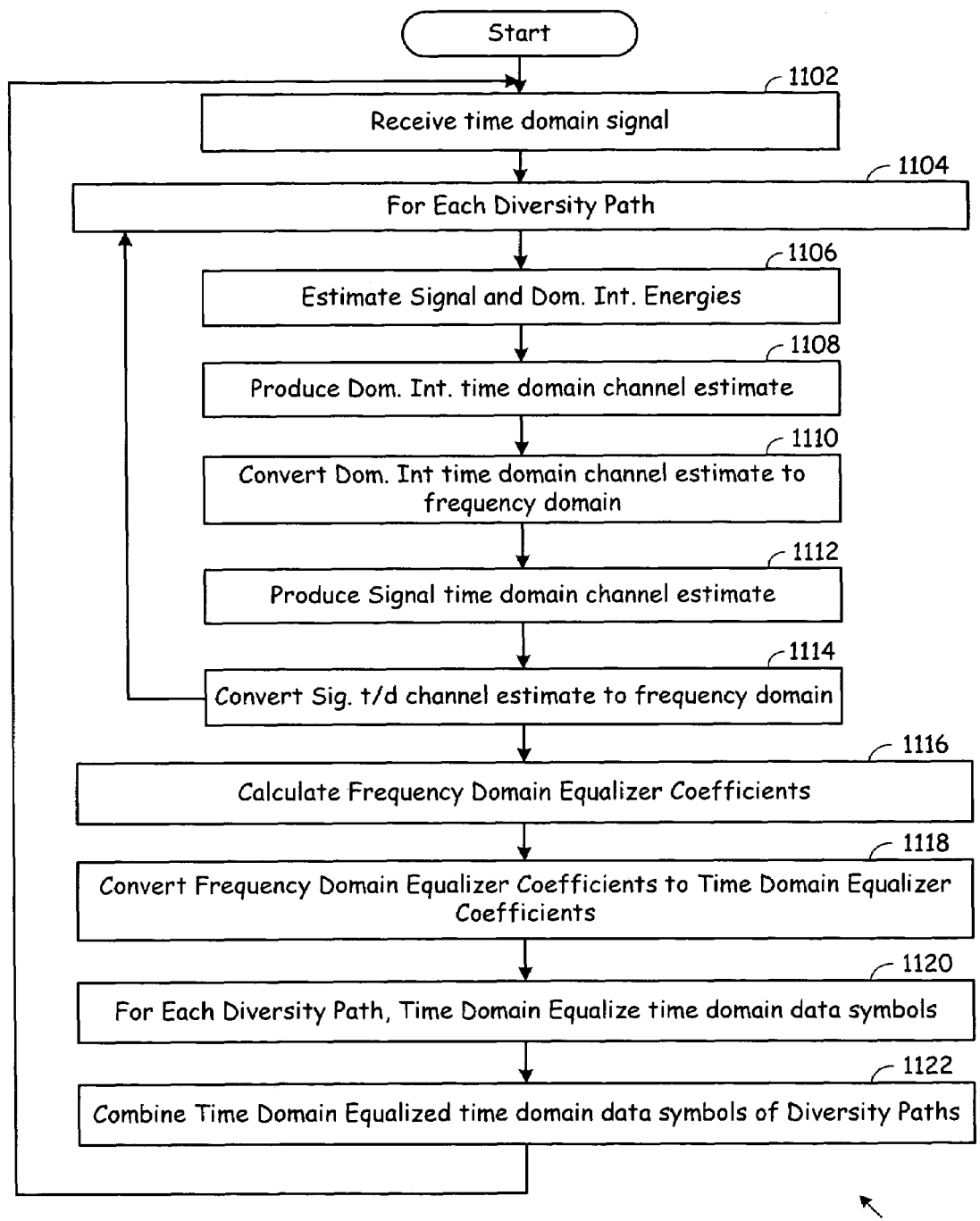
FIG. 11 is a flow chart illustrating equalization operations according to an embodiment of the present invention.

FIG. 11 is a flow chart illustrating equalization operations according to an embodiment of the present invention. The operation 1100 commences with operations for each of at least two diversity paths (Step 1102). As was previously described with reference to FIG. 3, a radio may include a plurality of RF front ends 302-308, each servicing a respective diversity path. Thus, referring again to FIG. 11, operations 1104-1114 are performed for each diversity path. In particular, for each diversity path, the baseband processing module receives a corresponding time domain signal that includes desired signal time domain training symbols, desired signal time domain data symbols, interfering signal time domain training symbols, and interfering signal time domain data symbols.

With reference to a first diversity path, operation includes receiving a first time domain signal. The first diversity path then estimates energies of a desired signal and at least one interfering signal present in the first time domain signal (Step 1106). Operation then includes processing the first interfering signal (dominant interferer) time domain training symbols to produce a first interfering signal time domain channel estimate (Step 1108). Further, operation includes converting the first interfering signal time domain channel estimate to the frequency domain to produce a first desired signal frequency domain channel estimate (Step 1110). Operation then includes processing the first desired signal time domain training symbols to produce a first desired signal time domain channel estimate (Step 1112). Further, operation includes converting the first desired signal time domain channel estimate to the frequency domain to produce a first desired signal frequency domain channel estimate (Step 1114).

With reference to a second diversity path, operation includes receiving a second time domain signal. The second diversity path then estimates energies of a desired signal and at least one interfering signal present in the second time domain signal (Step 1106). Operation then includes processing the second interfering signal (dominant interferer) time domain training symbols to produce a second interfering signal time domain channel estimate (Step 1108). Further, operation includes converting the second interfering signal time domain channel estimate to the frequency domain to produce a second desired signal frequency domain channel estimate (Step 1110). Operation then includes processing the second desired signal time domain training symbols to produce a second desired signal time domain channel estimate (Step 1112). Further, operation includes converting the second desired signal time domain channel estimate to the frequency domain to produce a second desired signal frequency domain channel estimate (Step 1114).

When the operations of Steps 1104-1114 have been completed for each diversity path, operation proceeds to Step 1116 where frequency domain equalizer coefficients are produced for each of a plurality of diversity paths. For the particular example of the structure of FIG. 10 that includes two diversity paths, the operation at Step 1116 includes producing first frequency domain equalizer coefficients and second frequency domain equalizer coefficients based upon the first frequency domain channel estimate and the second frequency domain channel estimate. Operation then includes converting the frequency domain equalizer coefficients to time domain equalizer coefficients (Step 1118). For the particular case of a first and a second diversity path, the operation at Step 1118 would include converting the first frequency domain equalizer coefficients to the time domain to produce first time domain equalizer coefficients and converting the second frequency domain equalizer coefficients to the time domain to produce second time domain equalizer coefficients.

Operation then includes, for each diversity path, time domain equalizing respective time domain data symbols (Step 1120). For the particular case of a first and a second diversity path, the operations of Step 1120 include equalizing the first time domain data symbols using the first time domain equalizer coefficients and equalizing the second time domain data symbols using the second time domain equalizer coefficients. Finally, operation includes combining the equalized time domain data symbols from a plurality of diversity paths (Step 1122). For the particular case of the first and second diversity paths, the operation of Step 1122 includes combining the equalized first time domain data symbols and the second equalized time domain data symbols to produce composite time domain data symbols.

The operations 1102-1122 are repeated each time new equalizer coefficients are produced based upon received physical layer frames that include training symbols. In many RF receivers, the operations 1100 of FIG. 11 are repeated for each received physical layer frame. However, in other embodiments, channel estimation is performed periodically based upon detected changes of channel conditions or when a time constraint is met.

The operations at Steps 1108 and 1112 may include cluster path processing as has been. previously described. When cluster processing is performed, the time domain channel estimates include cluster path processed time domain training symbols. Fast Fourier transformations are employed in converting from the time domain to the frequency domain while Inverse Fast Fourier transformations are to employed to convert from the frequency domain to the time domain. The operations at Step 1116 may include using an MMSE algorithm to produce the frequency domain equalizer coefficients based upon the channel estimates received. The operations of FIG. 11 may support various types of systems including cellular wireless communication systems, wireless metropolitan area communication systems (such as the WiMAX) standards, WLAN communication operations, and WPAN communication operations.

Figure 12:
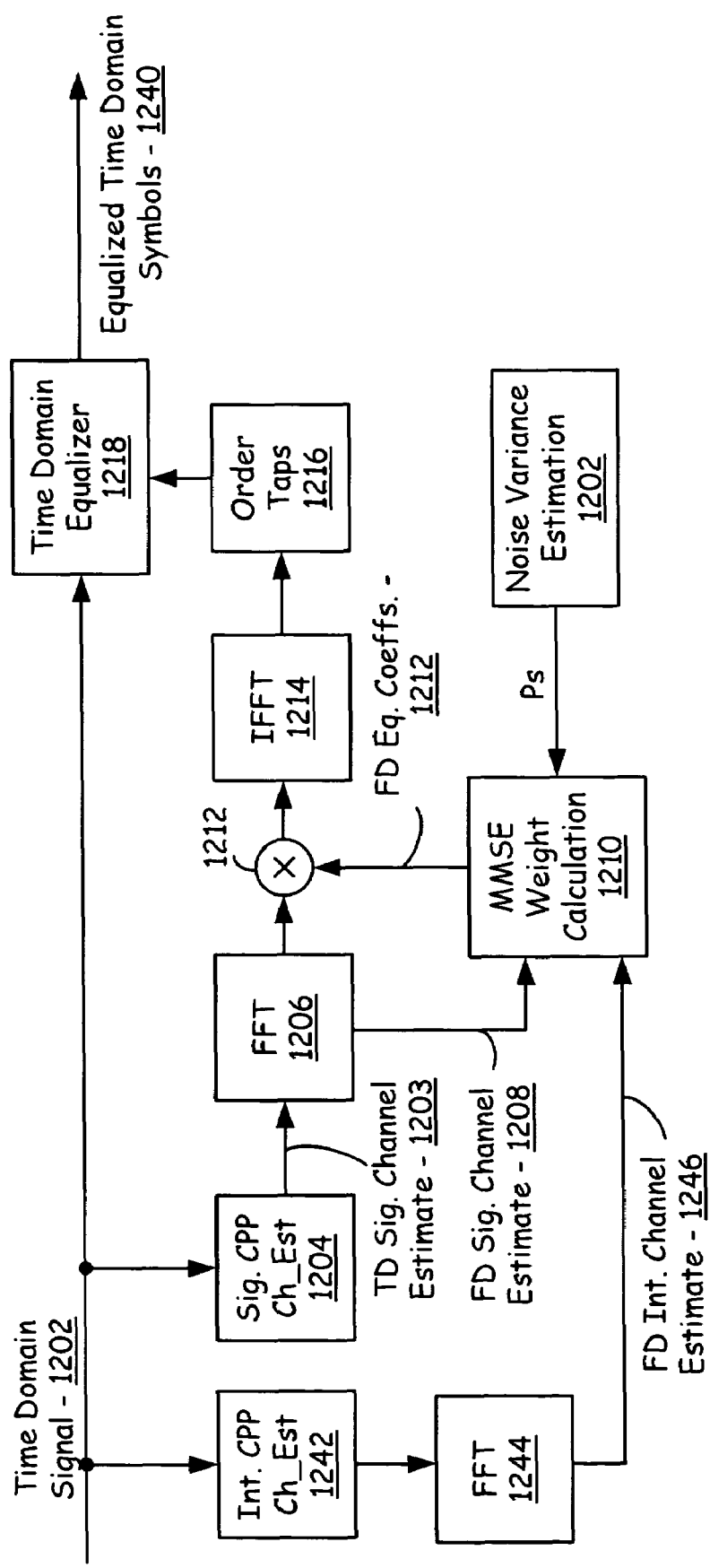
FIG. 12 is a block diagram illustrating equalization components of a baseband processing module according to an embodiment of the present invention.

FIG. 12 is a block diagram illustrating equalization components of a baseband processing module according to an embodiment of the present invention. The components of the baseband processing module 222 are operable to receive a time domain signal 1202 from an RF front end such as was illustrated in FIG. 2. The time domain signal 1202 includes desired signal time domain training symbols and data symbols and interfering signal time domain training symbols and data symbols. The components of FIG. 12 include desired signal channel estimation block 1204, interfering signal channel estimation block 1242, an FFT block 1206, an FFT block 1244, a weight calculator block 1210, an IFFT block 1214, a tap ordering block 1216, and a time domain equalizer 1218. The channel estimation block 1204 is operable to process the desired signal time domain training symbols of the time domain signal 1202 to produce a time domain channel estimate 1203. The interfering signal estimation block 1204 is operable to process the interfering signal time domain training symbols of the time domain signal 1202 to produce a time domain channel estimate 1203. The FFT block 1206 is operable to convert the desired signal time domain channel estimate 1203 to the frequency domain to produce a desired signal frequency domain channel estimate 1208. The FFT block 1244 is operable to convert the interfering signal time domain channel estimate to the frequency domain to produce an interfering frequency domain channel estimate 1246. The weight calculation block 1210 is operable to produce frequency domain equalizer coefficients based upon the desired signal frequency domain channel estimate 1208, the interfering signal frequency domain channel estimate 1246, and noise variation estimation received from noise variation estimation block 1202. Multiplier 1212 receives the frequency domain equalizer coefficient 1212 and the receiving input from the FFT block 1206. The multiplier 1212 produces an output to IFFT block 1214 that converts the frequency domain equalizer coefficient 1212, as may have been modified by multiplier 1212, to produce time domain equalizer coefficients. Tap ordering block 1216 tap orders the time domain equalizer coefficients and produces the tap ordered time domain equalizer coefficients to time domain equalizer 1216. The time domain equalizer 1216 is operable to equalize the time domain data symbols of the time domain signal 1202 using the time domain equalizer coefficients to produce equalized time domain symbols 1240.

The channel estimation blocks 1204 and/or 1242 may also perform cluster path processing operations as were previously described with reference to FIG. 5. When performing cluster path processing operations to produce the time domain training symbols, the CPP/channel estimation blocks 1204 and 1242 may produce the time domain channel estimates based upon the cluster path processed time domain training symbols. The MMSE weight calculation block 1210 may perform MMSE algorithm on the frequency domain equalizer coefficients to produce the frequency domain equalizer coefficients.

Figure 13:
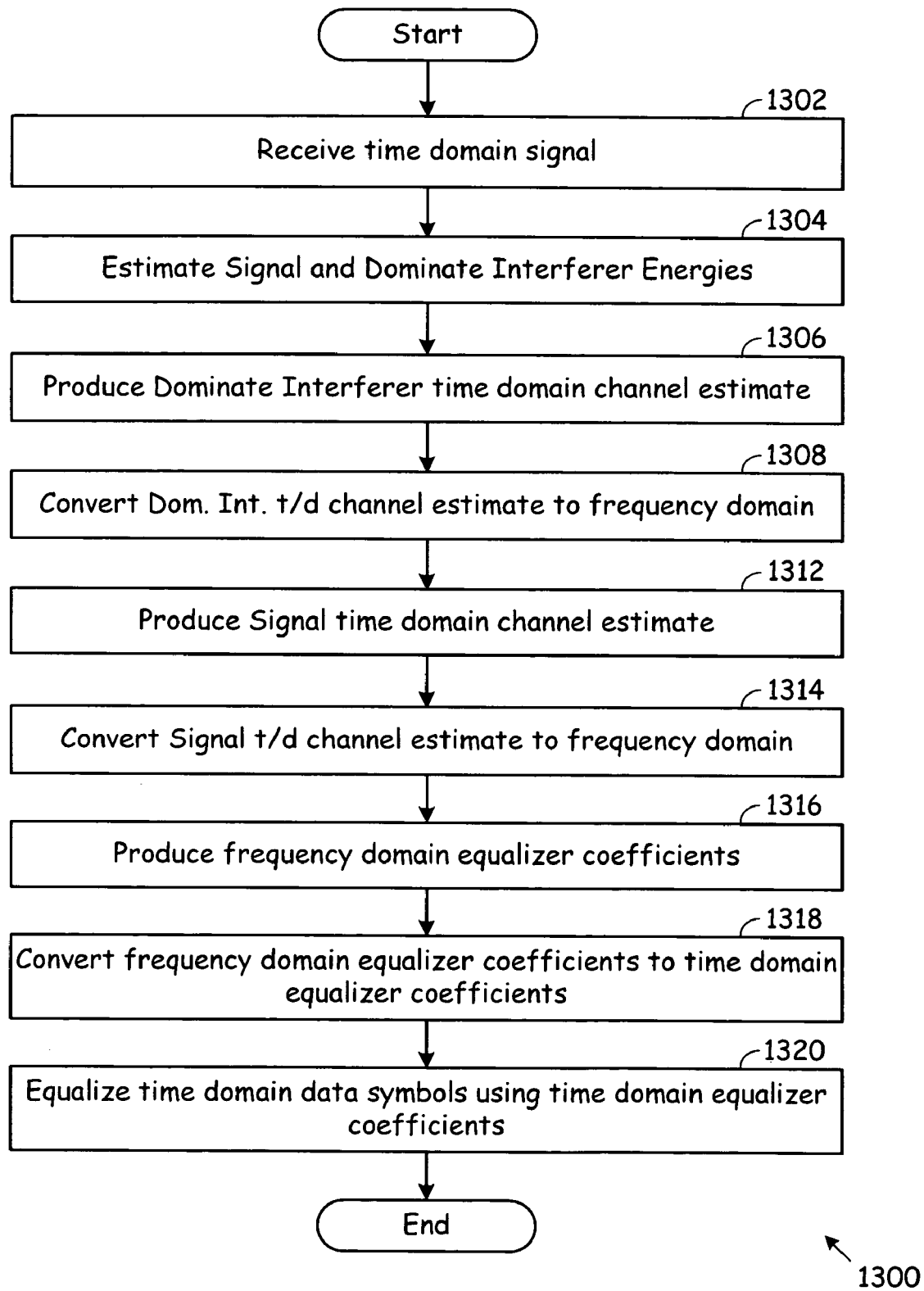
FIG. 13 is a flow chart illustrating equalization operations according to an embodiment of the present invention.

FIG. 13 is a flow chart illustrating equalization operations according to an embodiment of the present invention. Operation 1300 includes first receiving a time domain signal that includes desired signal time domain training symbols and data symbols and interfering signal time domain training symbols and data symbols (Step 1302). Operation continues with estimating energies of a desired signal and at least one interfering signal present in the time domain signal (Step 1304). Operation next includes processing the time domain training symbols to produce an interfering signal time domain channel estimate (Step 1306). Operation continues with converting the interfering signal time domain channel estimate to the frequency domain to produce an interfering signal frequency domain channel estimate (Step 1308). Operation next includes processing the time domain training symbols to produce a desired signal time domain channel estimate (Step 1312). Operation continues with converting the desired signal time domain channel estimate to the frequency domain to produce a desired signal frequency domain channel estimate (Step 1314).

Operation further includes producing frequency domain equalizer coefficients based upon the frequency domain channel estimates produced at Steps 1308 and 1314 (Step 13 16). Then, operation includes converting the frequency domain equalizer coefficients to the time domain to produce time domain equalizer coefficients (Step 1318). Operation concludes with equalizing the time domain data symbols using the time domain equalizer coefficients produced at Step 1318 (Step 1320). From Step 1320 operation ends. Of course, the operations 1300 of FIG. 13 may be repeated for each received physical layer frame that includes training symbols and data symbols.

The operations of FIGS. 11 and 13 and the corresponding structures of FIGS. 10 and 12 may implement the following equations and techniques. In particular, blocks 1010 and 1210 and implemented at steps 1116 and 1316 may operate according to the following. The MMSE optimum weights computed at each sub-carrier as:

$$W[k] = E(Y[k]^* Y[k]^T)^{-1} E(Y[k]^* S) \quad \text{(Eq. 12)}$$
$$= (H_d[k]^* H_d[k]^T + H_I[k]^* H_I[k]^T + C_{nn})^{-1} H_d[k]$$

Then, by using IFFT operations, the coefficient of the time domain equalizer can be achieved. The interference suppression capability is demonstrated by:

$$W_1^* Y_1 + W_2^* Y_2 = \alpha(|H_{I2}|^2 |H_{d1}|^2 X + |H_{I1}|^2 |H_{d2}|^2 X - \quad \text{(Eq. 13)}$$
$$2\text{Re}(H_{d2}^* H_{I2} H_{I1}^* H_{d1})X + \frac{\sigma_{N2}^2}{S} H_{d1} \dot{X} +$$
$$\frac{\sigma_{N2}^2}{S} H_{d1}^* H_{I1} I + W_2^* N_2 + \frac{\sigma_{N1}^2}{S} H_{d2} X +$$
$$\frac{\sigma_{N1}^2}{S} H_{d2}^* H_{I2} I + W_1^* N_1)$$
$$= \alpha(|H_{I2}|^2 |H_{d1}|^2 X + |H_{I1}|^2 |H_{d2}|^2 X -$$
$$2\text{Re}(H_{d2}^* H_{I2} H_{I1}^* H_{d1})X) + Z$$

In more detail, we have $$H_d[k] = \begin{bmatrix} H_{d1}[k] \\ H_{d2}[k] \end{bmatrix} H_I[k] = \begin{bmatrix} H_{I1}[k] \\ H_{I2}[k] \end{bmatrix} \quad \text{(Eq. 14)}$$

By ignoring the subscription k, (Eq. 12) can be written as:

$$W = \quad \text{(Eq. 15)}$$
$$\begin{bmatrix} |H_{d1}|^2 + |H_{I1}|^2 + \sigma_{N1}^2/S & H_{d1} H_{d2}^* + H_{I1} H_{I2}^* \\ H_{d2} H_{d1}^* + H_{I2} H_{I1}^* & |H_{d2}|^2 + |H_{I2}|^2 + \sigma_{N2}^2/S \end{bmatrix}^{-1} \begin{bmatrix} H_{d1} \\ H_{d2} \end{bmatrix}$$

By defining $$\det = (|H_{d1}|^2 + |H_{I1}|^2 + \sigma_{N1}^2/S)(|H_{d2}|^2 + |H_{I2}|^2 + \delta_{N2}^2/S) -$$
$$(H_{d1} H_{d2}^* + H_{I1} H_{I2}^*)(H_{d2} H_{d1}^* + H_{I2} H_{I1}^*)$$
$$= |H_{d1}|^2 |H_{I2}|^2 + |H_{I1}|^2 |H_{d2}|^2 - 2\text{Re}(H_{I1} H_{I2}^* H_{d2} H_{d1}^*) +$$
$$(|H_{d1}|^2 + |H_{I1}|^2)\sigma_{N2}^2/S + (|H_{d2}|^2 + |H_{I2}|^2)\sigma_{N1}^2/S +$$
$$\sigma_{N2}^2 \sigma_{N1}^2/S^2$$

The equations simplify to $$W = \begin{bmatrix} W_1 \\ W_2 \end{bmatrix}$$
$$= \begin{bmatrix} \dfrac{(|H_{d2}|^2 + |H_{I2}|^2 + \sigma_{N2}^2/S)}{\det} & \dfrac{-(H_{d1} H_{d2}^* + H_{I1} H_{I2}^*)}{\det} \\ \dfrac{-(H_{d2} H_{d1}^* + H_{I2} H_{I1}^*)}{\det} & \dfrac{(|H_{d1}|^2 + |H_{I1}|^2 + \sigma_{N1}^2/S)}{\det} \end{bmatrix}$$
$$\begin{bmatrix} H_{d1} \\ H_{d2} \end{bmatrix}$$

In order to simply the 2-by-2 matrix Direct Matrix Inversion, the simplified weight calculation method is derived as follows:

By defining $$\alpha = \frac{1}{\det},$$

the FDE-IS weight at each subcarrier is given as $$W_1 = \alpha\left(|H_{I2}|^2 H_{d1} + \frac{\sigma_{N2}^2}{S} H_{d1} - H_{I1} H_{I2}^* H_{d2}\right)$$
$$= \alpha\left(|H_{I2}|^2 + \frac{\sigma_{N2}^2}{S} - \frac{H_{I1} H_{I2}^* H_{d2} H_{d1}^*}{|H_{d1}|^2}\right) H_{d1}$$
$$= \alpha \beta_1 H_{d1}$$

$$W_2 = \alpha\left(|H_{I1}|^2 H_{d2} + \frac{\sigma_{N1}^2}{S} H_{d2} - H_{I2} H_{I1}^* H_{d1}\right)$$
$$= \alpha\left(|H_{I1}|^2 + \frac{\sigma_{N1}^2}{S} - \frac{H_{I2} H_{I1}^* H_{d1} H_{d2}^*}{|H_{d2}|^2}\right) H_{d2}$$
$$= \alpha \beta_2 H_{d2}$$

where $$\beta_1 = \left(|H_{I2}|^2 + \frac{\sigma_{N2}^2}{S} - \frac{H_{I1} H_{I2}^* H_{d2} H_{d1}^*}{|H_{d1}|^2}\right)$$
$$\beta_2 = \left(|H_{I1}|^2 + \frac{\sigma_{N1}^2}{S} - \frac{H_{I2} H_{I1}^* H_{d1} H_{d2}^*}{|H_{d2}|^2}\right)$$

$$1/\alpha = |H_{d1}|^2 |H_{I2}|^2 + |H_{I1}|^2 |H_{d2}|^2 - 2\text{Re}(H_{I1} H_{I2}^* H_{d2} H_{d1}^*) +$$
$$(|H_{d1}|^2 + |H_{I1}|^2)\sigma_{N2}^2/S + (|H_{d2}|^2 + |H_{I2}|^2)\sigma_{N1}^2/S +$$
$$\sigma_{N2}^2 \sigma_{N1}^2/S^2$$
$$= |H_{d1}|^2(|H_{I2}|^2 + \sigma_{N2}^2/S) + |H_{I1}|^2(|H_{d2}|^2 + \sigma_{N2}^2/S) -$$
$$2\text{Re}(H_{I1} H_{I2}^* H_{d2} H_{d1}^*) + (|H_{d1}|^2 + |H_{I1}|^2 + \sigma_{N2}^2/S)\sigma_{N1}^2/S$$

In (Eq. 12), we assume that the transmission power of the dominant interference is equal to that of the desired signal and also that the power allocation of the CPICH of the dominant interferer is same as that of the desired signal. These estimations affect the operation of the system of the present invention. Thus, robustness for the impact due to the estimation offset of transmission power and the CPICH power allocation of the dominant interference is addressed according to aspects of the present invention. By define the offset factors $\gamma$ and $\zeta$ as the estimation offset of the transmission power and the CPICH power allocation, respectively. Then, the (Eq. 12) can be written as $$W[k] = E(Y[k]^* Y[k]^T)^{-1} E(Y[k]^* S) \quad \text{(Eq. 16)}$$
$$= (H_d[k]^* H_d[k]^T + \gamma \zeta^2 H_I[k]^* H_I[k]^T + C_{nn})^{-1} H_d[k]$$

In general, we have $\gamma <= 1$ by setting $P_I = P_S = 4.0$ at all times, where there is a estimation offset in WCDMA compress mode or discontinuous HSDPA transmission pattern of interference, and $0.4 < \zeta^2 < 2.5$ by assuming the estimated $E_C\_CPICH/Ior$ of interference equal to $-10$ dB and the estimation offset is within $\pm 4$ dB. By ignoring the subscription k, (Eq. 16 can be written as)

$$W = \begin{bmatrix} |H_{d1}|^2 + \gamma \zeta^2 |H_{I1}|^2 + \sigma_{N1}^2 / S & H_{d1} H_{d2}^* + \gamma \zeta^2 H_{I1} H_{I2}^* \\ H_{d2} H_{d1}^* + \gamma \zeta^2 H_{I2} H_{I1}^* & |H_{d2}|^2 + \gamma \zeta^2 |H_{I2}|^2 + \sigma_{N2}^2 / S \end{bmatrix}^{-1} \begin{bmatrix} H_{d1} \\ H_{d2} \end{bmatrix}$$

By defining $$\overline{\det} = (|H_{d1}|^2 + \gamma \zeta^2 |H_{I1}|^2 + \sigma_{N1}^2 / S)(|H_{d2}|^2 + \gamma \zeta^2 |H_{I2}|^2 + \delta_{N2}^2 / S) -$$
$$(H_{d1} H_{d2}^* + \gamma \zeta^2 H_{I1} H_{I2}^*)(H_{d2} H_{d1}^* + \gamma \zeta^2 H_{I2} H_{I1}^*)$$
$$= \gamma \zeta^2 (|H_{d1}|^2 |H_{I2}|^2 + |H_{I1}|^2 |H_{d2}|^2 - 2\mathrm{Re}(H_{I1} H_{I2}^* H_{d2} H_{d1}^*)) +$$
$$(|H_{d1}|^2 + \gamma \zeta^2 |H_{I1}|^2) \sigma_{N2}^2 / S + (|H_{d2}|^2 + \gamma \zeta^2 |H_{I2}|^2) \sigma_{N1}^2 / S +$$
$$\sigma_{N2}^2 \sigma_{N1}^2 / S^2$$

In following:

$$W = \begin{bmatrix} W_1 \\ W_2 \end{bmatrix}$$
$$= \begin{bmatrix} \dfrac{\left(|H_{d2}|^2 + \gamma \zeta^2 |H_{I2}|^2 + \dfrac{\sigma_{N2}^2}{S}\right)}{\det} & \dfrac{-(H_{d1} H_{d2}^* + \gamma \zeta^2 H_{I1} H_{I2}^*)}{\det} \\ \dfrac{-(H_{d2} H_{d1}^* + \gamma \zeta^2 H_{I2} H_{I1}^*)}{\det} & \dfrac{\left(|H_{d1}|^2 + \gamma \zeta^2 |H_{I1}|^2 + \dfrac{\sigma_{N1}^2}{S}\right)}{\det} \end{bmatrix}$$
$$\begin{bmatrix} H_{d1} \\ H_{d2} \end{bmatrix}$$

By defining $$\overline{\alpha} = \frac{1}{\overline{\det}},$$

the FDE-IS weight at each sub-carrier is given as $$W_1 = \overline{\alpha}\left(\gamma \zeta^2 |H_{I2}|^2 H_{d1} + \frac{\sigma_{N2}^2}{S} H_{d1} - \gamma \zeta^2 H_{I1} H_{I2}^* H_{d2}\right)$$

$$W_2 = \overline{\alpha}\left(\gamma \zeta^2 |H_{I1}|^2 H_{d2} + \frac{\sigma_{N1}^2}{S} H_{d2} - \gamma \zeta^2 H_{I2} H_{I1}^* H_{d1}\right)$$

$$Y_1 = H_{d1} S + H_{I1} I + N_1; \; Y_2 = H_{d2} S + H_{I2} I + N_2$$

$$W_1^* Y_1 = \overline{\alpha}\left(\gamma \zeta^2 |H_{I2}|^2 H_{d1} + \frac{\sigma_{N2}^2}{S} H_{d1} - \gamma \zeta^2 H_{I1} H_{I2}^* H_{d2}\right)^*$$
$$(H_{d1} X + H_{I1} I + N_1)$$
$$= \overline{\alpha}(\gamma \zeta^2 |H_{I2}|^2 |H_{d1}|^2 X + \frac{\sigma_{N2}^2}{S} H_{d1} X - \gamma \zeta^2 (H_{I1} H_{I2}^* H_{d2})^* H_{d1} X +$$
$$\underline{\gamma \zeta^2 |H_{I2}|^2 H_{d1}^* H_{I1} I} + \frac{\sigma_{N2}^2}{S} H_{d1}^* H_{I1} I - \underline{\gamma \zeta^2 (H_{I1} H_{I2}^* H_{d2})^* H_{I1} I} +$$
$$W_1^* N_1)$$

$$W_2^* Y_2 = \alpha\left(\gamma \zeta^2 |H_{I1}|^2 H_{d2} + \frac{\sigma_{N1}^2}{S} H_{d2} - \gamma \zeta^2 H_{I2} H_{I1}^* H_{d1}\right)^*$$
$$(H_{d2} X + H_{I2} I + N_2)$$
$$= \overline{\alpha}(\gamma \zeta^2 |H_{I1}|^2 |H_{d2}|^2 X + \frac{\sigma_{N1}^2}{S} H_{d2} X - \gamma \zeta^2 (H_{I2} H_{I1}^* H_{d1})^* H_{d2} X +$$
$$\underline{\gamma \zeta^2 |H_{I1}|^2 H_{d2}^* H_{I2} I} + \frac{\sigma_{N1}^2}{S} H_{d2}^* H_{I2} I - \underline{\gamma \zeta^2 (H_{I2} H_{I1}^* H_{d1})^* H_{I2} I} +$$
$$W_2^* N_2)$$

$$W_1^* Y_1 + W_2^* Y_2 = \overline{\alpha}(\gamma \zeta^2 (|H_{I2}|^2 |H_{d1}|^2 X + |H_{I1}|^2 |H_{d2}|^2 X -$$
$$2\mathrm{Re}(H_{d2}^* H_{I2} H_{I1}^* H_{d1}) X) + \frac{\sigma_{N2}^2}{S} H_{d1} X + \frac{\sigma_{N2}^2}{S} H_{d1}^* H_{I1} I +$$
$$W_2^* N_2 + \frac{\sigma_{N1}^2}{S} H_{d2} X + \frac{\sigma_{N1}^2}{S} H_{d2}^* H_{I2} I + W_1^* N_1)$$

Where:

$$\frac{1}{\overline{\alpha}} = \gamma \zeta^2 (|H_{d1}|^2 |H_{I2}|^2 + |H_{I1}|^2 |H_{d2}|^2 - 2\mathrm{Re}(H_{I1} H_{I2}^* H_{d2} H_{d1}^*)) +$$
$$(|H_{d1}|^2 + \gamma \zeta^2 |H_{I1}|^2) \sigma_{N2}^2 / S + (|H_{d2}|^2 + \gamma \zeta^2 |H_{I2}|^2) \sigma_{N1}^2 / S + \sigma_{N2}^2 \sigma_{N1}^2 / S^2$$

Approximately at high SNR range, we have:

$$W_1^* Y_1 + W_2^* Y_2 \cong \quad \text{(Eq. 17)}$$
$$\alpha(|H_{I2}|^2 |H_{d1}|^2 X + |H_{I1}|^2 |H_{d2}|^2 X - 2\mathrm{Re}(H_{d2}^* H_{I2} H_{I1}^* H_{d1}) X) + \overline{Z}$$

The timing of the CPP processing operations (e.g., blocks 1004, 1042, 1024, and 1048) according to the present invention is also important, e.g., alignment of the CPP operations with the desired signal and the interfering signal. Consider that a scanner module 418 of the baseband processing module 222 provides timing references to the CPP/Ch_Est blocks 1004, 1024, 1042, and 1048 for the desired signal and the interfering signal around NTc and MTc, respectively. With these assumption, a signal model in the time domain can be represented by:

$$y(t) = h_d(t - \tau_d) \otimes s(t) + h_i(t - \tau_i) \otimes i(t) + n(t) \quad \text{(Eq. 18)}$$
$$= h_d(t - p1) \otimes s(t - NTc) +$$
$$h_i(t - p2) \otimes i(t - MTc) + n(t)$$

By assuming:

$t-p1=T_s; \tau_d=NTc+p1; \tau_i=MTc+p2$ (Eq. 18) can be written as $$y(t) = h_d(t - \tau_d) \otimes s(t) + h_i(t - \tau_i) \otimes i(t) + n(t)$$
$$= h_d(Ts) \otimes s(Ts + p1 - NTc) +$$
$$h_i(Ts + p1 - p2) \otimes i(Ts + p1 - MTc) + n(Ts + p1)$$

With these assumptions, because we only compensate for the collected energy of the desired signal and its corresponding channel response at a sampling position of both the desired and interfering signals, the optimum time for desired with maximum energy output can be achieved by using a Maximum Energy Delay Locked Loop for the CPP operations. The sampling position of the interfering signal is then slaved to the desired signal DLL. By using on time sampling information from the desired DLL, the channel response for both the desired signal and the interfering signal at the same sampling position can be achieved.

Further, by adjusting scrambling code N chip, we can get channel estimation of the desired signal at a sampling phase P1. Similarly, at the interfering signal CPP processing, by adjusting scrambling code M chip, we can get channel estimation of interference at same sampling phase P1. Furthermore, by considering that the DLL can track the main path that can shift over 7 chips during scanner update period and the desired and interference can shift in different direction. We have to add an extra DLL to lock the main path of interference. The extra DLL only provide the SC code phase of interference. For example, the SC of interference shift one chip, say m->m+1, because the sampling position slaved to desired DLL. The channel profile of interference is totally shift by 1 chip. Considering we use IIR filter to measure the power. We must use the previous and adjacent finger (L+1) as current finger L's history value.

Figure 14A:
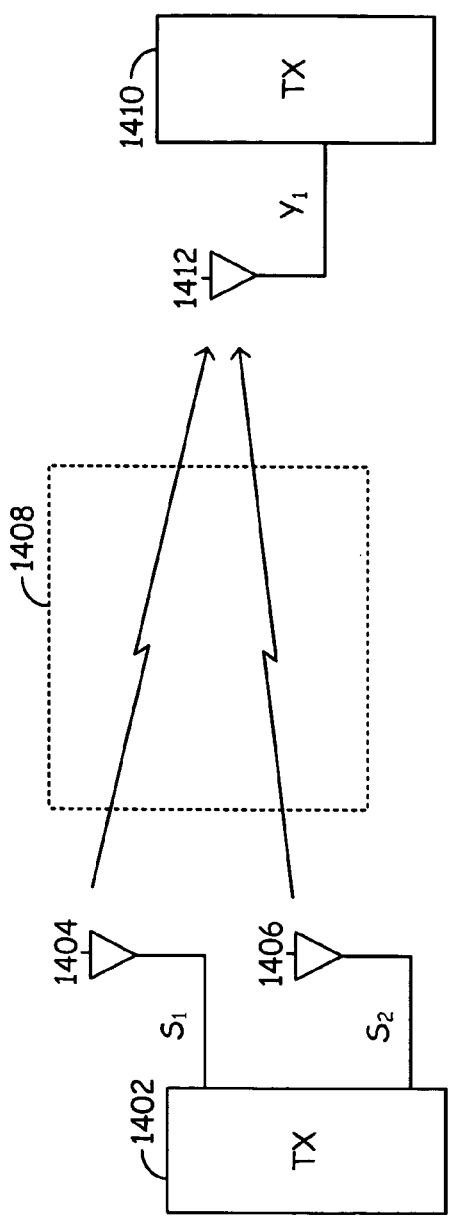
FIG. 14A is a block diagram illustrating a Multiple-Input-Single-Output (MISO) transmission system supported by equalization operation embodiments of the present invention operate.

FIG. 14A is a block diagram illustrating a Multiple-Input-Single-Output (MISO) transmission system supported by equalization operation embodiments of the present invention operate. A transmitter 1402 of the system includes multiple antennas 1404 and 1406, each of which transmits an information signal. These information signals $S_1$ and $S_2$ may be Space Time Transmit Diversity (STTD) signals, the formation and transmission of which is generally known and will not be described further other than as they relate to the present invention. In some operations, the first information signal $S_1$ carries the same data as the second information signal $S_2$. The information signals $S_1$ and $S_2$ transmitted via antennas 1404 and 1406 are operated upon by channel 1408 and received together as a merged information signal via antenna 1412 by RF receiver 1410. The RF receiver 1410 operates upon this merged information signal, as will be described further with reference to FIGS. 15 and 16.

Figure 14B:
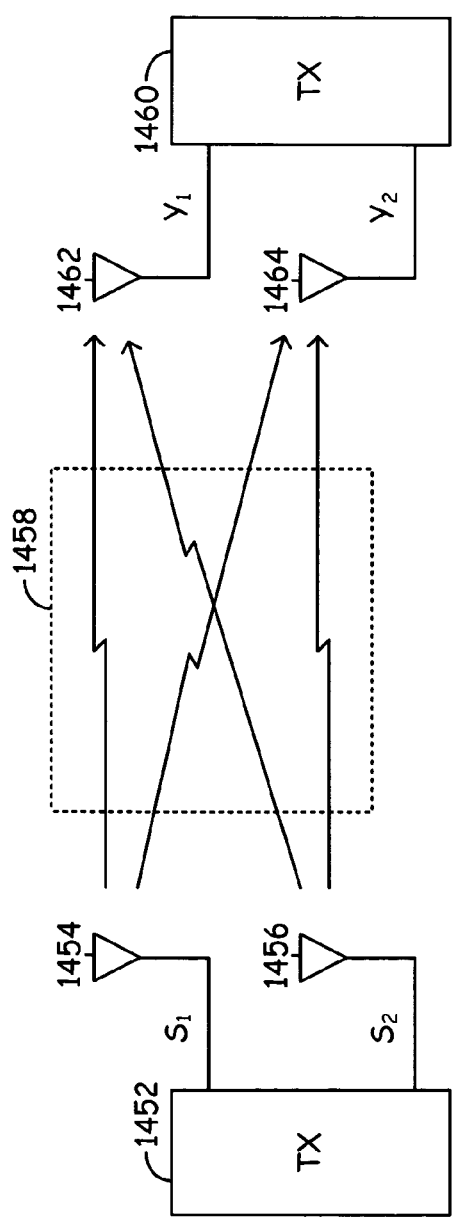
FIG. 14B is a block diagram illustrating a Multiple-Input-Multiple-Output (MIMO) transmission system supported by equalization operation embodiments of the present invention operate.

FIG. 14B is a block diagram illustrating a Multiple-Input-Multiple-Output (MIMO) transmission system supported by equalization operation embodiments of the present invention operate. A transmitter 1452 of the system includes multiple antennas 1454 and 1456, each of which transmits a respective information signal. These information signals $S_1$ and $S_2$ carry differing data, i.e., a first information signal $S_1$ carries differing data than does second information signal $S_2$. The information signals $S_1$ and $S_2$ transmitted via antennas 1454 and 1456 are operated upon by channel 1458 and received together as merged information signals by antennas 1462 and 1464 by RF receiver 1460. Because of the operations of the channel 1458, each of the antennas receives a respective merged information signal that is a combination of the transmitted signals $S_1$ and $S_2$. The RF receiver 1460 operates upon these merged information signals $S_1$ and $S_2$, as will be described further with reference to FIGS. 17 to 18.

Figure 15:
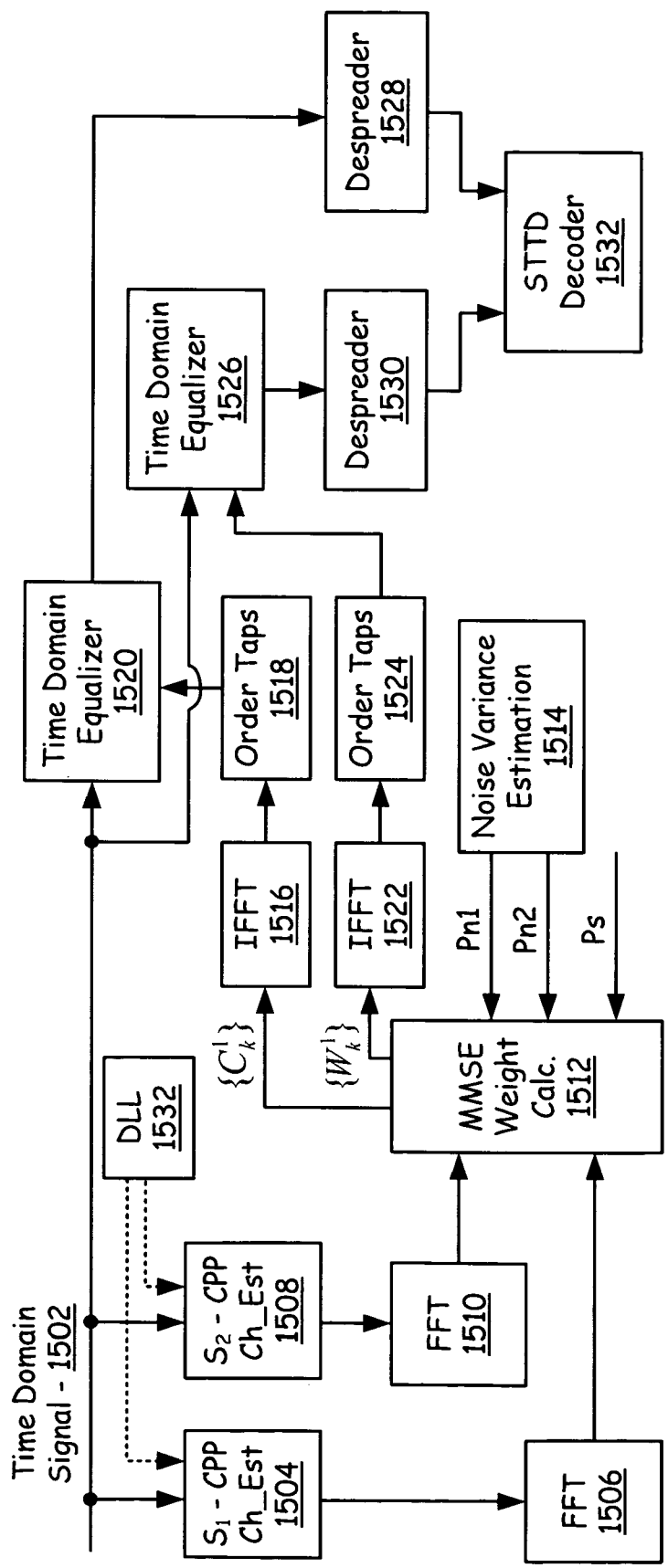
FIG. 15 is a block diagram illustrating equalization components of a baseband processing module according to an embodiment of the present invention.

FIG. 15 is a block diagram illustrating equalization components of a baseband processing module according to an embodiment of the present invention. The components of the baseband processing module 222 are operable to receive a merged information 1502 from an RF front end such as was illustrated in FIG. 2. The merged information signal 1502 includes a first information signal and a second information signal, each of the first and second information signals having time domain training symbols and data symbols and is, of course, in the time domain upon receipt. The baseband processing module includes at least one channel estimator 1504 and 1508 operable to process the first information signal time domain training symbols and the second information signal time domain training symbols to produce a first information signal time domain channel estimate and a second information signal time domain channel estimate. The baseband processing module 222 further includes at least one Fast Fourier Transform module 1506 and 1510 operable to transform the first information signal time domain channel estimate and the second information signal time domain channel estimate to the frequency domain to produce a first information signal frequency domain channel estimate and a second information signal frequency domain channel estimate, respectively. The baseband processing module 222 further includes a weight calculator 1512 operable to produce first frequency domain equalizer coefficients and second frequency domain equalizer coefficients based upon the first information signal frequency domain channel estimate, the second information signal frequency domain channel estimate, and noise variance information received from noise variance estimation block 1514. The baseband processing module 222 also includes at least one Inverse Fast Fourier Transform module 1516 and 1522 operable to transform the first frequency domain equalizer coefficients and the second frequency domain equalizer coefficients to the time domain to produce first time domain equalizer coefficients and second time domain equalizer coefficients, respectively. Further, the baseband processing module further includes at least one equalizer 1520 and 1526 operable to equalize the merged information signal time using the first time domain equalizer coefficients to produce equalized first information signal data symbols and to equalize the merged information signal time using the first time domain equalizer coefficients to produce equalized second information signal data symbols.

In particular, channel estimation block 1504 is operable to process the first information signal time domain training symbols of the merged information 1502 to produce a first information signal time domain channel estimate. The second information signal estimation block 1508 is operable to process the second information signal time domain training symbols of the merged information signal 1502 to produce a second information signal time domain channel estimate. FFT block 1506 is operable to convert the first information signal time domain channel estimate to the frequency domain to produce a first information signal frequency domain channel estimate. FFT block 1510 is operable to convert the second information signal time domain channel estimate to the frequency domain to produce a second information signal frequency domain channel estimate. The weight calculation block 1512 is operable to produce first and second frequency domain equalizer coefficients based upon the first information signal frequency domain channel estimate, the second information signal frequency domain channel estimate, and noise variation estimation received from noise variation estimation block 1514. The operations of the noise variation estimation block 1514 will be described further herein with reference to FIGS. 19-25.

IFFT block 1516 converts the first frequency domain equalizer coefficients to the time domain to produce first time domain equalizer coefficients. Tap ordering block 1518 tap orders the first time domain equalizer coefficients and produce tap ordered first time domain equalizer coefficients to time domain equalizer 1520 The time domain equalizer 1520 is operable to equalize the merged information signal 1502 using the time domain equalizer coefficients to produce equalized first information signal data symbols.

IFFT block 1522 converts the second frequency domain equalizer coefficients to the time domain to produce second time domain equalizer coefficients. Tap ordering block 1524 tap orders the second time domain equalizer coefficients and produce tap ordered second time domain equalizer coefficients to time domain equalizer 1526 The time domain equalizer 1526 is operable to equalize the merged information signal 1502 using the time domain equalizer coefficients to produce equalized second information signal data symbols.

Despreader 1530 is operable to despread the equalized first information signal data symbols. Despreader 1528 is operable to despread the equalized second information signal data symbols. STTD decoder 1532 is operable to STTD decode the despread equalized first information signal data symbols and the despread equalized second information signal data symbols.

The channel estimation blocks 1504 and/or 1508 may also perform cluster path processing operations as were previously described with reference to FIG. 5. When performing cluster path processing operations to produce the time domain training symbols, the CPP/channel estimation blocks 1504 and 1508 may produce the time domain channel estimates based upon the cluster path processed time domain training symbols. The MMSE weight calculation block 1512 may perform MMSE algorithm on the frequency domain equalizer coefficients to produce the frequency domain equalizer coefficients.

Figure 16:
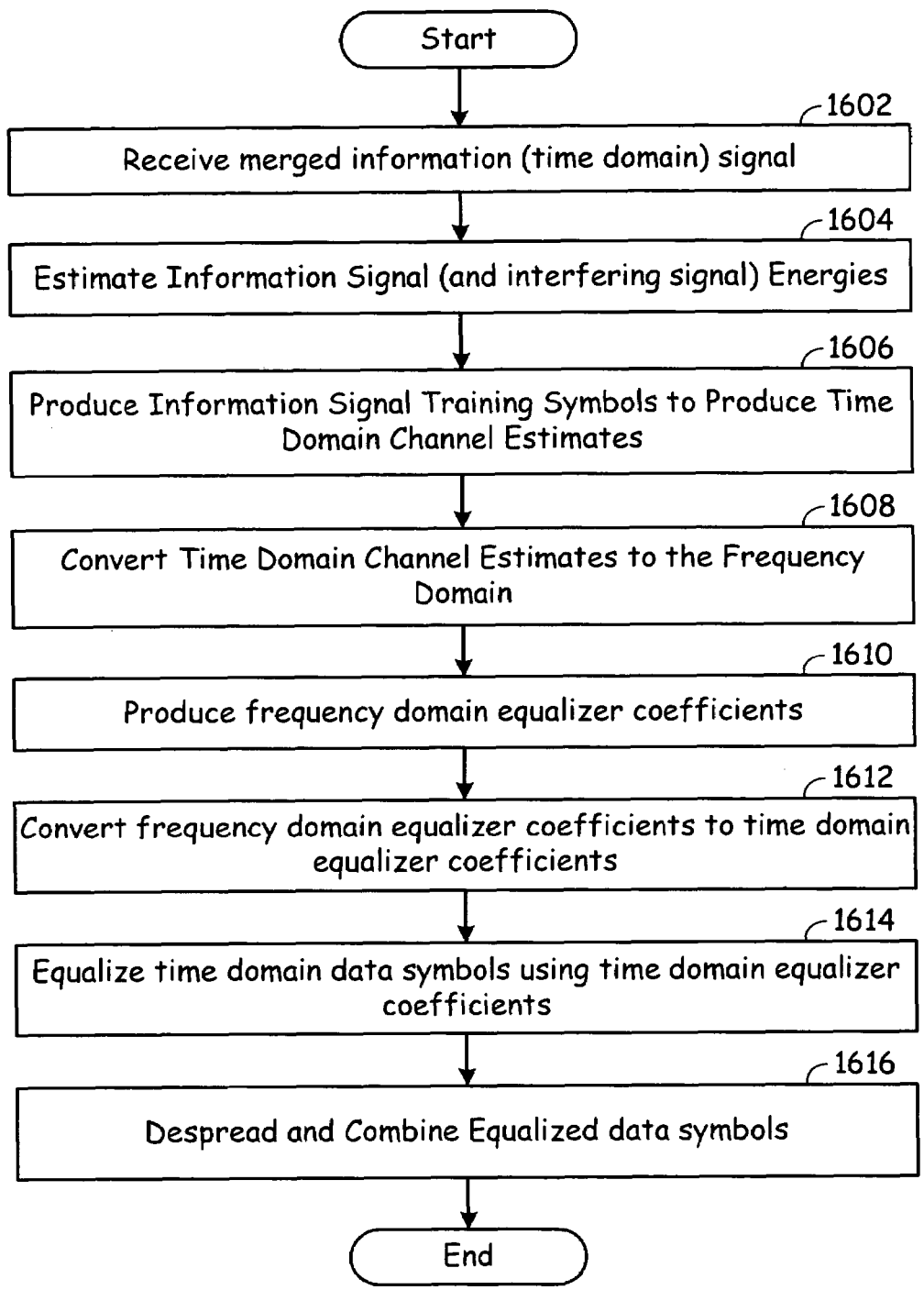
FIG. 16 is a flow chart illustrating equalization operations according to an embodiment of the present invention.

FIG. 16 is a flow chart illustrating equalization operations according to an embodiment of the present invention. Operation 1600 includes first receiving a merged information signal that includes a first information signal and a second information signal, each of the first and second information signals having time domain training symbols and data symbols (Step 1602). Operation continues with estimating energies of the information signals and optionally, the energy of at least one interfering signal present in the merged information signal (Step 1604). Operation next includes processing the first information signal time domain training symbols and the second information signal time domain training symbols to produce a first information signal time domain channel estimate and a second information signal time domain channel estimate (Step 1606). Operation continues with converting the first information signal time domain channel estimate and the second information signal time domain channel estimate to the frequency domain to produce a first information signal frequency domain channel estimate and a second information signal frequency domain channel estimate, respectively (Step 1608). Operation next includes producing first frequency domain equalizer coefficients and second frequency domain equalizer coefficients based upon the first information signal frequency domain channel estimate and the second information signal frequency domain channel estimate (Step 1610). Operation continues with converting the first frequency domain equalizer coefficients and the second frequency domain equalizer coefficients to the time domain to produce first time domain equalizer coefficients and second time domain equalizer coefficients, respectively (Step 1612).

Then, operation includes equalizing the merged information signal time using the first time domain equalizer coefficients to produce equalized first information signal data symbols and equalizing the merged information signal time using the first time domain equalizer coefficients to produce equalized second information signal data symbols (Step 1614). Operation continues with despreading and combining the equalized data symbols (Step 1616). From Step 1616 operation ends. Of course, the operations 1600 of FIG. 16 may be repeated for each received physical layer frame that includes training symbols and data symbols.

The operations of Step 1612 may be performed on an STTD signal. In such case, the first information signal data symbols and the second information signal data symbols carry common data. In this case, the method 1600 includes STTD decoding the equalized first information signal data symbols and the equalized second information signal data symbols. The operations of Step 1616 may include despreading the equalized first information signal data symbols and despreading the equalized second information signal data symbols prior to STTD decoding the despread equalized first information signal data symbols and the despread equalized second information signal data symbols as was illustrated in FIG. 15.

Referring now to all of FIGS. 14A, 15, and 16, a baseband processing module 222 and operations of the present invention may implement the following MISO equations and techniques. In particular, MISO operations 1600 of FIG. 16 implemented by the baseband processing module 222 (in particular the MMSE weight calculation block 1010 of FIG. 10) may operate consistent with the following signal model(s). A signal model at the $k^{th}$-subcarrier in the frequency domain may be modeled as:

$$Y[k]=H_1[k]S_1+H_2[k]S_2+N \quad \text{(Eq. 19)}$$

By treating the second information signal $S_2$ as interference to the first information signal $S_1$, the FDE-IS for the first information signal $S_1$ with MMSE optimum weight at each sub-carrier is given as $$W[k] = E(Y[k]^*Y[k]^T)^{-1} E(Y[k]^*S_1) = \quad \text{(Eq. 20)}$$
$$(H_1[k]^*H_1[k]^T + H_2[k]^*H_2[k]^T + C_{nn})^{-1} H_1[k]$$

Similarly, by treating the first information signal $S_1$ as interference to the second information signal $S_2$, the FDE-IS for the second information signal $S_2$ with MMSE optimum weight at each sub-carrier is given as:

$$C[k] = \begin{bmatrix} C_k^1 \\ C_k^2 \end{bmatrix} = E(Y[k]^*Y[k]^T)^{-1} E(Y[k]^*S_2) = \quad \text{(Eq. 21)}$$
$$(H_2[k]^*H_2[k]^T + H_1[k]^*H_1[k]^T + C_{nn})^{-1} H_2[k]$$

Then, using IFFT operations, the coefficient of the time domain equalizers (at Step 1112) is achieved.

Figure 17:
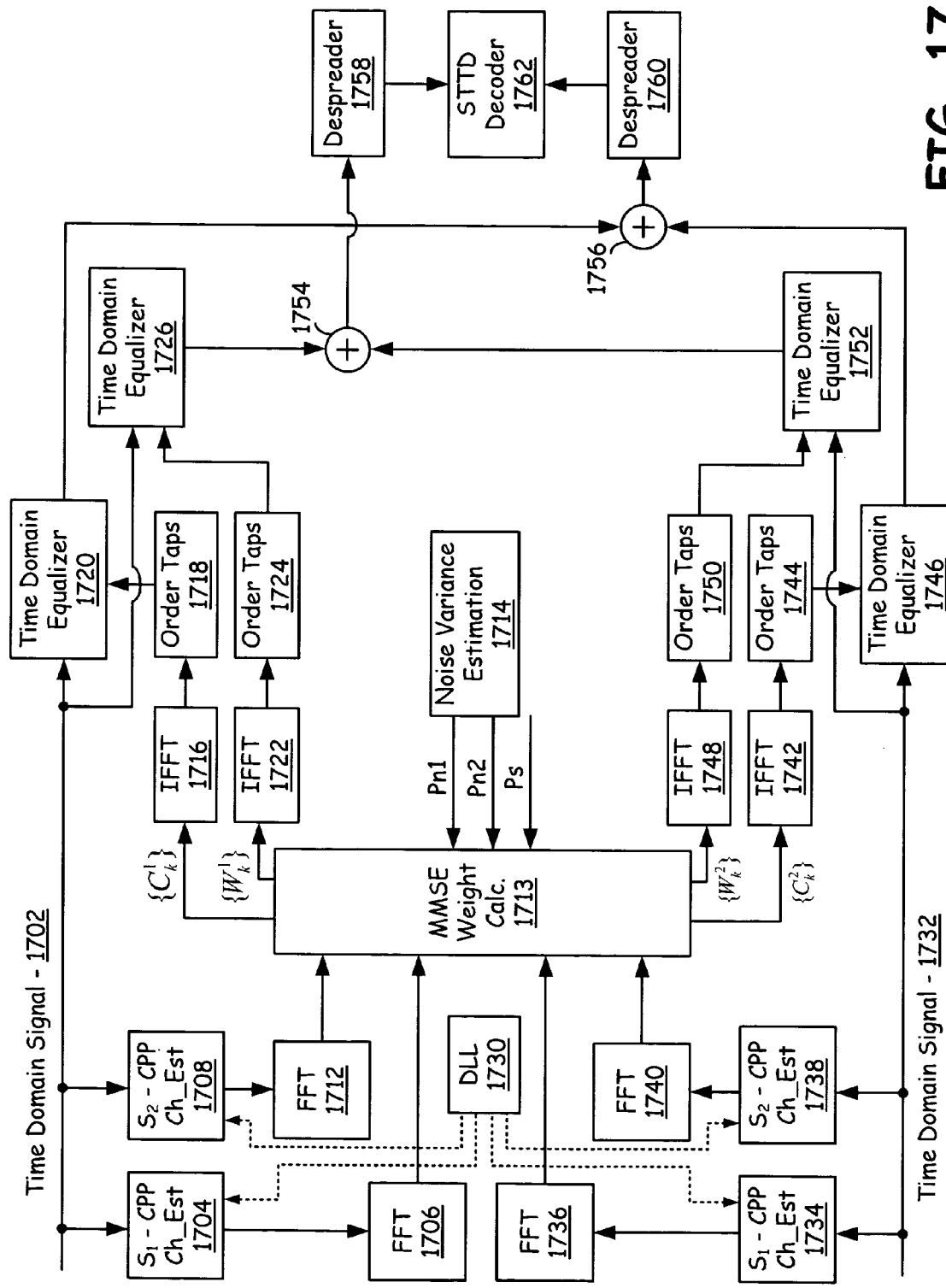
FIG. 17 is a block diagram illustrating equalization components of a baseband processing module according to an embodiment of the present invention.

FIG. 17 is a block diagram illustrating equalization components of a baseband processing module according to an embodiment of the present invention. These components of the baseband processing module 222 perform equalization operations according to one or more embodiments the present invention. Of course, a baseband processing module 222 would include additional components in addition to as those illustrated in FIG. 17. The functional blocks of FIG. 17 may be implemented in dedicated hardware, general purpose hardware, software, or a combination of dedicated hardware, general purpose hardware, and software.

The components of the baseband processing module 222 of FIG. 17 include first diversity path components, second diversity path components, and shared components. As was described with reference to FIGS. 3 and 14B, an RF transceiver (transmitter/receiver), may include a plurality of receive signal paths. The plurality of receive signal paths may operate upon a MIMO transmitted signal. According to the embodiment of FIG. 17, the functional components operate upon different versions of the MIMO transmitted signal as was previously described with reference to FIG. 14B.

The first diversity path component includes a first information signal cluster path processor/channel estimation block 1704, a second desired signal cluster path processor/channel estimation block 1708, a Fast Fourier Transform (FFT) block 1706, a Fast Fourier Transform (FFT) block 1712, Inverse Fast Fourier Transform (IFFT) block 1716, tap ordering block 1718, time domain equalizer 1720, Inverse Fast Fourier Transform (IFFT) block 1722, tap ordering block 1724, and time domain equalizer 1726. The second diversity path components include first information signal cluster path processor/channel estimation block 1734, a second desired signal cluster path processor/channel estimation block 1738, a Fast Fourier Transform (FFT) block 1736, a Fast Fourier Transform (FFT) block 1740, Inverse Fast Fourier Transform (IFFT) block 1748, tap ordering block 1750, time domain equalizer 1752, Inverse Fast Fourier Transform (IFFT) block 1742, tap ordering block 1744, and time domain equalizer 1746.

The shared processing blocks of the RF receiver of FIG. 17 include a joint Delay Locked Loop (DLL) 1730, a Minimum Mean Square Error (MMSE) weight calculation block 1713, a noise variance estimation block 1714, combiners 1754 and 1756, despreaders 1758 and 1760, and STTD decoder 1762. Generally, the joint DLL 1730 is controlled by CPP operations that set the sampling positions of the CPP/channel estimation blocks 1704, 1708, 1734, and 1738.

In its operations, the first diversity path operates upon a first time domain signal (first merged information signal) 1702. The first time domain signal 1702 includes first information signal time domain training symbols and data symbols and second information signal time domain training symbols and data symbols. As is generally known, frames of transmitted symbols in an RF system typically include a preamble that has training symbols and a payload portion that carries data symbols. The training symbols are used by channel estimation operations to produce equalizer coefficients that are then used for equalization of the data symbols. The first information signal CPP/channel estimation block 1704 is operable to process first information signal time domain training symbols of the first time domain signal 1702 to produce a first information signal time domain channel estimate. The second information signal CPP/channel estimation block 1708 is operable to process second information signal time domain training symbols of the first time domain signal 1702 to produce a second information signal time domain channel estimate. In producing the their respective channel estimates, the CPP/channel estimation blocks 1704 and 1708 may receive estimates of energies of the information and second information signals from an information signal energy estimation block and an interfering energy estimation block, respectively (not shown). The CPP/channel estimation blocks 1704 and/or 1708 is/are operable to perform-cluster path processing. The FFT block 1706 is operable to convert the first information signal time domain channel estimate to the frequency domain to produce a first information signal frequency domain channel estimate. The FFT block 1712 is operable to convert the second information signal time domain channel estimate to the frequency domain to produce a second information signal frequency domain channel estimate.

Likewise, the second diversity path operates upon a second time domain signal (second merged information signal) 1732. The second time domain signal 1732 includes first information signal time domain training symbols and data symbols and second information signal time domain training symbols and data symbols. The first information signal CPP/channel estimation block 1734 is operable to process the first information signal time domain training symbols of the second time domain signal 1732 to produce a second information signal time domain channel estimate. The second information signal CPP/channel estimation block 1738 is operable to process second information signal time domain training symbols of the second time domain signal 1732 to produce a second information signal time domain channel estimate. In producing their respective channel estimates, the CPP/channel estimation blocks 1734 and 1738 may receive estimates of energies of the information and second information signals from first information signal energy estimation block and interfering energy estimation block, respectively (not shown). The CPP/channel estimation blocks 1734 and/or 1738 is/are operable to perform cluster path processing. The FFT block 1736 is operable to convert the second information signal time domain channel estimate to the frequency domain to produce a second information signal frequency domain channel estimate. The FFT block 1740 is operable to convert the second information signal time domain channel estimate to the frequency domain to produce a second information signal frequency domain channel estimate.

The MMSE/weight calculation block 1713 is operable to produce first frequency domain equalizer coefficients, second frequency domain equalizer coefficients, third frequency domain equalizer coefficients (first frequency domain equalizer coefficients for the second diversity path), and fourth frequency domain equalizer coefficients (second frequency domain equalizer coefficients for the second diversity path) based upon the first information signal frequency domain channel estimate and the first second information signal frequency domain channel estimate received from the first diversity path and the first information signal frequency domain channel estimate, the second information signal frequency domain channel estimate received from the second diversity path, and noise variance estimation parameters received from noise variance estimation block 1714. The operations of the noise variation estimation block 1714 will be described further herein with reference to FIGS. 19-25.

Referring again to the first diversity path, the IFFT block 1716 is operable to convert the first frequency domain equalizer coefficients to the time domain to produce first time domain equalizer coefficients. Next, the tap ordering block 1718 is operable to order the first time domain equalizer coefficients to produce tap ordered first time domain equalizer coefficients to the time domain equalizer 1720. Time domain equalizer 1720 is operable to equalize the first merged information signal (time domain signal 1702) using the tap ordered first time domain equalizer coefficients received from tap ordering block 1718. The IFFT block 1722 is operable to convert the second frequency domain equalizer coefficients to the time domain to produce second time domain equalizer coefficients. Next, the tap ordering block 1724 is operable to order the second time domain equalizer coefficients to produce tap ordered second time domain equalizer coefficients to the time domain equalizer 1726. Time domain equalizer 1726 is operable to equalize the first merged information signal (time domain signal 1702) using the tap ordered second time domain equalizer coefficients received from tap ordering block 1724.

Referring again to the second diversity path, the IFFT block 1742 is operable to convert the third frequency domain equalizer coefficients (first frequency domain equalizer coefficients for the second diversity path) to the time domain to produce third time domain equalizer coefficients (first time domain equalizer coefficients for the second diversity path). Next, the tap ordering block 1744 is operable to order the third time domain equalizer coefficients to produce tap ordered third time domain equalizer coefficients to the time domain equalizer 1746. Time domain equalizer 1746 is operable to equalize the second merged information signal (time domain signal 1732) using the tap ordered third time domain equalizer coefficients received from tap ordering block 1744. The IFFT block 1748 is operable to convert the fourth frequency domain equalizer coefficients (second frequency domain equalizer coefficients for the second diversity path) to the time domain to produce fourth time domain equalizer coefficients (second time domain equalizer coefficients for the second diversity path). Next, the tap ordering block 1750 is operable to order the fourth time domain equalizer coefficients to produce tap ordered fourth time domain equalizer coefficients to the time domain equalizer 1752. Time domain equalizer 1752 is operable to equalize the second merged information signal (time domain signal 1732) using the tap ordered fourth time domain equalizer coefficients received from tap ordering block 1750.

Combiner 1754 is operable to combine the outputs of time domain equalizers 1726 and 1752 while combiner 1756 is operable to combine the outputs of time domain equalizers 1720 and 1746. Despreader 1758 is operable to despread the output of combiner 1754 while despreader 1760 is operable to despread the output of combiner 1756. Further, in some embodiments, when STTD is employed, STTD decoder is operable to STTD decode the outputs of despreaders 1758 and 1760.

Figure 18:
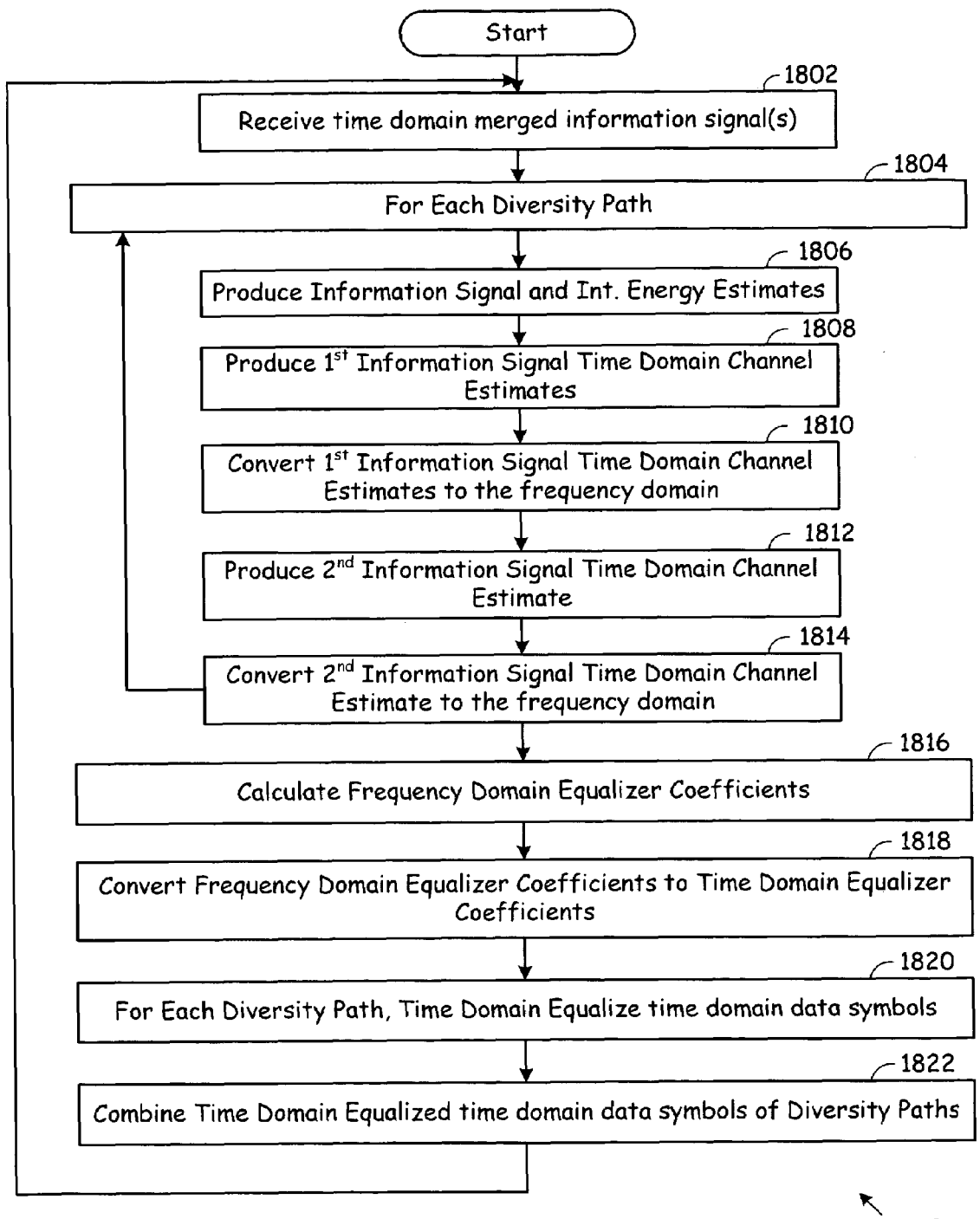
FIG. 18 is a flow chart illustrating equalization operations according to an embodiment of the present invention.

FIG. 18 is a flow chart illustrating equalization operations according to an embodiment of the present invention. The operation 1800 commences with operations for each of at least two diversity paths (Step 1802). As was previously described with reference to FIGS. 3, 5, and 17, a radio may include a plurality of RF front ends 302-308, each servicing a respective diversity path. Thus, referring again to FIG. 18, operations 1804-1814 are performed for each diversity path. In particular, for each diversity path, the baseband processing module receives a merged information signal that includes a first information signal and a second information signal, each of the first and second information signals having time domain training symbols and data symbols.

With reference to a first diversity path, operation includes receiving a first time domain information signal (first merged information signal). The first diversity path then estimates energies of first and second information signals and, in some cases, one or more interfering signals present in the time domain merged information signal (Step 1806). Operation then includes processing the first information signal (dominant interferer) time domain training symbols to produce a first information signal time domain channel estimate (Step 1808). Further, operation includes converting the first information signal time domain channel estimate to the frequency domain to produce a first information signal frequency domain channel estimate (Step 1810). Operation then includes processing the second information signal time domain training symbols to produce a second information signal time domain channel estimate (Step 1812). Further, operation includes converting the second information signal time domain channel estimate to the frequency domain to produce a second information signal frequency domain channel estimate (Step 1814).

With reference to a second diversity path, operation includes receiving a second time domain signal (second merged information signal). The second diversity path then estimates energies of first and second information signals and, in some cases, one or more interfering signals present in the time domain merged information signal (Step 1806). Operation then includes processing the first information signal time domain training symbols to produce a first information signal time domain channel estimate (Step 1808). Further, operation includes converting the first information signal time domain channel estimate to the frequency domain to produce a first information signal frequency domain channel estimate (Step 1810). Operation then includes processing the second information signal time domain training symbols to produce a second information signal time domain channel estimate (Step 1812). Further, operation includes converting the second information signal time domain channel estimate to the frequency domain to produce a second information signal frequency domain channel estimate (Step 1814).

Steps 1804 through 1814 may be performed for more than two diversity paths. When the operations of Steps 1804-1814 have been completed for each diversity path, operation proceeds to Step 1816 where one or more sets of frequency domain equalizer coefficients are produced for each of the plurality of diversity paths. For the particular example of the structure of FIG. 17 that includes two diversity paths, the operation at Step 1816 includes producing first and second frequency domain equalizer coefficients for each diversity path based upon the frequency domain channel estimates. Operation then includes converting the frequency domain equalizer coefficients to time domain equalizer coefficients (Step 1818). Operation then includes, for each diversity path, time domain equalizing respective time domain data symbols (Step 1820). Finally, operation includes combining at least some of the equalized time domain data symbols from the plurality of diversity paths (Step 1822). These operations may include STTD combining operations.

The operations 1802-1822 are repeated each time new equalizer coefficients are produced based upon received physical layer frames that include training symbols. In many RF receivers, the operations 1800 of FIG. 18 are repeated for each received physical layer frame. However, in other embodiments, channel estimation is performed periodically based upon detected changes of channel conditions or when a time constraint is met.

The operations at Steps 1808 and 1812 may include cluster path processing as has been previously described. When cluster processing is performed, the time domain channel estimates include cluster path processed time domain training symbols. Fast Fourier transformations are employed in converting from the time domain to the frequency domain while Inverse Fast Fourier transformations are to employed to convert from the frequency domain to the time domain. The operations at Step 1816 may include using an MMSE algorithm to produce the frequency domain equalizer coefficients based upon the channel estimates received. The operations of FIG. 18 may support various types of systems including cellular wireless communication systems, wireless metropolitan area communication systems (such as the WiMAX) standards, WLAN communication operations, and WPAN communication operations.

The operations of FIG. 18 may be performed on received MIMO signals. The following equations (viewed in conjunction with the operations of FIG. 18, the baseband processing module 222 of FIG. 4, and the channel model of FIG. 14B) may be employed by embodiments of the present invention upon received MIMO signals. The MIMO signal model may be characterized as:

$$Y[k]=H_1[k]S_1+H_2[k]S_2+N \quad \text{(Eq. 22)}$$

By treating the second information signal $S_2$ signal as interference to the first information signal $S_1$, the frequency domain equalizer coefficients for the first information signal $S_1$ signal with MMSE optimum weight at each sub-carrier is given as:

$$W[k] = E(Y[k]^*Y[k]^T)^{-1}E \quad \text{(Eq. 23)}$$

$$(Y[k]^*S_1) = (H_1[k]^*H_1[k]^T + H_2[k]^*H_2[k]^T + C_{nn})^{-1}H_1[k]$$

Similarly, by treating the first information signal $S_1$ signal as interference to the second information signal $S_2$, the frequency domain equalizer coefficients for the second information signal $S_2$ with MMSE optimum weight at each sub-carrier is given as:

$$C[k] = \begin{bmatrix} C_k^1 \\ C_k^2 \end{bmatrix} = E(Y[k]^*Y[k]^T)^{-1}E(Y[k]^*S) = \quad \text{(Eq. 24)}$$

$$(H_2[k]^*H_2[k]^T + H_1[k]^*H_1[k]^T + C_{nn})^{-1}H_2[k]$$

Then, using IFFT operations, the coefficient of the time domain equalizer are achieved. In more detail, we have $$H_1[k] = \begin{bmatrix} H_{11}[k] \\ H_{12}[k] \end{bmatrix} \quad H_2[k] = \begin{bmatrix} H_{21}[k] \\ H_{22}[k] \end{bmatrix} \quad \text{(Eq. 25)}$$

By ignoring the subscript k, we have $$W = \quad \text{(Eq. 26)}$$

$$\begin{bmatrix} |H_{11}|^2 + |H_{21}|^2 + \sigma_{N1}^2/S & H_{11}H_{12}^* + H_{21}H_{22}^* \\ H_{12}H_{11}^* + H_{22}H_{21}^* & |H_{12}|^2 + |H_{22}|^2 + \sigma_{N2}^2/S \end{bmatrix}^{-1} \begin{bmatrix} H_{11} \\ H_{12} \end{bmatrix}$$

$$W = \begin{bmatrix} W_1 \\ W_2 \end{bmatrix} \quad \text{(Eq. 27)}$$

$$= \begin{bmatrix} \dfrac{\left(|H_{12}|^2 + |H_{22}|^2 + \dfrac{\sigma_{N2}^2}{S}\right)}{\det} & \dfrac{-(H_{11}H_{12}^* + H_{21}H_{22}^*)}{\det} \\ \dfrac{-(H_{12}H_{11}^* + H_{22}H_{21}^*)}{\det} & \dfrac{\left(|H_{11}|^2 + |H_{21}|^2 + \dfrac{\sigma_{N1}^2}{S}\right)}{\det} \end{bmatrix} \begin{bmatrix} H_{11} \\ H_{12} \end{bmatrix}$$

After weight simplification processing, we have:

$$W_1 = \alpha\left(|H_{22}|^2 H_{11} + \dfrac{\sigma_{N2}^2}{S}H_{11} - H_{21}H_{22}^*H_{12}\right) \quad \text{(Eq. 28)}$$

$$= \alpha\left(|H_{22}|^2 + \dfrac{\sigma_{N2}^2}{S} - \dfrac{H_{21}H_{22}^*H_{12}H_{11}^*}{|H_{11}|^2}\right)H_{11} \quad \text{(Eq. 29)}$$

$$= \alpha\beta_{11}H_{11} \quad \text{(Eq. 30)}$$

$$W_2 = \alpha\left(|H_{21}|^2 H_{12} + \dfrac{\sigma_{N1}^2}{S}H_{12} - H_{22}H_{21}^*H_{11}\right) \quad \text{(Eq. 31)}$$

$$= \alpha\left(|H_{21}|^2 + \dfrac{\sigma_{N1}^2}{S} - \dfrac{H_{22}H_{21}^*H_{11}H_{12}^*}{|H_{12}|^2}\right)H_{12} \quad \text{(Eq. 32)}$$

$$= \alpha\beta_{12}H_{12} \quad \text{(Eq. 33)}$$

$$C = \quad \text{(Eq. 34)}$$

$$\begin{bmatrix} |H_{11}|^2 + |H_{21}|^2 + \sigma_{N1}^2/S & H_{11}H_{12}^* + H_{21}H_{22}^* \\ H_{12}H_{11}^* + H_{22}H_{21}^* & |H_{12}|^2 + |H_{22}|^2 + \sigma_{N2}^2/S \end{bmatrix}^{-1} \begin{bmatrix} H_{21} \\ H_{22} \end{bmatrix}$$

$$C = \begin{bmatrix} C_1 \\ C_2 \end{bmatrix} = \quad \text{(Eq. 35)}$$

$$\begin{bmatrix} \dfrac{\left(|H_{12}|^2 + |H_{22}|^2 + \dfrac{\sigma_{N2}^2}{S}\right)}{\det} & \dfrac{-(H_{11}H_{12}^* + H_{21}H_{22}^*)}{\det} \\ \dfrac{-(H_{12}H_{11}^* + H_{22}H_{21}^*)}{\det} & \dfrac{\left(|H_{11}|^2 + |H_{21}|^2 + \dfrac{\sigma_{N1}^2}{S}\right)}{\det} \end{bmatrix} \begin{bmatrix} H_{21} \\ H_{22} \end{bmatrix}$$

After weight simplification processing, we have:

$$C_1 = \alpha\left(|H_{12}|^2 H_{21} + \dfrac{\sigma_{N2}^2}{S}H_{21} - H_{11}H_{12}^*H_{22}\right) \quad \text{(Eq. 36)}$$

$$\quad \text{(Eq. 37)}$$

$$= \alpha\left(|H_{12}|^2 + \dfrac{\sigma_{N2}^2}{S} - \dfrac{H_{11}H_{12}^*H_{22}H_{21}^*}{|H_{21}|^2}\right)H_{21} \quad \text{(Eq. 38)}$$

$$= \alpha\beta_{21}H_{21}$$

$$C_2 = \alpha\left(|H_{11}|^2 H_{22} + \dfrac{\sigma_{N1}^2}{S}H_{22} - H_{12}H_{11}^*H_{21}\right) \quad \text{(Eq. 39)}$$

$$\quad \text{(Eq. 40)}$$

$$= \alpha\left(|H_{11}|^2 + \dfrac{\sigma_{N1}^2}{S} - \dfrac{H_{12}H_{11}^*H_{21}H_{22}^*}{|H_{22}|^2}\right)H_{22} \quad \text{(Eq. 41)}$$

$$= \alpha\beta_{22}H_{12}$$

$$1/\alpha = (|H_{d1}|^2 + |H_{l1}|^2 + \sigma_{N1}^2/S)(|H_{d2}|^2 + |H_{l2}|^2 + \sigma_{N2}^2/S) - \quad \text{(Eq. 42)}$$
$$(H_{d1}H_{d2}^* + H_{l1}H_{l2}^*)(H_{d2}H_{d1}^* + H_{l2}H_{l1}^*)$$

Figure 19A:
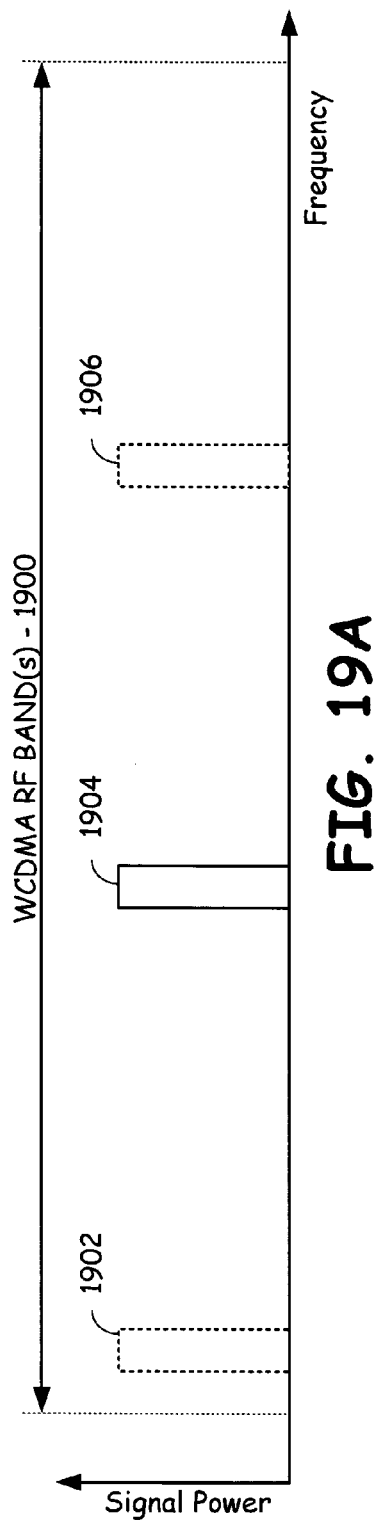
FIG. 19 is a block diagram diagrammatically illustrating the timing of various channels of a WCDMA system employed for noise estimation operations according to the present invention.

FIG. 19A is a graph illustrating diagrammatically the power spectral density of WCDMA RF band(s) 1900 supporting multiple RF carriers 1902, 1904, and 1906. The WCDMA RF band(s) 1900 extend across a frequency spectrum and include WCDMA RF carriers 1902, 1904, and 1906. According to one aspect of the present invention, the cell searcher module 316 of the baseband processing module 222 of an RF transceiver that supports WCDMA operations according to the present invention is operable to scan the WCDMA RF band(s) 1900 to identify WCDMA RF energy of at least one WCDMA carrier 1902, 1904, or 1906. During initial cell search operations, the cell searcher module 316 will, in combination with other components of the baseband processing module 222, identify a strongest WCDMA carrier, e.g., 1904. Then, the cell searcher module 316 synchronizes to WCDMA signals within the WCDMA carrier 1904. These WCDMA signals correspond to a particular base station cell or sector. In these initial cell search synchronization operations, the cell searcher module 316 preferably synchronizes to a strongest cell/sector.

WCDMA signals transmitted from multiple base stations/sectors may use a common WCDMA RF carrier 1904. Alternately, the WCDMA signals from differing base stations/sectors may use differing WCDMA carriers, e.g., 1902 or 1906. According to the present invention, the cell searcher module 316 and the baseband processing module 222 are operable to synchronize to WCDMA signals from differing cells/sectors operating in one or more of the WCDMA RF bands 1902, 1904, or 1906. Such synchronization operations occur not only for initial cell search but for neighbor cell search or detected cell search operations.

Figure 19B:
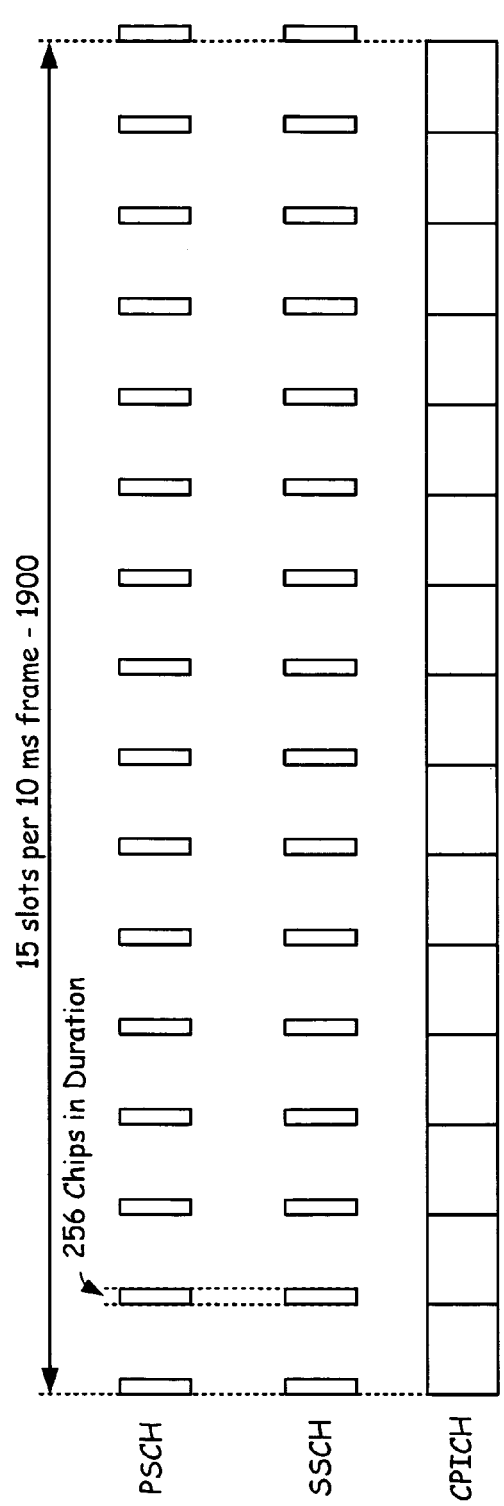

FIG. 19B is a block diagram diagrammatically illustrating the timing of various channels of a WCDMA system employed for noise estimation operations according to the present invention. The WCDMA signal illustrated has a 15 slot frame structure that extends across 10 ms in time. The WCDMA signal includes a Synchronization Channel (SCH) and a Common Pilot Channel (CPICH), also referred to as pilot signal herein, which are introduced in the downlink to assist wireless transceivers in performing cell search operations. The SCH is further split into a primary SCH (PSCH) and a secondary SCH (SSCH). The PSCH carries a primary synchronization code (PSC) which is chosen to have good periodic auto correlation properties and the secondary SCH (SSCH) carries a secondary synchronization code (SSC). The PSCH and the SSCH are constructed such that their cyclic-shifts are unique so that reliable slot and frame synchronization can be achieved. The PSCH and the SSCH are 256-chips long with special formats and appear $\frac{1}{10}$ of each time slot. As shown in FIG. 19B, the PSCH and the SSCH are transmitted once in the same position in every slot. The PSCH code is the same for all time slots, and therefore is used to detect slot boundary. The SSCH is used to identify scrambling code group and frame boundary. Thus, the SSCH sequences vary from slot to slot and are coded by a code-book with 64 code-words (each representing a code-group).

The CPICH carries pre-defined symbols with a fixed rate (30 kbps, hence 10 symbols per time slot) and spreading factor of 256. The channelization code for CPICH is fixed to the $0^{th}$ code. According to aspects of the present invention that are described further herein with reference to FIGS. 20-25, the CPICH is used to estimate a Channel to Interference ratio (CPICH_Ec/Ior) that is used to estimate noise variance. This noise variance is then used in determining frequency domain equalizer coefficients.

Figure 20:
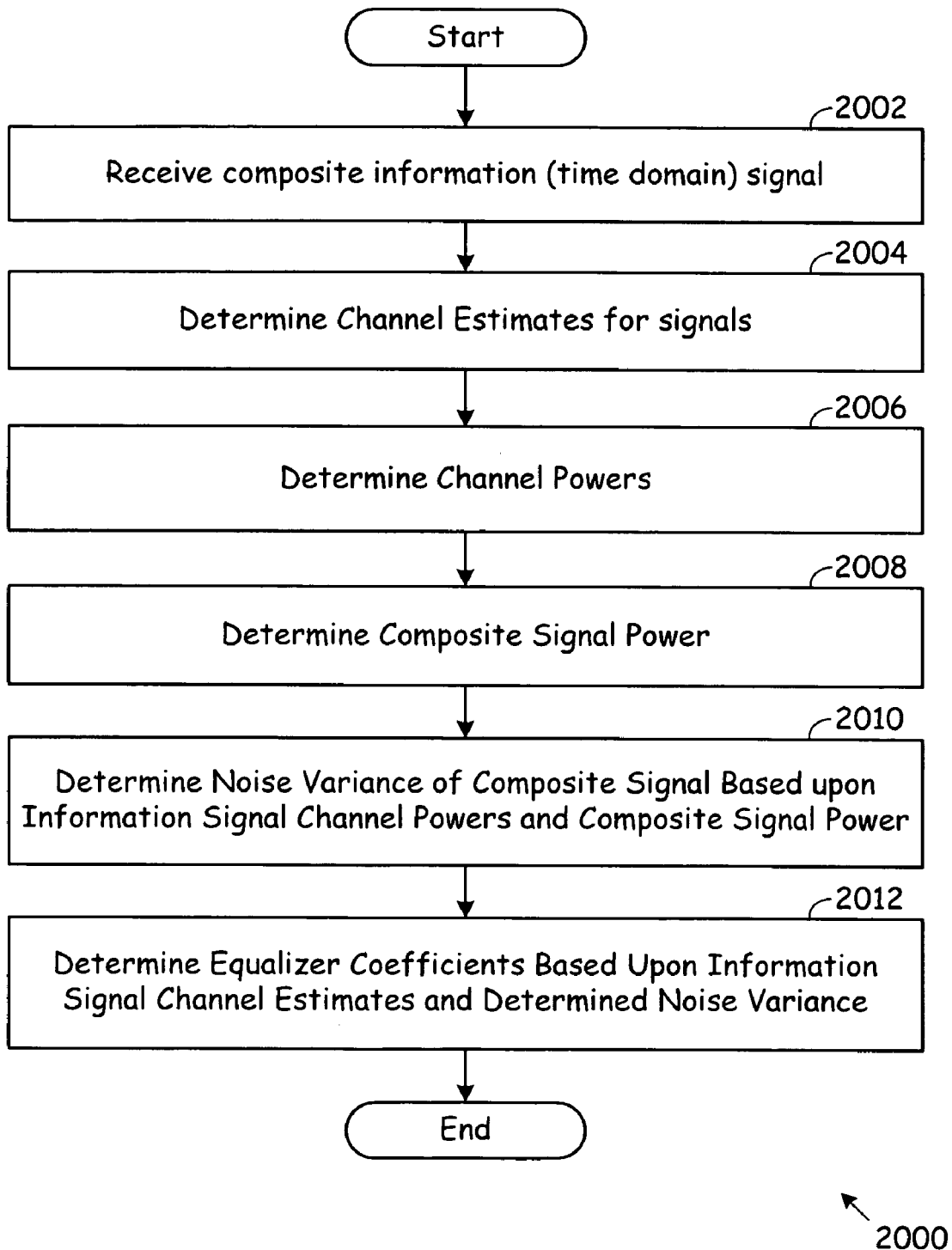
FIG. 20 is a flow chart illustrating equalization coefficient determination operations according to an embodiment of the present invention.

FIG. 20 is a flow chart illustrating equalization coefficient determination operations according to an embodiment of the present invention. The operations 2000 of FIG. 20 may be performed by an RF receiver consistent with the structure and operations previously illustrated in FIGS. 1-18 and described with reference there to. In particular, a baseband processing module 222, such as that illustrated in FIG. 4, may perform the operations of FIG. 20. As was previously described with reference to FIG. 4, the baseband processing module 222 includes hardware that performs operations according to embodiments of the present invention. This hardware may be dedicated hardware, general purpose hardware running software instructions, and/or a combination of general and specialized hardware.

Referring again to FIG. 20, the method 2000 commences with receiving a composite information signal (Step 2002). The composite signal is a time domain signal that includes a first information signal, a second information signal, and a pilot signal. The first information signal includes information intended for the RF receiver. In one embodiment, the second information signal is an interfering signal that does not carry data intended for the RF receiver. However, in another embodiment, the second information signal also carries data intended for the RF receiver. As was previously illustrated with reference to FIG. 14A, the information signal may include multi-path components of a single information signal. As was illustrated and described with reference to FIG. 14B, in a MIMO system, a MIMO signal may include multiple data signals intended for the RF receiver.

Operation continues with determining channel estimates for the information signals (Step 2004). As is generally known, a channel estimate may be determined for the first information signal based upon training symbols of the first information signal. Likewise, the channel estimate for the second information signal may be determined based upon training symbols of the second information signal. Then, operation 2000 includes determining channel powers based upon the channel estimates determined at Step 2004 (Step 2006). The operation of Steps 2004 and 2006 are performed for at least two information signals. However, the operations 2004 and 2006 could be performed for more than two information signals. The reader should recall that the second information signal could include data intended for the RF receiver or may be an interfering signal.

Operation 2000 proceeds with determining a composite signal power of the composite signal (Step 2008). Then, operation 2000 includes determining a noise variance of the composite signal based upon the first information signal channel power, the second information signal channel power, and the composite signal power (Step 2010). The operations of Step 2004-2010 will be further described herein with reference to particular structures illustrated in FIGS. 21 and 22. Lastly, operation 2000 includes determining a plurality of equalizer coefficients based upon the information signal channel estimates and the determined noise variance (Step 2012). The manner in which these equalizer coefficients are determined has been previously described herein with reference to single received path structures and multiple received path structures. Further, as described herein, the calculation of the plurality of equalizer coefficients may include both frequency domain and time domain operations that have been previously described with reference to FIGS. 5-18. With these operations, a minimum means squared algorithm may be employed to calculate the equalizer coefficients.

Figure 21:
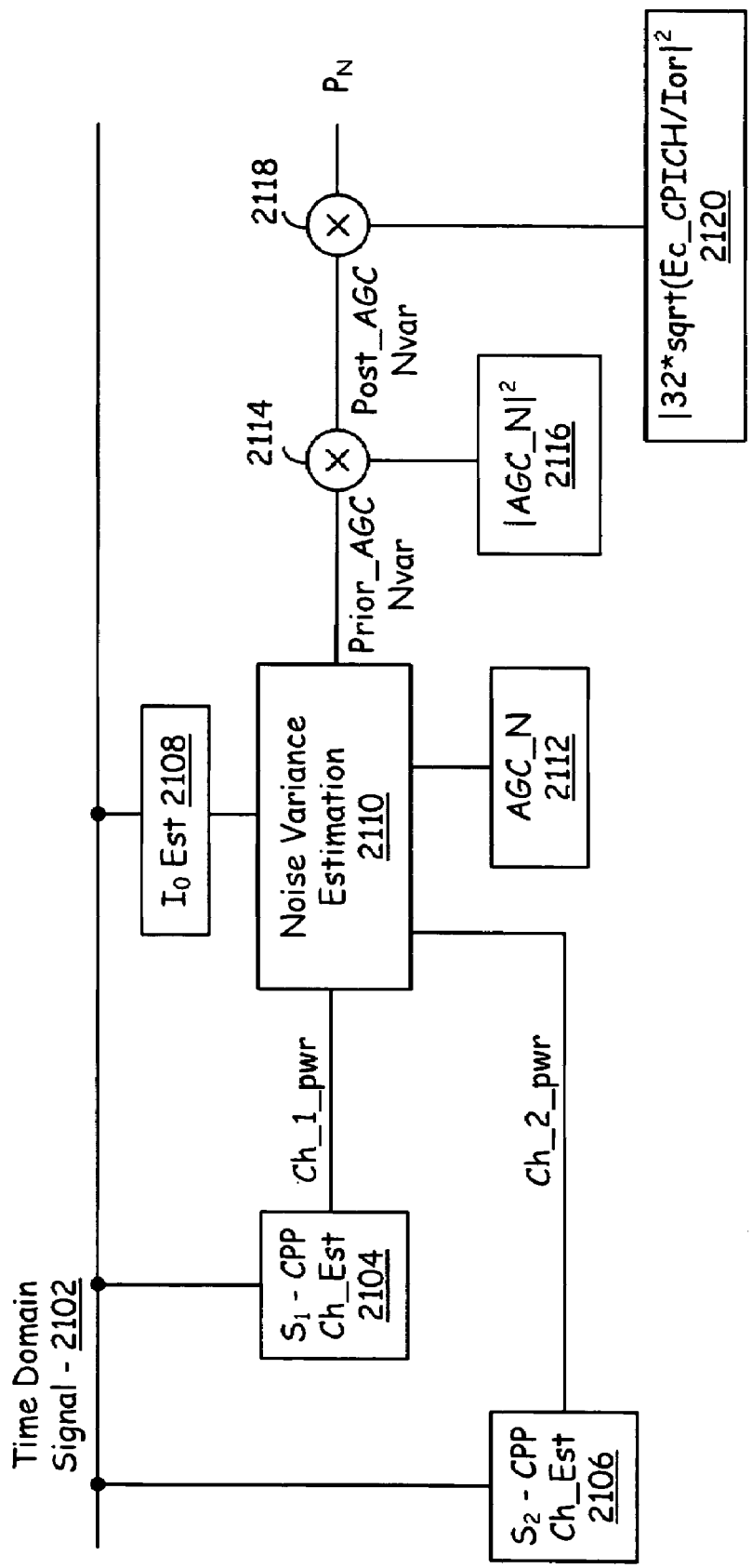
FIG. 21 is a block diagram illustrating a functional structure employed in noise variance determination operations according to one or more embodiments of the present invention.

FIG. 21 is a block diagram illustrating a functional structure employed in noise variance determination operations according to one or more embodiments of the present invention. As is shown, the time domain signal 2102 that is the composite signal is operated on by a plurality of components. A first information signal channel estimate block 2104 receives the time domain signal 2102 and not only produces a channel estimate but also produces a first information signal channel power (Ch__1_pwr). Likewise, a second information signal channel estimate block 2106 receives the time domain signal 2102, estimates the second information signal channel based upon training symbols, and produces a second information signal channel power (Ch__2_pwr). Composite signal power estimation block 2108 receives time domain signal 2102 and produces a composite signal power estimate ($I_O$). Noise variance estimation block 2110 receives the first information signal channel power, the second information signal channel power, the composite signal power estimate, and an automatic gain control (AGC) estimate from AGC block 2112. Based on these inputs, the noise variance estimation block 2110 produces a noise variance (Prior_AGC_Nvar) that has not been AGC automatic gain control adjusted. One particular embodiment of the composite signal power estimation block 2108 and the noise variance estimation block 2110 are described further with reference to FIG. 22. The non-AGC adjusted noise variance (Prior_AGC_Nvar) is adjusted via multiplier 2114 based upon input received from AGC magnitude block 2116. The output of multiplier 2114 is a post AGC variance (Post_AGC_Nvar). Then, this post AGC noise variance is adjusted by pilot signal power to interference ratio scaling by multiplier 2118 based upon input received by pilot signal to interference block 2120. The output of multiplier 2118 is the noise variance ($P_N$) that is used in equalizer coefficient determination operations.

Figure 22:
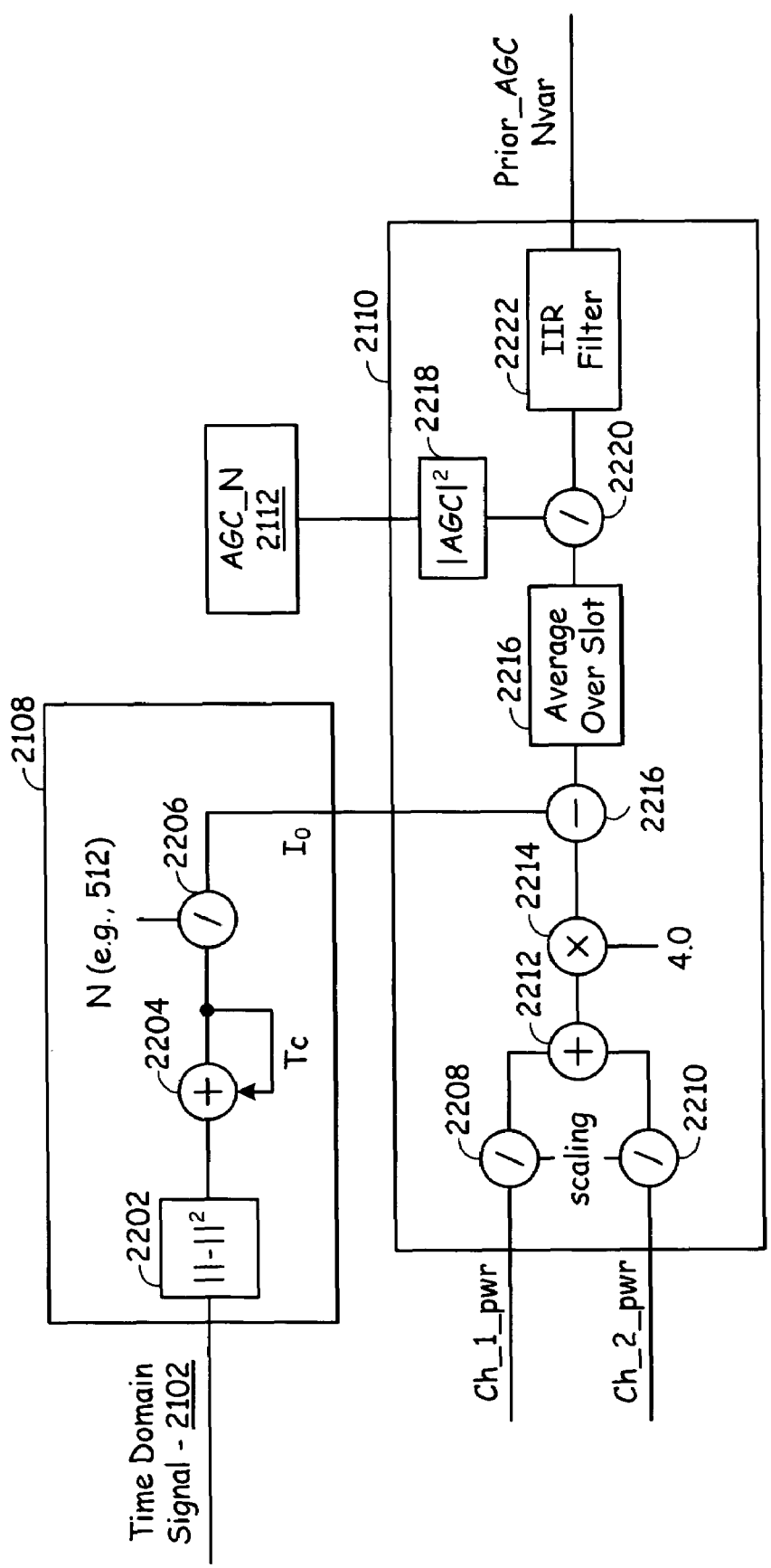
FIG. 22 is a block diagram illustrating a functional structure employed in noise variance determination operations according to one or more embodiments of the present invention.

FIG. 22 is a block diagram illustrating a functional structure employed in noise variance determination operations according to one or more embodiments of the present invention. A composite signal power block 2108 receives the time domain signal 2102. A magnitude block 2202 of the composite signal power block 2108 produces a power representation of the time domain signal 2102. The power representation of the time domain signal 2102 is accumulated over a plurality of chips by adder 2204 and then normalized over the plurality of chips by divider 2206. The summing block 2204 sums the output of magnitude determination block 2202 for a number of chips that may be 512 chips, for example. The summation block 2204 is reset as is required based upon the averaging operations. The output of the composite signal power block 2108 is the composite signal power ($I_O$) of the time domain signal 2102 (composite signal).

The noise variance estimation block 2110 receives the first information signal channel power (Ch__1_Pwr) and the second information signal channel power (Ch__2_Pwr). Scalers 2208 and 2210 scale the first and second information signal channel powers based upon a scaling factor. The output of scalers 2208 and 2210 is summed by summing block 2212 and then AGC normalized with a presumed AGC factor 4.0 by multiplier 2214. Then, the output of multiplier 2214 is acted upon along with the composite signal power received from composite signal power 2108 by subtraction block 2216. The output of subtraction block 2216 is averaged over a time slot of the time domain signal 2102. For example, with the example of the WCDMA system of FIGS. 19A and 19B, the time slot is 2,560 chips in duration with 15 time slots per frame. AGC magnitude block 2218 produces the magnitude of the AGC operator 2212. The output of the averaging block 2216 is AGC adjusted by divider operator 2220 based upon an input received from AGC magnitude block 2218. The output of the divider operator 2220 is filtered by infinite impulse response filter 2222, which produces the Prior_AGC_Nvar that was previously indicated in FIG. 21.

Figure 23:
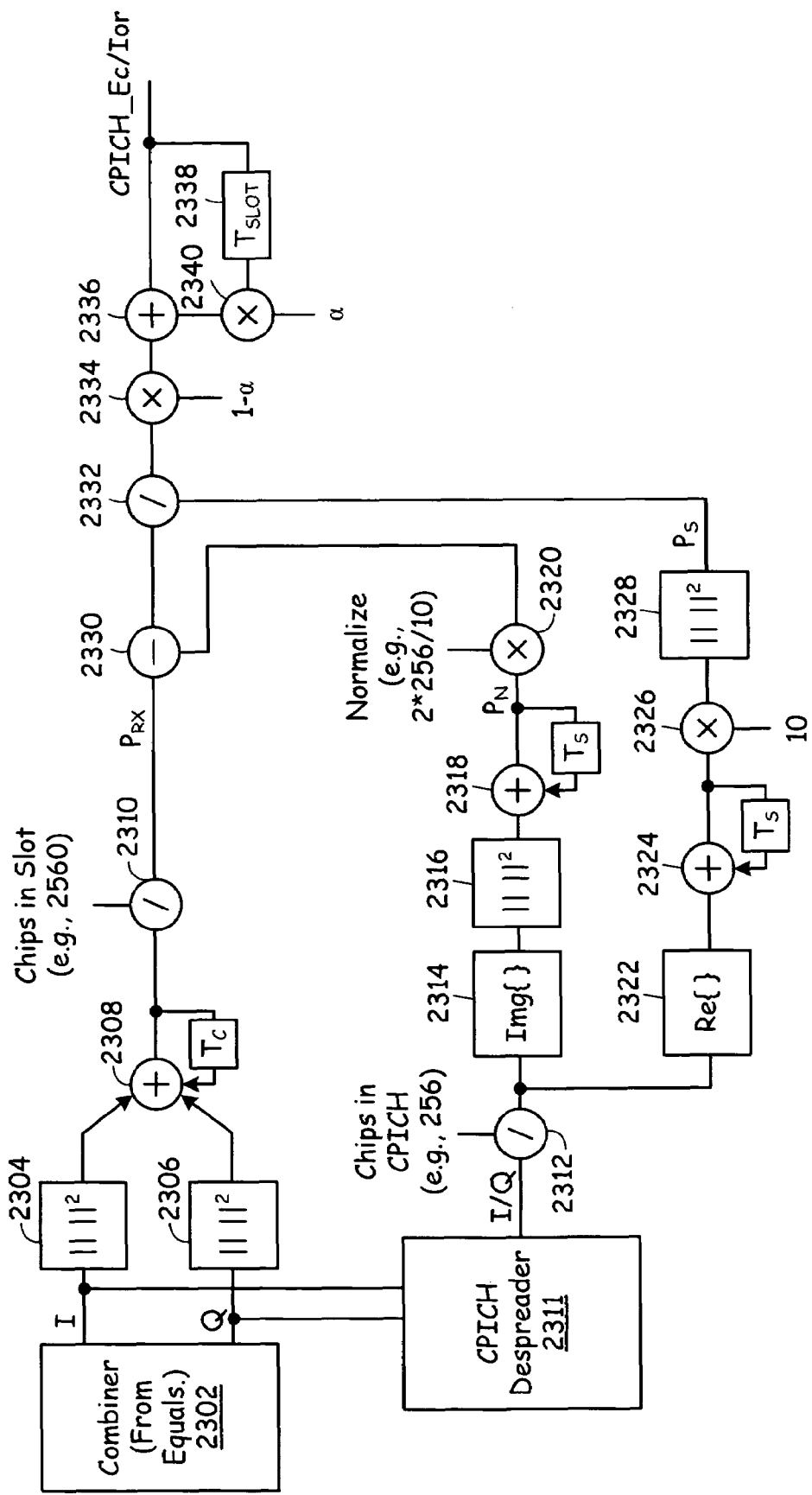
FIG. 23 is a block diagram illustrating a functional structure employed in channel to interference estimation operations according to one or more embodiments of the present invention.

FIG. 23 is a block diagram illustrating a functional structure employed in channel to interference estimation operations according to one or more embodiments of the present invention. The structure of FIG. 23 receives a combined signal from at least two equalizers, such as the equalizers 1720 and 1726 illustrated in FIG. 17. A combiner 2302 combines the input signals and outputs a signal that includes I and Q components. Blocks 2304 and 2306 determine the power of the I and Q signals received from the combiner 2302. The outputs of block 2304 and 2306 are summed by summing block 2308 over a plurality of chips. With the example of FIG. 23, the output of blocks 2304 and 2306 are summed over 2,560 chips, which corresponds to 10 symbols of the pilot signal (CPICH). Then, the divider block 2310 determines an average of the power of the pilot signal and its interference over a particular slot to produce a signal $P_{RX}$.

Another portion of the structure of FIG. 23 determines signal and interference components of the received CPICH signal. A CPICH despreader 2311 despreads the I and Q components received from combiner 2302 and produces despread I and Q components. Divider block 2312 then divides the signal produced by the CPICH despreader 2311 based upon a number of chips in a CPICH symbol, e.g., example 256 chips. Then, imaginary determination block 2314, power determination block 2316, and averaging normalizing components 2318 and 2320 produce an interference (noise) component of the pilot signal ($P_N$). Further, the real component block 2322, averaging components 2324 and 2326, and power determination component 2328 produce a signal $P_S$ that represents the power of the pilot signal ($P_S$).

The signal $P_N$ that has been normalized by multiplier block 2320 is subtracted from the signal $P_{RX}$ by subtraction block 2330. Then, the output of subtraction block 2330 is used to divide signal $P_S$ to produce a signal representative of the pilot signal power to interference ratio. The output of divider block 2332 is normalized by multiplier block 2334 based upon the factor 1-α. Then, summation block 2336, slot delay block 2338, and normalization block 2340 operate further upon the power to interference ratio using the operator α. The outputs of adder block 2336 is the pilot signal to interference ratio (CPICH_$E_C$/$I_{or}$). This value is used by block 2120 of FIG. 21 to normalize the noise variance produced by multiplier 2114.

The operations of FIGS. 20-23 may implement the following equations. A signal model in the frequency domain may be represented as:

$$Y_1 = H_{d1}S + H_{I1}I + N_1 \quad \text{(Eq. 43)}$$

$$Y_2 = H_{d2}S + H_{I2}I + N_2 \quad \text{(Eq. 44)}$$

The signal variance at both sides of Equations (43) and (44) can be given as $$D(Y_1) = |H_{d1}|^2 D(S) + |H_{I1}|^2 D(I) + \sigma_{N1}^2$$

$$D(Y_2) = |H_{d2}|^2 D(S) + |H_{I2}|^2 D(I) + \sigma_{N2}^2$$

Accordingly, the equivalent equations about the signal variance model in time domain can be derived as $$D(y_1) = \Sigma |h_{d1}|^2 D(s) + \Sigma |h_{i1}|^2 D(i) + \sigma_{n1}^2 \quad \text{(Eq. 45)}$$

$$D(y_2) = \Sigma |h_{d2}|^2 D(s) + \Sigma |h_{i2}|^2 D(i) + \sigma_{n2}^2 \quad \text{(Eq. 46)}$$

With the assumption that the transmit power of interference is constant, D(s)=D(i)=4.0. Furthermore, the combined signal of the outputs of two frequency equalizers is given as $$W_1^* Y_1 + W_2^* Y_2 = \alpha(|H_{l2}|^2|H_{d1}|^2 X + |H_{l1}|^2|H_{d2}|^2 X - \quad \text{(Eq. 47)}$$

$$2\text{Re}(H_{d2}^* H_{l2} H_{l1}^* H_{d1})X + \frac{\sigma_{N2}^2}{S} H_{d1} X + \frac{\sigma_{N2}^2}{S} H_{d1}^* H_{l1} I +$$

$$W_2^* N_2 + \frac{\sigma_{N1}^2}{S} H_{d2} X + \frac{\sigma_{N1}^2}{S} H_{d2}^* H_{l2} I + W_1^* N_1)$$

It is demonstrated that the interference I is suppressed very well, only noise items in Equation (47) includes interference information. Thus, from the Equations (44) and (45), the power of noise at each antenna (i.e., Pn1 and Pn2) can be achieved. Also, from Equation (47), the power allocation of CPICH at the desired signal (i.e., $E_C\_$CPICH/Ior) also can be calculated. In some operations, the estimated channel is updated every 2 CPICH symbols while the AGC figures are updated every slot. The noise power at dual antenna and $E_C\_$CPICH/Ior, which is very important input elements for FDE-IS, is updated as is appropriate.

Figure 24:
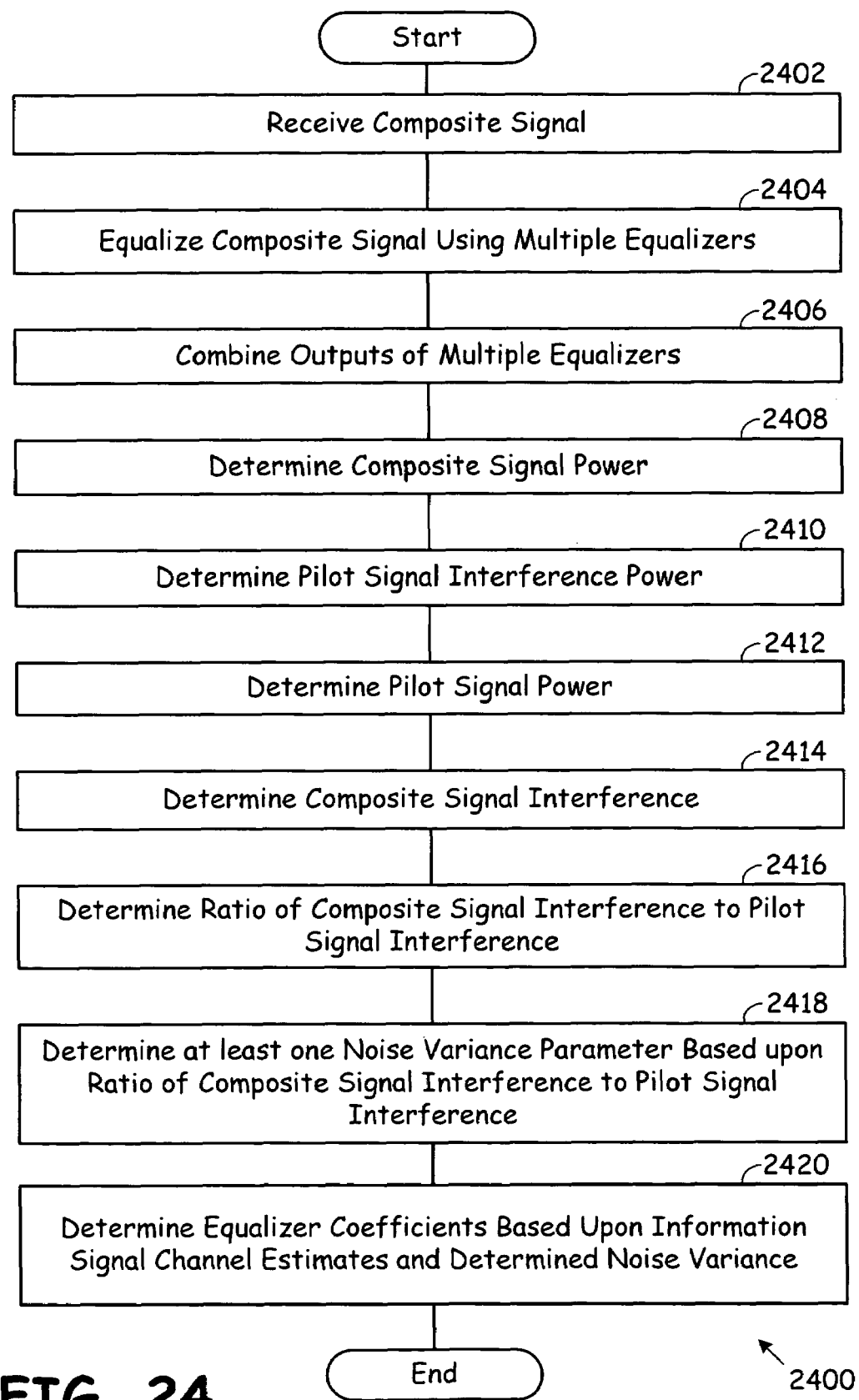
FIG. 24 is a flow chart illustrating noise variance determination operations according to an embodiment of the present invention.

FIG. 24 is a flow chart illustrating noise variance determination operations according to an embodiment of the present invention. Operation 2400 commences with the RF receiver, e.g., baseband processing module 22 of the RF receiver, receiving the composite signal (2402). The composite signal includes the first information signal, the second information signal, and a pilot signal, and may include other components as well. Operation continues with equalizing the composite signal using multiple equalizers to produce multiple equalized information signals (2404). In one particular embodiment where two equalizers operate upon the composite signal, the equalizing operations of Step 2404 include equalizing the first composite signal by a first equalizer to produce a first equalized information signal and equalizing the composite signal by a second equalizer to produce a second equalized information signal.

Operation continues with combining the outputs of the multiple equalizers (Step 2406). Then, operation 2400 includes determining a signal power of the composite signal (Step 2410). Then, operation 2400 includes determining pilot signal interference power (Step 2410). Some of these operations 2404-2416 may be performed by the structure of FIG. 23. Operation continues with determining pilot signal interference power (Step 2410). Operation then includes determining composite channel interference (Step 2414). Then, operation includes determining a ratio of the composite signal interference to pilot signal interference (Step 2416). Operation next includes determining at least one noise variance parameter based upon the ratio of composite signal interference to pilot signal interference. Then, operation may include determining a plurality of equalizer coefficients based upon a first information signal channel estimate, a second information signal channel estimate, and the noise variance of the composite signal (Step 2420). The manner in which the operations of Step 2402-2418 may be determined or described further herein with reference to the structure of FIG. 25. Likewise, some of these operations of Steps 2402-2418 may be performed by the structures previously described with reference to FIGS. 21-23.

In one particular embodiment of the operation 2418 of FIG. 24, determining the noise variance of the composite signal based upon the ratio of the composite signal interference to the pilot signal interference comprises performing a table lookup based upon the ratio of the composite signal interference to the pilot signal interference. Below Table 1 provides one example of a lookup table that may be used according to the operation of Step 2418. Generally, as will be described further with reference to FIG. 26, the ratio $I_{OR}/I_{OC}$ is determined and, based upon this ratio, a fixed diagonal loading value (noise variance) is determined that is used in subsequent operations to determine equalizer coefficients.

TABLE 1

Adaptive Fixed Diagonal Loading Values

| IOR/IOC range (dB) | Fixed Diagonal Loading Value |
| --- | --- |
| less than 0 | 9000 |
| (0–2) | 8000 |
| (2–3) | 5000 |
| (3–5) | 2000 |
| (5–9) | 1000 |
| (9–10) | 900 |
| Greater than 10 | 800 |

The noise variance may include a first noise variance corresponding to the first information signal and a second noise variance corresponding to the second information signal. These first and second noise variances may be separately gained scaled using gain scaling operations. Calculations of the equalizer coefficients based upon the information signal channel estimates and the determined noise variances of Step 2420 may be performed according to techniques previously described herein using both time domain and frequency domain operations.

Figure 25:
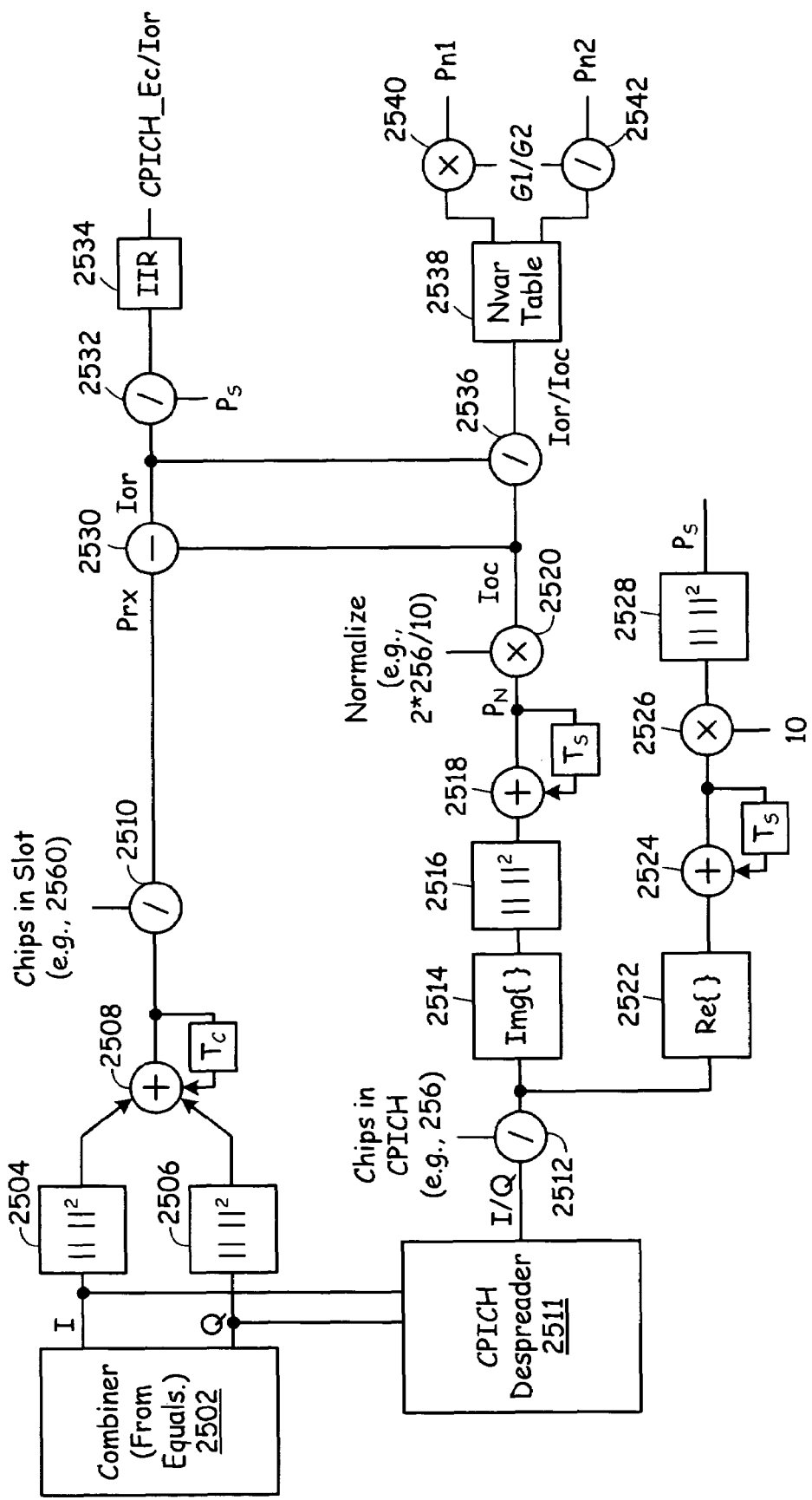
FIG. 25 is a block diagram illustrating another functional structure employed in noise variance determination operations according to one or more embodiments of the present invention.

FIG. 25 is a block diagram illustrating another functional structure employed in noise variance determination operations according to one or more embodiments of the present invention. The structure of FIG. 25 includes a combiner 2502 that receives outputs from multiple equalizers. Combiner 2502 produces I and Q components of equalized signals, e.g., first and second desired equalized information signals, each of which may a pilot signal. Power determination blocks 2504 and 2506, summing block 2508, and chip time accumulator (summation block) 2508 combine the power of the I and Q components of the equalized signals. The output of summation block 2508 is divided by divider block 2510 based upon a number of chips in a slot, for example 2560. The output of divider block 2510 is an estimate of the received power of the equalized signals from combiner 2502, Prx.

CPICH despreader block 2511 receives the output from combiners 2502 and despreads the received signals using a despreading code corresponding to the pilot signal CPICH. The output of CPICH despreader 2511 is normalized across a number of chips in the pilot signal by divider block 2512. Imaginary component determination block 2514, power determination block 2516, summation block 2518 and normalization multiplier 2520 determines the pilot signal interference power Ioc. Real component determination block 2522, summation block 2524, normalization block 2526, and power determination block 2528 receive the output of divider 2512 and produce the pilot signal power $P_S$.

Subtraction block 2530 receives the signal Ioc and subtracts that signal from the composite signal power Prx to produce interference power component Ior. Then, divider block 2536 receives inputs Ior and Ioc and operates upon these signals to produce the ratio Ior/Ioc, which is a ratio of the interference of an equalized composite signal to the interference of the pilot signal interference power. The ratio of the composite signal interference power to the pilot signal interference power (Ior/Ioc) is received by noise variance table 2538. The noise variance table 2538 produces two outputs that are normalized by multiplication block 2540 and division block 2542 based upon the gain ratio G1/G2. These multiplication block 2540 and division block 2542 produce noise variance estimations Pn1 and Pn2.

Divider block 2532 receives as input the pilot signal power and the composite signal interference power $I_{or}$ and produces a ratio of the pilot signal power to the composite signal interference. This output is filtered by IIR filter 2534 which produces the ratio of the pilot signal to interference ratio CPICH_EC/IOR.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method for determining equalizer coefficients by a Radio Frequency (RF) receiver for a composite signal that includes a first information signal and a second information signal, the method comprising:
   determining a first information signal channel estimate based upon training symbols of the first information signal;
   determining a first information signal channel power based upon the first information signal channel estimate;
   determining a second information signal channel estimate based upon training symbols of the second information signal;
   determining a second information signal channel power based upon the second information signal channel estimate;
   determining a composite signal power of the composite signal;
   determining a noise variance of the composite signal based upon the first information signal channel power, the second information signal channel power, and the composite signal power; and
   determining a plurality of equalizer coefficients based upon the first information signal channel estimate, the second information signal channel estimate, and the noise variance of the composite signal.

2. The method of claim 1, wherein determining a noise variance of the composite signal based upon the first information signal channel power, the second information signal channel power, and the composite signal power comprises:
   scaling the first information signal channel power and the second information signal channel power;
   combining the scaled first information signal channel power and the second information signal channel power to produce a combined signal channel power;
   subtracting the combined signal channel power from the composite signal power to produce a subtracted result;
   averaging the subtracted result over at least one slot time to produce a slot time averaged subtracted result; and
   producing the noise variance from the slot time averaged subtracted result and a pilot signal to interference ratio.

3. The method of claim 2, further comprising gain scaling at least one of the combined signal channel power and the slot time averaged subtracted result.

4. The method of claim 2, further comprising filtering the slot time averaged subtracted result.

5. The method of claim 1, wherein determining a plurality of equalizer coefficients based upon the first information signal channel estimate, the second information signal channel estimate, and the noise variance of the composite signal comprises:
   converting the first information signal channel estimate from the time domain to the frequency domain to produce a first information signal frequency domain channel estimate;
   converting the second information signal time domain channel estimate from the time domain to the frequency domain to produce a second information signal frequency domain channel estimate;
   converting the noise variance from the time domain to the frequency domain to produce a frequency domain noise variance;
   producing first frequency domain equalizer coefficients and second frequency domain equalizer coefficients based upon the first information signal frequency domain channel estimate, the second information signal frequency domain channel estimate, and the frequency domain noise variance;

converting the first frequency domain equalizer coefficients to the time domain to produce first time domain equalizer coefficients; and converting the second frequency domain equalizer coefficients to the time domain to produce second time domain equalizer coefficients.

6. The method of claim 1, wherein:
the first information signal is a desired signal; and
the second information signal is an interfering signal.

7. The method of claim 1, wherein the first information signal and the second information signal are Multiple Input Multiple Output (MIMO) information signals intended for the RF receiver.

8. The method of claim 1, wherein determining a plurality of equalizer coefficients based upon the first information signal channel estimate, the second information signal channel estimate, and the noise variance of the composite signal comprises performing a Minimum Mean Squared Error (MMSE) algorithm.

9. The method of claim 1, wherein the RF receiver supports wireless operations selected from the group consisting of cellular wireless communications, wireless metropolitan area network communications, wireless local area network communications, and wireless personal area network communications.

10. A method for determining equalizer coefficients by a Radio Frequency (RF) receiver for a composite signal that includes a first information signal, a second information signal, and a pilot signal, the method comprising:

equalizing the composite signal by a first equalizer to produce a first equalized information signal;

equalizing the composite signal by a second equalizer to produce a second equalized information signal;

determining a signal power of the composite signal;
determining pilot signal interference power;
determining pilot signal power;
determining composite signal interference power based upon the composite signal power;
determining a ratio of the composite signal interference power to the pilot signal interference power;
determining a noise variance of the composite signal based upon the ratio of the composite signal interference power to the pilot signal interference power; and
determining a plurality of equalizer coefficients based upon a first information signal channel estimate, a second information signal channel estimate, and the noise variance of the composite signal.

11. The method of claim 10, wherein determining a noise variance of the composite signal based upon the ratio of the composite signal interference power to the pilot signal interference power comprises performing a table lookup based upon the ratio of the composite signal interference power to the pilot signal interference power.

12. The method of claim 10, wherein the noise variance comprises:
a first noise variance corresponding to the first information signal; and
a second noise variance corresponding to the second information signal.

13. The method of claim 12, further comprising separately gain scaling the first noise variance and the second noise variance.

14. The method of claim 10, wherein determining a plurality of equalizer coefficients based upon the first information signal channel estimate, the second information signal channel estimate, and the noise variance of the composite signal comprises:

converting the first information signal channel estimate from the time domain to the frequency domain to produce a first information signal frequency domain channel estimate;

converting the second information signal time domain channel estimate from the time domain to the frequency domain to produce a second information signal frequency domain channel estimate;

converting the noise variance from the time domain to the frequency domain to produce a frequency domain noise variance;

producing first frequency domain equalizer coefficients and second frequency domain equalizer coefficients based upon the first information signal frequency domain channel estimate, the second information signal frequency domain channel estimate, and the frequency domain noise variance;

converting the first frequency domain equalizer coefficients to the time domain to produce first time domain equalizer coefficients; and converting the second frequency domain equalizer coefficients to the time domain to produce second time domain equalizer coefficients.

15. The method of claim 10, wherein:
the first information signal is a desired signal; and
the second information signal is an interfering signal.

16. The method of claim 10, wherein the first information signal and the second information signal are Multiple Input Multiple Output (MIMO) information signals intended for the RF receiver.

17. The method of claim 10, wherein determining a plurality of equalizer coefficients based upon the first information signal channel estimate, the second information signal channel estimate, and the noise variance of the composite signal comprises performing a Minimum Mean Squared Error (MMSE) algorithm.

18. The method of claim 10, wherein the RF receiver supports wireless operations selected from the group consisting of cellular wireless communications, wireless metropolitan area network communications, wireless local area network communications, and wireless personal area network communications.

19. A Radio Frequency (RF) receiver operable to determine equalizer coefficients by a Radio Frequency (RF) receiver for a composite signal that includes a first information signal and a second information signal, the RF receiver comprising:

a RF front end; and
a baseband processing module coupled to the RF front end and operable to:
determine a first information signal channel estimate based upon training symbols of the first information signal;
determine a first information signal channel power based upon the first information signal channel estimate;
determine a second information signal channel estimate based upon training symbols of the second information signal;
determine a second information signal channel power based upon the second information signal channel estimate;
determine a composite signal power of the composite signal;

determine a noise variance of the composite signal based upon the first information signal channel power, the second information signal channel power, and the composite signal power; and determine a plurality of equalizer coefficients based upon the first information signal channel estimate, the second information signal channel estimate, and the noise variance of the composite signal.

20. The RF receiver of claim 19, wherein in determining a noise variance of the composite signal based upon the first information signal channel power, the second information signal channel power, and the composite signal power the baseband processing module is operable to:

scale the first information signal channel power and the second information signal channel power;

combine the scaled first information signal channel power and the second information signal channel power to produce a combined signal channel power;

subtract the combined signal channel power from the composite signal power to produce a subtracted result;

average the subtracted result over at least one slot time to produce a slot time averaged subtracted result; and produce the noise variance from the slot time averaged subtracted result and a pilot signal to interference ratio.

21. The RF receiver of claim 20, wherein the baseband processing module is further operable to gain scale at least one of the combined signal channel power and the slot time averaged subtracted result.

22. The RF receiver of claim 21, wherein the baseband processing module is further operable to filter the slot time averaged subtracted result.

23. The RF receiver of claim 19, wherein:
the first information signal is a desired signal; and
the second information signal is an interfering signal.

24. The RF receiver of claim 19, wherein the first information signal and the second information signal are Multiple Input Multiple Output (MIMO) information signals intended for the RF receiver.

25. The RF receiver of claim 19, wherein in determining a plurality of equalizer coefficients based upon the first information signal channel estimate, the second information signal channel estimate, and the noise variance of the composite signal, the baseband processing module is operable to perform a Minimum Mean Squared Error (MMSE) algorithm.

26. The RF receiver of claim 19, wherein the RF receiver supports wireless operations selected from the group consisting of cellular wireless communications, wireless metropolitan area network communications, wireless local area network communications, and wireless personal area network communications.

27. A Radio Frequency (RF) receiver operable to determine equalizer coefficients by a Radio Frequency (RF) receiver for a composite signal that includes a first information signal and a second information signal, the RF receiver comprising:

a RF front end; and a baseband processing module coupled to the RF front end and operable to:

equalize the composite signal by a first equalizer to produce an first equalized information signal;

equalize the composite signal by a second equalizer to produce an second equalized information signal;

determine a signal power of the composite signal;

determine pilot signal interference power;

determine pilot signal power;

determine composite signal interference power based upon the composite signal power;

determine a ratio of the composite signal interference power to the pilot signal interference power;

determine a noise variance of the composite signal based upon the ratio of the composite signal interference power to the pilot signal interference power; and determine a plurality of equalizer coefficients based upon a first information signal channel estimate, a second information signal channel estimate, and the noise variance of the composite signal.

28. The RF receiver of claim 27, wherein in determining a noise variance of the composite signal based upon the ratio of the composite signal interference power to the pilot signal interference power, the baseband processing module is operable to perform a table lookup based upon the ratio of the composite signal interference power to the pilot signal interference power.

29. The RF receiver of claim 27, wherein the noise variance comprises:

a first noise variance corresponding to the first information signal; and a second noise variance corresponding to the second information signal.

30. The RF receiver of claim 29, wherein the baseband processing module is further operable separately gain scaling the first noise variance and the second noise variance.

31. The RF receiver of claim 29, wherein:
the first information signal is a desired signal; and
the second information signal is an interfering signal.

32. The RF receiver of claim 29, wherein the first information signal and the second information signal are Multiple Input Multiple Output (MIMO) information signals intended for the RF receiver.

33. The RF receiver of claim 29, wherein in determining a plurality of equalizer coefficients based upon the first information signal channel estimate, the second information signal channel estimate, and the noise variance of the composite signal, the baseband processing module is operable to perform a Minimum Mean Squared Error (MMSE) algorithm.

34. The RF receiver of claim 29, wherein the RF receiver supports wireless operations selected from the group consisting of cellular wireless communications, wireless metropolitan area network communications, wireless local area network communications, and wireless personal area network communications.

* * * * *